US012770258B2

(12) United States Patent
Suzuki et al.

(10) Patent No.: US 12,770,258 B2
(45) Date of Patent: Oct. 20, 2026

(54) GENERATING A REFRACTIVE INDEX DISTRIBUTION USING A PROCESSING-TARGET IMAGE CAPTURED OF A SAMPLE

(71) Applicant: Evident Corporation, Tatsuno-machi (JP)

(72) Inventors: Yoshimasa Suzuki, Kawasaki (JP); Satoshi Watanabe, Tokyo (JP); Shintaro Fujii, Hachioji (JP)

(73) Assignee: Evident Corporation, Kamiina-Gun (JP)

( * ) Notice: Subject to any disclaimer, the term of this patent is extended or adjusted under 35 U.S.C. 154(b) by 176 days.

(21) Appl. No.: 18/826,358

(22) Filed: Sep. 6, 2024

(65) Prior Publication Data

US 2025/0003879 A1 Jan. 2, 2025

Related U.S. Application Data

(63) Continuation of application No. PCT/JP2022/012413, filed on Mar. 17, 2022.

(51) Int. Cl.
*G06T 7/00* (2017.01)
*G01N 21/41* (2006.01)
(Continued)

(52) U.S. Cl.
CPC ........... *G06T 7/0012* (2013.01); *G01N 21/41* (2013.01); *G01N 2021/1765* (2013.01);
(Continued)

(58) Field of Classification Search
CPC ......... G06T 7/0012; G06T 2207/10056; G06T 2207/10064; G06T 2207/30024;
(Continued)

(56) References Cited

U.S. PATENT DOCUMENTS 6,658,142 B1 12/2003 Kam et al.
9,891,172 B2 * 2/2018 Matsumoto ............ G02B 21/08
(Continued)

FOREIGN PATENT DOCUMENTS

EP 4641285 A1 * 10/2025 ........... G02B 21/365
JP 2002531840 A 9/2002
(Continued)

OTHER PUBLICATIONS

Extended European Search Report dated Nov. 13, 2025, issued in counterpart European Application No. 22932136.9.
(Continued)

*Primary Examiner* — Scott A Rogers
(74) *Attorney, Agent, or Firm* — Holtz, Holtz & Volek PC

(57) ABSTRACT

A refractive index distribution generation device includes a processor and a memory. The processor performs a refractive index distribution generation process of generating a refractive index distribution corresponding to a processing-target image. The refractive index distribution generation process includes an input process of inputting, from the memory, the processing-target image, first refractive index information indicating a refractive index of a first structure, and second refractive index information indicating a refractive index of a second structure different from the first structure, and a setting process of setting respective refractive indexes that constitute a refractive index distribution. The setting process includes a first setting process of setting a refractive index based on the first refractive index information at a position corresponding to a first image region of the processing-target image on the basis of a signal intensity, and a second setting process of setting a refractive index based on the second refractive index information at a position corresponding to an image region different from the first image region of the processing-target image. The first
(Continued)

image region is an image region corresponding to the first structure.

26 Claims, 27 Drawing Sheets

(51) Int. Cl.
*G01N 21/17* (2006.01)
*G01N 21/27* (2006.01)
*G01N 21/64* (2006.01)

(52) U.S. Cl.
CPC ....... *G01N 2021/178* (2013.01); *G01N 21/27* (2013.01); *G01N 21/6458* (2013.01); *G06T 2207/10056* (2013.01); *G06T 2207/10064* (2013.01); *G06T 2207/30024* (2013.01)

(58) Field of Classification Search
CPC ........ G01N 21/27; G01N 21/41; G01N 21/64; G01N 21/6458; G01N 2021/1765; G01N 2021/178
See application file for complete search history.

(56) References Cited

U.S. PATENT DOCUMENTS

| | | | | |
|---|---|---|---|---|
| 10,288,877 | B2 | 5/2019 | Suzuki | |
| 10,302,569 | B2 * | 5/2019 | Matsumoto | G02B 21/26 |
| 10,990,797 | B2 | 4/2021 | Cotte et al. | |
| 10,996,214 | B2 | 5/2021 | Shaked et al. | |
| 11,450,062 | B2 | 9/2022 | Park et al. | |
| 11,867,624 | B2 * | 1/2024 | Suzuki | G02B 21/086 |
| 12,354,233 | B2 * | 7/2025 | Min | G06T 3/4023 |
| 12,553,825 | B2 * | 2/2026 | Yasuhiko | G01N 21/41 |
| 2012/0288157 | A1 | 11/2012 | Kishima | |
| 2017/0017070 | A1 | 1/2017 | Suzuki | |
| 2017/0089837 | A1 | 3/2017 | Matsumoto et al. | |
| 2017/0205390 | A1 | 7/2017 | Shaked et al. | |
| 2018/0143137 | A1 * | 5/2018 | Matsumoto | G02B 21/365 |
| 2019/0251330 | A1 | 8/2019 | Cotte et al. | |
| 2021/0134054 | A1 | 5/2021 | Park et al. | |
| 2023/0418038 | A1 * | 12/2023 | Suzuki | G02B 21/00 |
| 2024/0428554 | A1 * | 12/2024 | Suzuki | G01N 15/1468 |
| 2025/0052678 | A1 * | 2/2025 | Takeuchi | G02B 21/36 |
| 2025/0123475 | A1 * | 4/2025 | Ikeda | G01N 21/4133 |
| 2025/0216396 | A1 * | 7/2025 | Takeuchi | C12Q 1/04 |
| 2025/0314870 | A1 * | 10/2025 | Ikeda | G01N 21/59 |
| 2026/0017958 | A1 * | 1/2026 | Takeuchi | G01N 21/45 |

FOREIGN PATENT DOCUMENTS

| | | | | |
|---|---|---|---|---|
| JP | 2012237693 | A | 12/2012 | |
| JP | 2017026666 | A | 2/2017 | |
| JP | 2021076575 | A | 5/2021 | |
| WO | 2015178338 | A1 | 11/2015 | |
| WO | WO-2022044162 | A1 * | 3/2022 | G01N 21/45 |

OTHER PUBLICATIONS

Chawla, et al., "3D-catFISH: a system for automated quantitative three-dimensional compartmental analysis of temporal gene transcription activity imaged by fluorescence in situ hybridization", Journal of Neuroscience Methods, vol. 139, No. 1, pp. 13-24, Oct. 15, 2004.

Damle, et al., "Confocal quantification of cis-regulatory reporter gene expression in living sea urchin", Developmental Biology, vol. 299, No. 2,, pp. 543-550, Nov. 15, 2006.

He, et al., "Restoration of Out-of-Focus Fluorescence Microscopy Images Using Learning-Based Depth-Variant Deconvolution", IEEE Photonics Journal, IEEE, vol. 12, No. 2, pp. 1-13, Feb. 18, 2020.

Rodenacker, et al., "Depth Intensity Correction of Biofilm Volume Data From Confocal Laser Scanning Microscopes", Retrieved from the Internet: URL:http://karo03.bplaced.net/karsten.rode nacker/Me/Misc_WWW/pdf/8ecs_034.pdf, Dec. 31, 2001.

Seidel, et al., "Analyzing Remodeling of Cardiac Tissue: A Comprehensive Approach Based on Confocal Microscopy and 3D Reconstructions", Annals of Biomedical Engineering, vol. 44, No. 5, pp. 1436-1448, Sep. 23, 2015.

Wu, et al., "Multiview confocal super-resolution microscopy", Nature, vol. 600, No. 7888, pp. 279-284, Nov. 26, 2021.

International Search Report (ISR) (and an English language translation thereof) dated May 24, 2022, issued in International Application No. PCT/JP2022/012413.

Written Opinion dated May 24, 2022, issued in International Application No. PCT/JP2022/012413.

Chowdhury, et al., "High-resolution 3D refractive index microscopy of multiple-scattering samples from intensity images", Optica, vol. 6, No. 9, pp. 1211-1219 (2019).

Matlock, "Inverse scattering for reflection intensity phase microscopy", Biomed. Opt. Express 11(2), 911-926 (2020).

International Preliminary Report on Patentability (IPRP) (and an English language translation thereof) dated Sep. 26, 2024, issued in International Application No. PCT/JP2022/012413.

* cited by examiner

GENERATING A REFRACTIVE INDEX DISTRIBUTION USING A PROCESSING-TARGET IMAGE CAPTURED OF A SAMPLE

CROSS-REFERENCE TO RELATED APPLICATION

The present application is a continuation application of PCT/JP2022/012413 filed on Mar. 17, 2022; the entire contents of which are incorporated herein by reference.

BACKGROUND OF THE INVENTION

Field of the Invention

The present disclosure relates to a refractive index distribution generation device, a refractive index distribution generation method, a refractive index distribution generation system, and a recording medium.

Description of the Related Art

A technique for estimating a refractive index distribution of a sample using computational imaging is disclosed in Non-Patent Literature 1. In this estimation technique, a sample placed on glass is illuminated by reflected illumination. Two light rays incident on an objective lens are then detected by an imager. One of the light rays is light scattered by the sample and then reflected by the glass. The other light ray is light reflected by the glass and then scattered by the sample.

CITATION LIST

Non-Patent Literature

Non-Patent Literature 1: A. Matlock, A. Sentenac, P. C. Chaumet, J. Yi, and L. Tian, "Inverse scattering for reflection intensity phase microscopy," Biomed. Opt. Express 11 (2), 911-926 (2020)

SUMMARY OF THE INVENTION

A refractive index distribution generation device according to at least some embodiments of the present disclosure includes: a processor with hardware implementation; and a memory with hardware implementation, in which the processor performs a refractive index distribution generation process of generating a refractive index distribution corresponding to a processing-target image, the refractive index distribution generation process includes an input process of inputting, from the memory, the processing-target image, first refractive index information indicating a refractive index of a first structure, and second refractive index information indicating a refractive index of a second structure different from the first structure, and a setting process of setting respective refractive indexes that constitute a refractive index distribution, the setting process includes a first setting process of setting a refractive index based on the first refractive index information at a position corresponding to a first image region of the processing-target image on the basis of a signal intensity of at least one unit pixel of the processing-target image, and a second setting process of setting a refractive index based on the second refractive index information at a position corresponding to an image region different from the first image region of the processing-target image, the first image region is an image region corresponding to the first structure, the at least one unit pixel comprises one or more pixels, and the processor performs the refractive index distribution generation process, using an image obtained by capturing an image of a sample, as the processing-target image.

Furthermore, a refractive index distribution generation system according to at least some embodiments of the present disclosure includes:

an observation optical system configured to form an optical image of a sample;

an imager configured to capture the optical image; and the above-mentioned refractive index distribution generation device.

Furthermore, a refractive index distribution generation system according to at least some embodiments of the present disclosure includes: a processor with hardware implementation; and a memory with hardware implementation, in which the processor performs a refractive index distribution generation process of generating a refractive index distribution corresponding to a processing-target image, the refractive index distribution generation process includes an input process of inputting, from the memory, the processing-target image, first refractive index information indicating a refractive index of a first structure, and second refractive index information indicating a refractive index of a second structure different from the first structure, and a setting process of setting respective refractive indexes that constitute a refractive index distribution, the setting process includes a first setting process of setting a refractive index based on the first refractive index information at a position corresponding to a first image region of the processing-target image on the basis of a signal intensity of at least one unit pixel of the processing-target image, and a second setting process of setting a refractive index based on the second refractive index information at a position corresponding to an image region different from the first image region of the processing-target image, the first image region is an image region corresponding to the first structure, the at least one unit pixel comprises one or more pixels, the processor performs the refractive index distribution generation process, using an image obtained by capturing an image of a sample, as the processing-target image, the processor performs a machine learning process to train an AI model, in the machine learning process, the AI model is trained with a plurality of data sets, the data sets include the processing-target image and training data corresponding to the processing-target image, and the training data is the refractive index distribution generated by the refractive index distribution generation process.

Furthermore, a refractive index distribution generation method according to at least some embodiments of the present disclosure is a method for generating a refractive index distribution corresponding to a processing-target image, the method including:

inputting the processing-target image, first refractive index information indicating a refractive index of a first structure, and second refractive index information indicating a refractive index of a second structure different from the first structure;

setting a refractive index based on the first refractive index information at a position corresponding to a first image region of the processing-target image on the basis of a signal intensity of at least one unit pixel of the processing-target image; and setting a refractive index based on the second refractive index information at a position corresponding to an image region different from the first image region of the processing-target image, in which the first image region is an image region corresponding to the first structure, the at least one unit pixel includes one or more pixels, and the processing-target image is an image obtained by capturing an image of a sample.

Furthermore, a recording medium according to at least some embodiments of the present disclosure is a computer-readable recording medium encoded with a program for generating a sample image, the program causing a computer to perform processing including:

an input process of inputting, from a memory, a processing-target image, first refractive index information indicating a refractive index of a first structure, and second refractive index information indicating a refractive index of a second structure different from the first structure; and a setting process of setting respective refractive indexes that constitute a refractive index distribution, the setting process including a first setting process of setting a refractive index based on the first refractive index information at a position corresponding to a first image region of the processing-target image on the basis of a signal intensity of at least one unit pixel of the processing-target image, and a second setting process of setting a refractive index based on the second refractive index information at a position corresponding to an image region different from the first image region of the processing-target image, in which the first image region is an image region corresponding to the first structure, the at least one unit pixel comprises one or more pixels, and the processing further includes a refractive index distribution generation process using an image obtained by capturing an image of a sample, as the processing-target image.

DESCRIPTION OF EMBODIMENTS

Figure 1A:
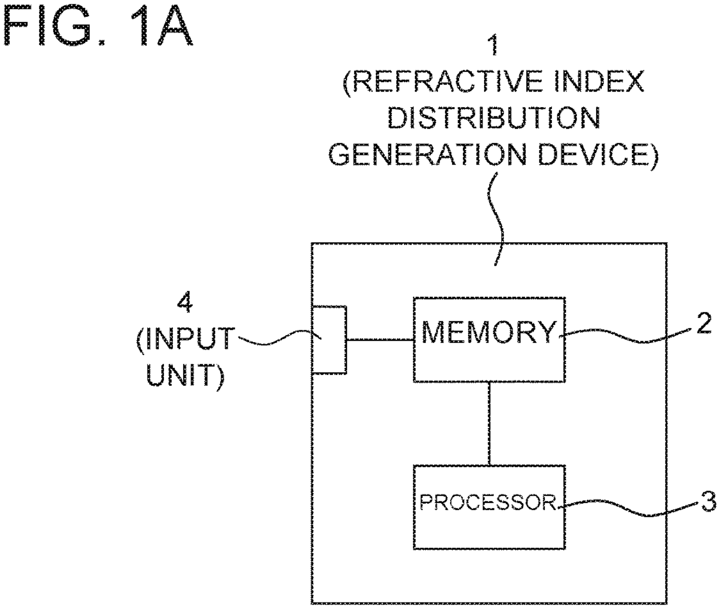
FIGS. 1A and 1B are diagrams illustrating a refractive index distribution generation device and a microscope system of the present embodiment.

Before describing the embodiments, we will explain the problem to be solved by the present invention.

In the estimation technique, both of the two light rays incident on the objective lens are reflected by the glass. In the light rays reflected by the glass, the intensity of light is very small. In a thick sample, therefore, it is difficult to estimate a refractive index distribution with high accuracy.

Prior to a description of examples, the operation effects of embodiments according to some aspects of the present disclosure will be described. In specific description of the operation effects of the present embodiment, the description will be given with specific examples. However, these aspects described by way of example are only some of the aspects included in the present disclosure and there are numerous variations of the aspects, as in the examples described below. Therefore, the present disclosure is not limited to the aspects described by way of example.

In a refractive index distribution generation device of the present embodiment, an image of an optical image of a sample is used. It is possible to acquire an image of an optical image of a sample by forming an optical image of the sample by an observation optical system and capturing the optical image of the sample by an imager. Since the sample is a three-dimensional object, it is possible to represent the image of the optical image of the sample by an XY image, an XZ image, and a YZ image.

The optical axis of the observation optical system is denoted as the Z axis, the axis orthogonal to the Z axis is denoted as the X axis, and the axis orthogonal to both of the Z axis and the X axis is denoted as the Y axis. The XY cross-section is a plane including the X axis and the Y axis. The XY image is an image in the XY cross-section. The XZ cross-section is a plane including the X axis and the Z axis. The XZ image is an image in the XZ cross-section. The YZ cross-section is a plane including the Y axis and the Z axis. The YZ image is an image in the YZ cross-section.

A refractive index distribution generation device of the present embodiment includes a processor with hardware implementation and a memory with hardware implementation. The processor performs a refractive index distribution generation process of generating a refractive index distribution corresponding to a processing-target image. The refractive index distribution generation process includes an input process of inputting, from the memory, the processing-target image, first refractive index information indicating a refractive index of a first structure, and second refractive index information indicating a refractive index of a second structure different from the first structure, and a setting process of setting respective refractive indexes that constitute a refractive index distribution. The setting process includes a first setting process of setting a refractive index based on the first refractive index information at a position corresponding to a first image region of the processing-target image on the basis of a signal intensity of at least one unit pixel of the processing-target image, and a second setting process of setting a refractive index based on the second refractive index information at a position corresponding to an image region different from the first image region of the processing-target image. The first image region is an image region corresponding to the first structure. The at least one unit pixel is constituted of one or more pixels. The processor performs the refractive index distribution generation process, using an image obtained by capturing an image of a sample, as the processing-target image.

Figure 1B:
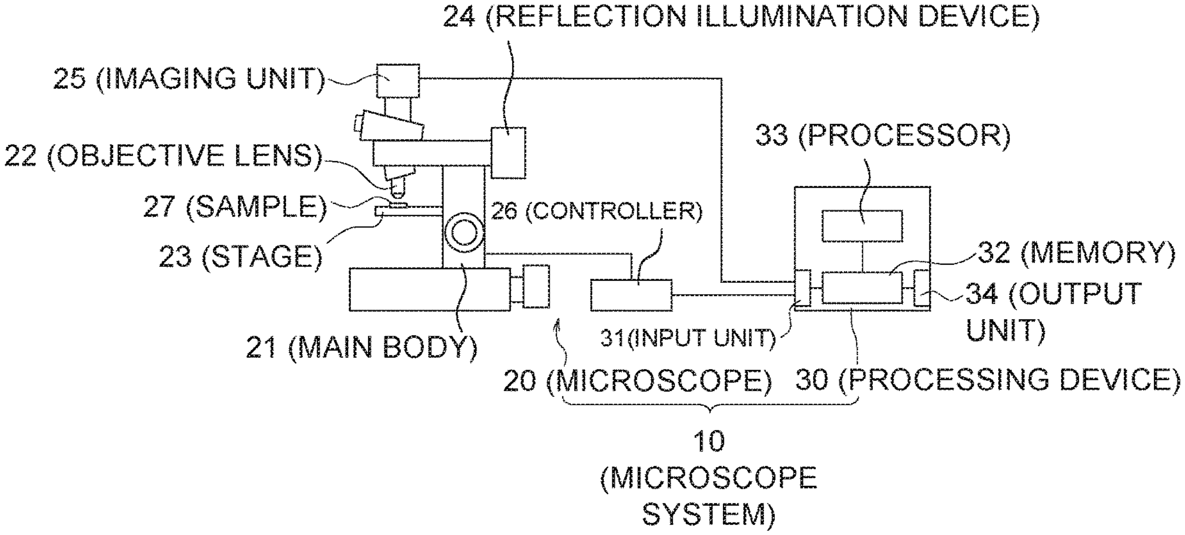

FIGS. 1A and 1B are diagrams illustrating the refractive index distribution generation device of the present embodiment, a microscope system, and an estimation system. FIG. 1A is a diagram illustrating the refractive index distribution generation device of the present embodiment. FIG. 1B is a diagram illustrating the microscope system.

As illustrated in FIG. 1A, a refractive index distribution generation device 1 includes a memory 2 and a processor 3. The memory 2 stores therein a processing-target image, first refractive index information, and second refractive index information. The first refractive index information is information indicating a refractive index of a first structure. The second refractive index information is information indicating a refractive index of a second structure. The second structure is different from the first structure.

The processing-target image is an image obtained by capturing an image of a sample. For example, it is possible to generate the processing-target image from a plurality of XY images (hereinafter referred to as "XY image group"). Each of the XY images in the XY image group is an image of an optical image of the sample.

To generate the processing-target image in the refractive index distribution generation device 1, it is necessary to input the XY image group to the refractive index distribution generation device 1. The input of the XY image group to the refractive index distribution generation device 1 is performed through an input unit 4. It is possible to acquire the XY images, for example, by a microscope system.

As illustrated in FIG. 1B, a microscope system 10 includes a microscope 20 and a processing device 30. The microscope 20 includes a main body 21, an objective lens 22, a stage 23, a reflection illumination device 24, an imaging unit 25, and a controller 26. The processing device 30 includes an input unit 31, a memory 32, a processor 33, and an output unit 34.

A sample 27 is placed on the stage 23. In the microscope 20, an optical image of the sample 27 is formed on an image plane of an observation optical system. When a lens is disposed in the imaging unit 25, the objective lens 22, an imaging lens, and the lens of the imaging unit 25 form the observation optical system. When no lens is disposed in the imaging unit 25, the objective lens 22 and an imaging lens form the observation optical system.

The imaging unit 25 includes an imager. The optical image formed on the image plane is captured by the imager whereby the image of the optical image is acquired. The optical image formed on the image plane is an optical image of an XY cross-section of the sample 27. Thus, the image of the optical image is an XY image.

The objective lens 22 and the stage 23 can be moved relative to each other along the optical axis of the observation optical system. It is possible to perform the movement of the objective lens 22 or the movement of the stage 23 by the controller 26. The sample 27 is a thick sample. Thus, by moving the objective lens 22 and the stage 23 relative to each other, it is possible to acquire XY images for a plurality of cross-sections. The XY image group will now be described.

Figure 2A:
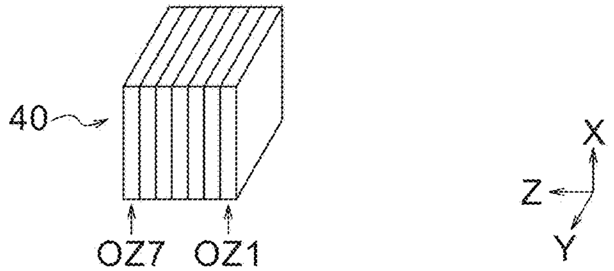
FIGS. 2A, 2B, 2C, 2D, and 2E are diagrams illustrating a sample, optical images, images of the optical images, and an XY image group.
Figure 2B:
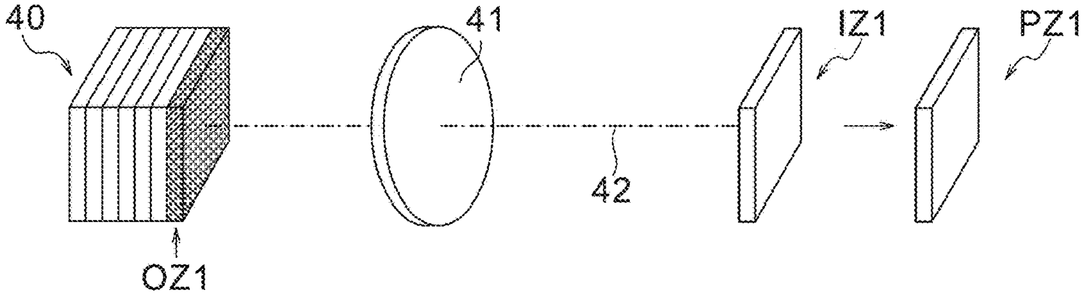
Figure 2C:
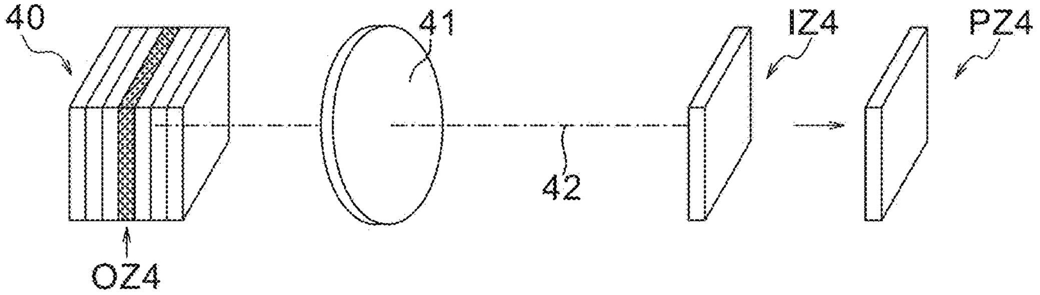
Figure 2D:
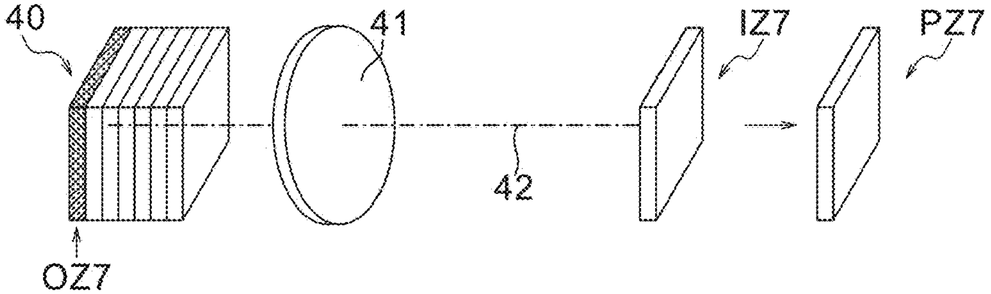
Figure 2E:
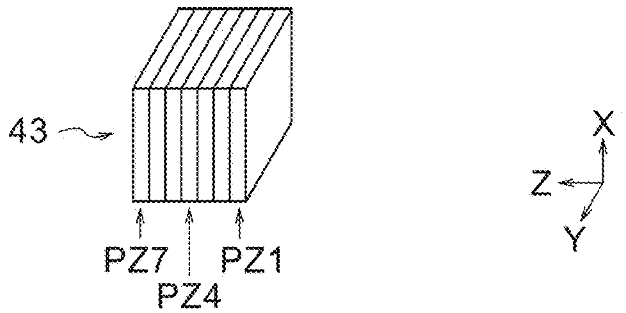

FIGS. 2A, 2B, 2C, 2D, and 2E are diagrams illustrating a sample, optical images, images of the optical images, and an XY image group. FIG. 2A is a diagram illustrating a sample. FIGS. 2B, 2C, and 2D are diagrams illustrating optical images and images of the optical images. FIG. 2E is a diagram illustrating an XY image group.

As illustrated in FIG. 2A, since a sample 40 is a three-dimensional object, it is possible to represent the sample 40 by a plurality of block layers. In FIG. 2A, the sample 40 is divided into seven block layers in the Z-axis direction. However, the number of block layers is not limited to seven. A sample OZ1 represents a block layer at one end, and a sample OZ7 represents a block layer at the other end. Each block layer represents an XY cross-section of the sample 40.

In formation of an optical image of the sample 40, the block layers from the sample OZ1 to the sample OZ7 are positioned sequentially in the focal plane of an observation optical system 41. Although the optical image is flat, the optical image is represented by a block layer for the sake of visibility. Furthermore, since the optical image is represented by a block layer, the image of the optical image is also represented by a block layer.

In formation of an optical image of the sample 40, the sample 40 and the observation optical system 41 are moved relative to each other along an optical axis 42. Here, the sample 40 is not moved, whereas the observation optical system 41 is moved relative to the sample 40 along the optical axis 42.

As illustrated in FIG. 2B, when the sample OZ1 is positioned at the focal plane of the observation optical system 41, an optical image IZ1 is formed. The optical image IZ1 is captured by the imager whereby an image PZ1 of the optical image is acquired.

As illustrated in FIG. 2C, when the sample OZ4 is positioned at the focal plane of the observation optical system 41, an optical image IZ4 is formed. The optical image IZ4 is captured by the imager whereby an image PZ4 of the optical image is acquired.

As illustrated in FIG. 2D, when the sample OZ7 is positioned at the focal plane of the observation optical system 41, an optical image IZ7 is formed. The optical image IZ7 is captured by the imager whereby an image PZ7 of the optical image is acquired.

The images PZ1, PZ4 and PZ7 are XY images. Two block layers are positioned between the images PZ1 and PZ4. Furthermore, two block layers are also positioned between the images PZ4 and PZ7. When the images of these block layers are denoted as an image PZ2, an image PZ3, an image PZ5, and an image PZ6, the image PZ2, the image PZ3, the image PZ5, and the image PZ6 are also XY images.

Since all of the images from the image PZ1 to the image PZ7 are XY images, it is possible to obtain an XY image group from these images. Furthermore, by stacking these images in the direction of the optical axis 42, it is possible to obtain a three-dimensional XY image group.

FIG. 2E illustrates a three-dimensional XY image group 43. The XY image group 43 has information on brightness in each of the X-axis direction, the Y-axis direction, and the Z-axis direction. Thus, it is possible to generate an XY image, an XZ image, and a YZ image from the XY image group 43.

As described above, the first image is generated from the XY image group. Thus, it is possible to use any of the XY image, the XZ image, and the YZ image as the processing-target image (first image).

Returning to FIG. 1B, the description continues. In the microscope 20, it is possible to mount a plurality of objective lenses on a revolver. By rotating the revolver, it is possible to change the magnification of the objective lens. It is possible to perform the rotation of the revolver by the controller 26.

The XY images are output from an image pickup unit 25 and input to a processing device 30. The XY image group is obtained from a plurality of XY images. The XY image group is input to an input unit 31 and then stored in a memory 32. The XY image group is output from an output unit 34. Thus, it is possible to input the XY image group to the refractive index distribution generation device 1. The XY image group is stored in the memory 2.

In the refractive index distribution generation device 1, a refractive index distribution generation process is performed by the processor 3. In the refractive index distribution generation process, a refractive index distribution corresponding to the processing-target image is generated.

Figure 3A:
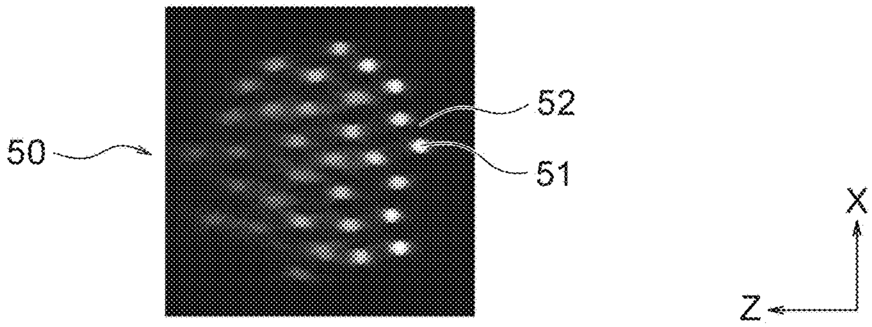
FIGS. 3A, 3B, 3C, and 3D are diagrams illustrating a processing-target image and a refractive index distribution image.
Figure 3B:
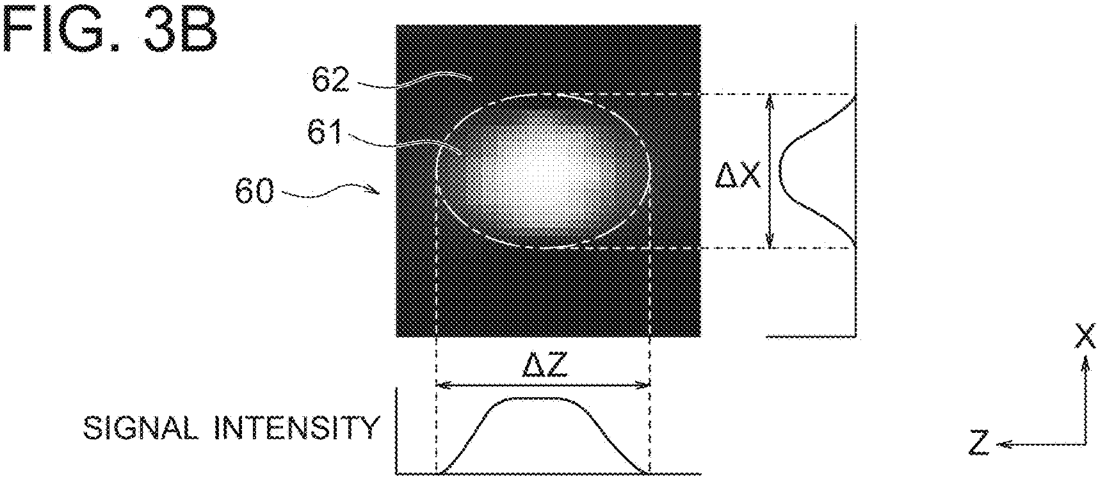
Figure 3C:
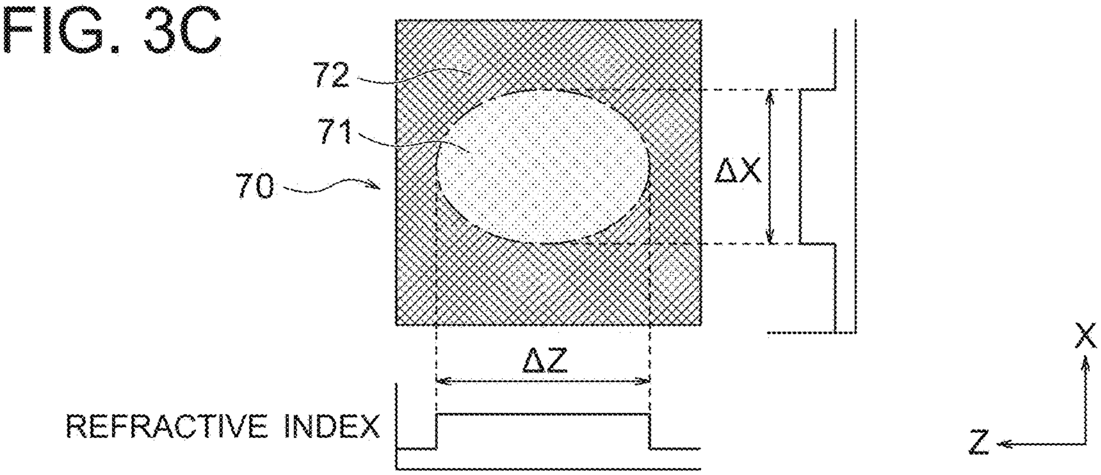
Figure 3D:
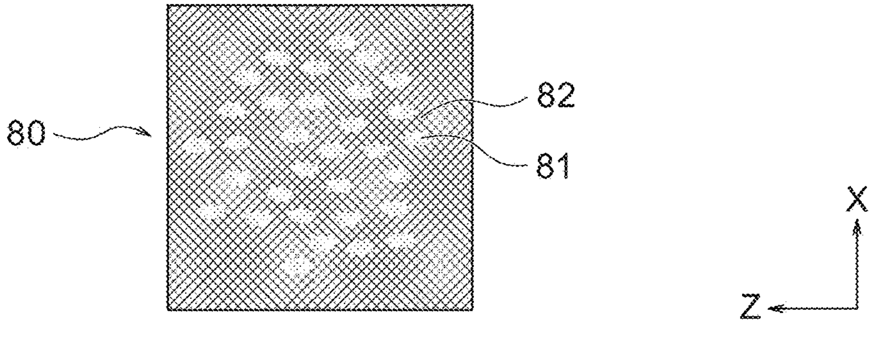

FIGS. 3A, 3B, 3C, and 3D are diagrams illustrating a processing-target image and a refractive index distribution image. FIG. 3A is a diagram illustrating a processing-target image. FIG. 3B is a diagram illustrating a part of the processing-target image. FIG. 3C is a diagram illustrating a part of a refractive index distribution image. FIG. 3D is a diagram illustrating the refractive index distribution image.

FIG. 3A illustrates a processing-target image. The sample includes a first structure and a second structure. The first structure and the second structure may be adjacent to each other, or another structure may be positioned between the first structure and the second structure. The first structure is stained with a fluorescent dye. The second structure is not stained with a fluorescent dye.

Since the first structure is stained with a fluorescent dye, a fluorescent image of the first structure is formed. The fluorescent image of the first structure is formed by fluorescence at a wavelength λ1. Since the second structure is not stained with a fluorescent dye, no fluorescent image of the second structure is formed.

An image 50 to be processed is an image of an optical image of the sample. The image 50 to be processed is an image acquired through an optical filter (hereinafter referred to as "optical filter Fλ1") that transmits only fluorescence at the wavelength λ1. The image 50 to be processed includes a first image region 51 and a second image region 52.

The first image region 51 is an image region corresponding to light transmitted through the optical filter Fλ1. Light that forms the fluorescent image of the first structure is fluorescence at the wavelength λ1 and therefore passes through the optical filter Fλ1. Thus, the first image region 51 is an image region corresponding to the first structure. Since the image 50 to be processed includes a plurality of images of the first structure, the image 50 to be processed includes a plurality of the first image regions 51.

The second image region 52 is an image region corresponding to light that does not pass through the optical filter Fλ1. Structures other than the first structure are denoted as a structure group A. The structure group A includes the second structure. Since a fluorescent image of the second structure is not formed, there is no light transmitted through the optical filter Fλ1. Thus, the second image region 52 is an image region corresponding to the structure group A. Since the structure group A is different from the first structure, the second image region 52 is different from the first image region 51.

Figure 4:
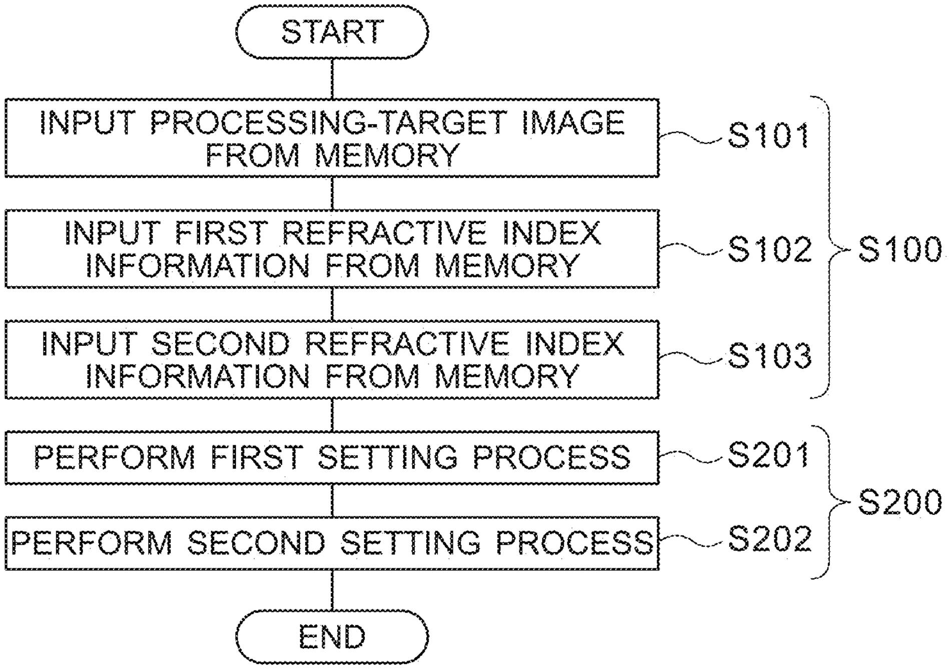
FIG. 4 is a flowchart of processing performed by a processor.

FIG. 4 is a flowchart of the processing performed by the processor. In the processor 3, the refractive index distribution generation process is performed. The refractive index distribution generation process includes an input process and a setting process.

At step S100, the input process is performed. Step S100 includes step S101, step S102, and step S103.

At step S101, the processing-target image is input from the memory. At step S102, the first refractive index information is input from the memory. At step S103, the second refractive index information is input from the memory. The first refractive index information is information indicating a refractive index of the first structure. The second refractive index information is information indicating a refractive index of the second structure. Upon completion of step S100, step S200 is performed.

At step S200, the setting process is performed. In the setting process, respective refractive indexes that constitute a refractive index distribution is set. Step S200 includes step S201 and step S202.

At step S201, a first setting process is performed. In the first setting process, a refractive index based on the first refractive index information is set at a position corresponding to the first image region of the processing-target image on the basis of the signal intensity of at least one unit pixel of the processing-target image. The unit pixel is constituted of one or more pixels. Upon completion of step S201, step S202 is performed.

At step S202, a second setting process is performed. In the second setting process, a refractive index based on the second refractive index information is set at a position corresponding to an image region different from the first image region of the processing-target image.

FIG. 3B illustrates an enlarged image of a part of the processing-target image, the signal intensity in the Z-axis direction, and the signal intensity in the X-axis direction. In FIG. 3B, the first image region is depicted by an oval for the sake of visibility. In actuality, however, the first image region has a complex shape.

An image 60 to be processed includes a first image region 61 and a second image region 62. The second image region 62 is different from the first image region 61.

The first image region 61 is the first image region 51 in FIG. 3A. Since the first image region 51 is an image region corresponding to the first structure, the first image region 61 is an image region corresponding to the first structure. The second image region 62 is the second image region 52 in FIG. 3A. Since the second image region 52 is an image region corresponding to the structure group A, the second image region 62 is an image region corresponding to the structure group A.

It is possible to obtain the first image region 61 on the basis of the signal intensity of at least one unit pixel of the image 60 to be processed. The unit pixel is constituted of one or more pixels. When the unit pixel is a single pixel, the first image region 61 is obtained on the basis of an intensity signal of the single pixel. When the unit pixel is a plurality of pixels, the first image region 61 is obtained on the basis of intensity signals of the plurality of pixels.

In the image 60 to be processed, a signal intensity greater than zero is used as the signal intensity of at least one unit pixel. In FIG. 3B, $\Delta Z$ and $\Delta X$ indicate a region of the unit pixel having a signal intensity greater than zero.

In the unit pixel that forms the first image region 61, the signal intensity is greater than zero. The second image region 62 is a region excluding the first image region 61. Thus, in the unit pixel that forms the second image region 62, the signal intensity is zero.

Since the first image region 61 is a region depicted by an oval, the position of the first image region 61 is obtained from the position of the oval. Since the second image region 62 is a region excluding the first image region 61, the position of the second image region 62 is obtained if the position of the first image region 61 is obtained.

In the first and second setting processes, a refractive index is set. The processing-target image is an image of an optical image of the sample. Since the image of the optical image of the sample is an image formed by brightness information, it is impossible to set a refractive index. A refractive index therefore can be set in an image different from the processing-target image, for example, a refractive index distribution image.

FIG. 3C illustrates an enlarged image of a part of the refractive index distribution image, the refractive index distribution in the Z-axis direction, and the refractive index distribution in the X-axis direction. A refractive index distribution image 70 includes a first refractive index region 71 and a second refractive index region 72.

Since the refractive index distribution image 70 is an image represented by refractive indexes, it is possible to set a refractive index based on the first refractive index information and a refractive index based on the second refractive index information. A region in which a refractive index based on the first refractive index information is to be set and a region in which a refractive index based on the second refractive index information is to be set are necessary to set refractive indexes.

The first refractive index information is information indicating a refractive index of the first structure. The image region corresponding to the first structure is the first image region 61. To set the refractive index based on the first refractive index information, a region corresponding to the first image region 61 can be obtained in the refractive index distribution image 70.

The second refractive index information is information indicating a refractive index of the second structure. The second structure is included in the structure group A. The image region corresponding to the structure group A is the second image region 62. To set the refractive index based on the second refractive index information, a region corresponding to the second image region 62 can be obtained in the refractive index distribution image 70.

In FIG. 3C, the first refractive index region 71 is a region corresponding to the first image region 61. Thus, the refractive index based on the first refractive index information can be set in the first refractive index region 71.

Furthermore, the second refractive index region 72 is a region corresponding to the second image region 62. Since the second image region 62 is an image region corresponding to the structure group A, the second refractive index region 72 is an image region corresponding to the structure group A. The structure group A includes the second structure. Thus, the refractive index based on the second refractive index information can be set in the second refractive index region 72.

To set the refractive index based on the first refractive index information in the first refractive index region 71, it is necessary to obtain the position of the first refractive index region 71. The first refractive index region 71 corresponds to the first image region 61. The position of the first image region 61 is obtained on the basis of the signal intensity of at least one unit pixel of the image 60 to be processed. Thus, the position of the first refractive index region 71 can be obtained on the basis of the signal intensity of at least one unit pixel of the image 60 to be processed. The refractive index based on the first refractive index information can be set at the thus obtained position.

To set the refractive index based on the second refractive index information in the second refractive index region 72, it is necessary to obtain the position of the second refractive index region 72. The second refractive index region 72 corresponds to the second image region 62. Since the second image region 62 is a region excluding the first image region 61, the position of the second refractive index region 72 is obtained if the position of the first refractive index region 71 is obtained. The refractive index based on the second refractive index information can be set at the thus obtained position.

FIG. 3D illustrates a refractive index distribution image 80. The refractive index distribution image 80 includes a first refractive index region 81 and a second refractive index region 82. The refractive index distribution image 80 is an image corresponding to the image 50 to be processed. The image 50 to be processed includes the first image regions 51. Thus, the refractive index distribution image 80 also includes a plurality of first refractive index regions 81.

In the processor 3, the refractive index distribution generation process is performed using the image 50 to be processed. The image 50 to be processed is an image obtained by capturing an optical image of the sample. In the processor 3, the refractive index distribution generation process is performed using the captured image of the sample as the processing-target image. As a result, in the refractive index distribution generation device of the present embodiment, it is possible to improve the accuracy of a refractive index distribution even for a thick sample.

The sample is, for example, a mass of cells. The mass of cells includes a plurality of cells. Cell adhesion molecules are present between neighboring cells. The cells each have a cell nucleus, cytoplasm, and cell membrane. When the sample is a mass of cells, the sample has cell nuclei, cytoplasm, cell membrane, and cell adhesion molecules.

The sample includes a first structure and a second structure. It is assumed that the first structure is a cell nucleus and the second structure is cytoplasm. It is assumed that cellular structures other than cell nuclei are a cell structure group A. The cell structure group A includes cytoplasm, cell membrane, and cell adhesion molecules.

As described above, the structure group A is a structure other than the first structure and includes the second structure. The cell structure group A is cell structures other than cell nuclei and includes cytoplasm. Thus, when the sample is a mass of cells, the cell structure group A corresponds to the structure group A.

When only the cell nucleus is stained with a fluorescent dye, a fluorescent image of the cell nucleus is formed. Since the mass of cells includes a plurality of cell nuclei, a plurality of fluorescent images are formed. The first image region 51 is an image region corresponding to the first structure. Since the first structure is a cell nucleus, the first image regions 51 represent image regions corresponding to a plurality of cell nuclei.

Since the cell structure group A is not stained with a fluorescent dye, no fluorescent image is formed. The second image region 52 is an image region corresponding to the structure group A. Since the cell structure group A corresponds to the structure group A, the second image region 52 represents an image region corresponding to the cell structure group A.

Since the first structure is a cell nucleus, the refractive index of the cell nucleus can be set in the first refractive index region 81. Since the cell structure group A corresponds to the structure group A, the refractive index of the cell structure group A can be set in the second refractive index region 82. As described above, the cell structure group A includes cytoplasm, cell membrane, and cell adhesion molecules. Since the region of cell membrane and the region of cell adhesion molecules are narrow, the refractive index of cytoplasm can be set in the second refractive index region 82.

The sample may be other than biological samples. For example, the sample may be a foreign object or solder on a semiconductor substrate. In the refractive index distribution generation device of the present embodiment, it is possible to improve the accuracy of a refractive index distribution in a foreign object or solder on a semiconductor substrate.

In the refractive index distribution generation device of the present embodiment, it is preferable that the first setting process sets a refractive index based on the first refractive index information at a position corresponding to the first image region constituted of a first unit pixel having a signal intensity value greater than a threshold, of the at least one unit pixel, and the second setting process sets a refractive index based on the second refractive index information at a position corresponding to an image region constituted of a second unit pixel having a signal intensity value equal to or smaller than the threshold, of the at least one unit pixel.

Figure 5A:
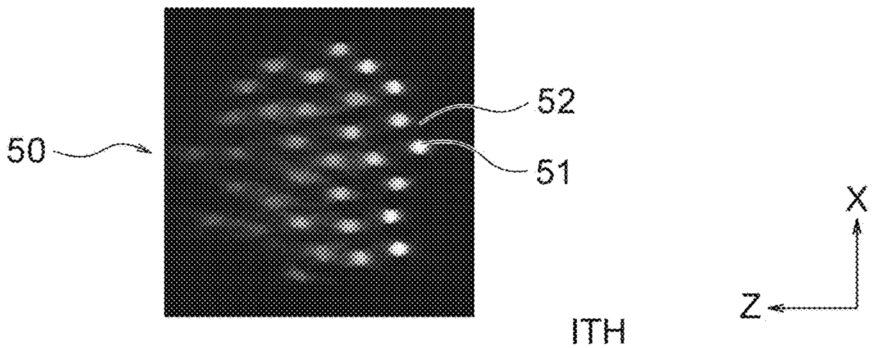
FIGS. 5A, 5B, 5C, and 5D are diagrams illustrating a processing-target image and a refractive index distribution image.
Figure 5B:
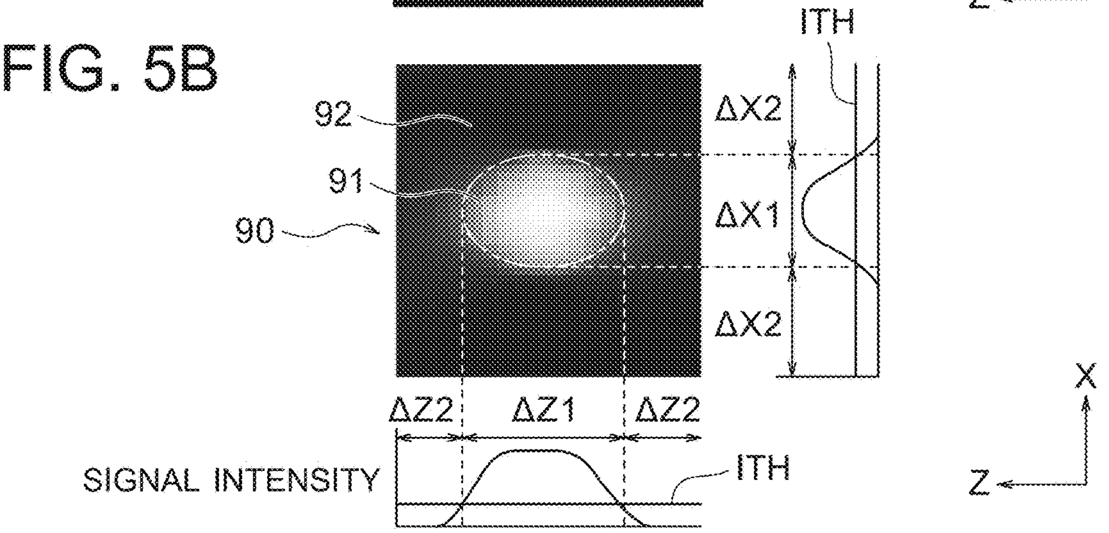
Figure 5C:
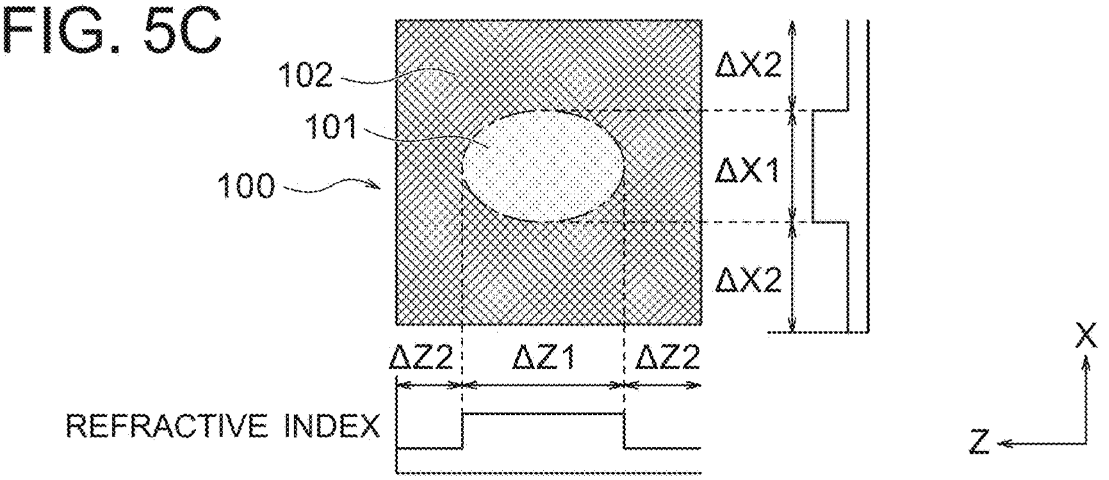
Figure 5D:
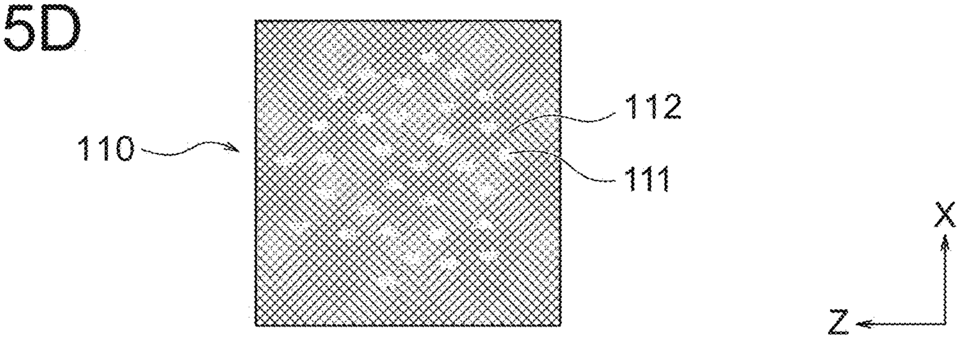

FIGS. 5A, 5B, 5C, and 5D are diagrams illustrating a processing-target image and a refractive index distribution image. FIG. 5A is a diagram illustrating a processing-target image. FIG. 5B is a diagram illustrating a part of the processing-target image. FIG. 5C is a diagram illustrating a part of a refractive index distribution image. FIG. 5D is a diagram illustrating the refractive index distribution image. FIG. 5A is the same as FIG. 3A, so a description of FIG. 5A is omitted.

In the first setting process, a refractive index based on the first refractive index information is set at a position corresponding to the first image region constituted of a first unit pixel having a signal intensity value greater than a threshold, of the at least one unit pixel.

In the second setting process, a refractive index based on the second refractive index information is set at a position corresponding to an image region constituted of a second unit pixel having a signal intensity value equal to or smaller than the threshold, of the at least one unit pixel.

FIG. 5B illustrates an enlarged image of a part of the processing-target image, the signal intensity in the Z-axis direction, and the signal intensity in the X-axis direction. In FIG. 5B, the first image region is depicted by an oval for the sake of visibility. In actuality, however, the first image region has a complex shape.

An image 90 to be processed includes a first image region 91 and a second image region 92. The second image region 92 is different from the first image region 91.

The first image region 91 is the first image region 51 in FIG. 5A. Since the first image region 51 is an image region corresponding to the first structure, the first image region 91 is an image region corresponding to the first structure. The second image region 92 is the second image region 52 in FIG. 5A. Since the second image region 52 is an image region corresponding to the structure group A, the second image region 92 is an image region corresponding to the structure group A.

It is possible to obtain the first image region 91 on the basis of the signal intensity of the first unit pixel. In the image 90 to be processed, among the signal intensities of at least one unit pixel, a signal intensity greater than a threshold ITH is used as the signal intensity of the first unit pixel. In FIG. 5B, ΔZ1 and ΔX1 indicate the region of the first unit pixel.

It is possible to obtain the second image region 92 on the basis of the signal intensity of the second unit pixel. In the image 90 to be processed, among the signal intensities of at least one unit pixel, a signal intensity equal to or smaller than the threshold ITH is used as the signal intensity of the second unit pixel. In FIG. 5B, ΔZ2 and λX2 indicate the region of the second unit pixel.

Since the first image region 91 is a region depicted by an oval, the position of the first image region 91 is obtained from the position of the oval. Since the second image region 92 is a region excluding the first image region 91, the position of the second image region 92 is obtained if the position of the first image region 91 is obtained.

In the first and second setting processes, a refractive index is set. As described above, the refractive index can be set in an image different from the processing-target image, for example, a refractive index distribution image.

FIG. 5C illustrates an enlarged image of a part of the refractive index distribution image, the refractive index distribution in the Z-axis direction, and the refractive index distribution in the X-axis direction. A refractive index distribution image 100 includes a first refractive index region 101 and a second refractive index region 102.

Since the refractive index distribution image 100 is an image represented by refractive indexes, it is possible to set a refractive index based on the first refractive index information and a refractive index based on the second refractive index information. A region in which a refractive index based on the first refractive index information is to be set and a region in which a refractive index based on the second refractive index information is to be set are necessary to set refractive indexes.

The first refractive index information is information indicating a refractive index of the first structure. The image region corresponding to the first structure is the first image region 91. To set the refractive index based on the first refractive index information, a region corresponding to the first image region 91 can be obtained in the refractive index distribution image 100.

The second refractive index information is information indicating a refractive index of the second structure. The second structure is included in the structure group A. The image region corresponding to the structure group A is the second image region 92. To set the refractive index based on the second refractive index information, a region corresponding to the second image region 92 can be obtained in the refractive index distribution image 100.

In FIG. 5C, the first refractive index region 101 is a region corresponding to the first image region 91. Thus, the refractive index based on the first refractive index information can be set in the first refractive index region 101.

Furthermore, the second refractive index region 102 is a region corresponding to the second image region 92. Since the second image region 92 is an image region corresponding to the structure group A, the second refractive index region 102 is an image region corresponding to the structure group A. The structure group A includes the second structure. Thus, the refractive index based on the second refractive index information can be set in the second refractive index region 102.

To set the refractive index based on the first refractive index information in the first refractive index region 101, it is necessary to obtain the position of the first refractive index region 101. The first refractive index region 101 corresponds to the first image region 91. The position of the first image region 91 is obtained on the basis of the signal intensity of at least one unit pixel of the image 90 to be processed, that is, the signal intensity greater than the threshold ITH. Thus, the position of the first refractive index region 101 can be obtained on the basis of the signal intensity greater than the threshold ITH. The refractive index based on the first refractive index information can be set at the thus obtained position.

To set the refractive index based on the second refractive index information in the second refractive index region 102, it is necessary to obtain the position of the second refractive index region 102. The second refractive index region 102 corresponds to the second image region 92. The position of the second image region 92 is obtained on the basis of the signal intensity of the at least one unit pixel of the image 90 to be processed, that is, the signal intensity equal to or smaller than the threshold ITH. Thus, the position of the second refractive index region 102 can be obtained on the basis of the signal intensity equal to or smaller than the threshold ITH. The refractive index based on the second refractive index information can be set at the thus obtained position.

FIG. 5D illustrates a refractive index distribution image 110. The refractive index distribution image 110 includes a first refractive index region 111 and a second refractive index region 112. The refractive index distribution image 110 is an image corresponding to the image 50 to be processed. The image 50 to be processed includes a plurality of first image regions 51. Thus, the refractive index distribution image 110 also includes a plurality of first refractive index regions 111.

In the processor 3, the refractive index distribution generation process is performed using the image 50 to be processed. The image 50 to be processed is an image obtained by capturing an optical image of the sample. In the processor 3, the refractive index distribution generation process is performed using the captured image of the sample as the processing-target image.

In the refractive index distribution generation device of the present embodiment, it is preferable that the refractive index distribution generation process includes a first correction process of enhancing brightness of a deep position in the sample relative to brightness of a shallow position in the sample, and the first setting process sets a refractive index based on the first refractive index information on the basis of a signal intensity of the at least one unit pixel of the processing-target image in which the brightness of the deep position is enhanced. The processing-target image is an image in which the sample has a depth increasing along a direction from one end toward the other end, and the one end is opposite the other end across a center of the processing-target image.

Figure 6:
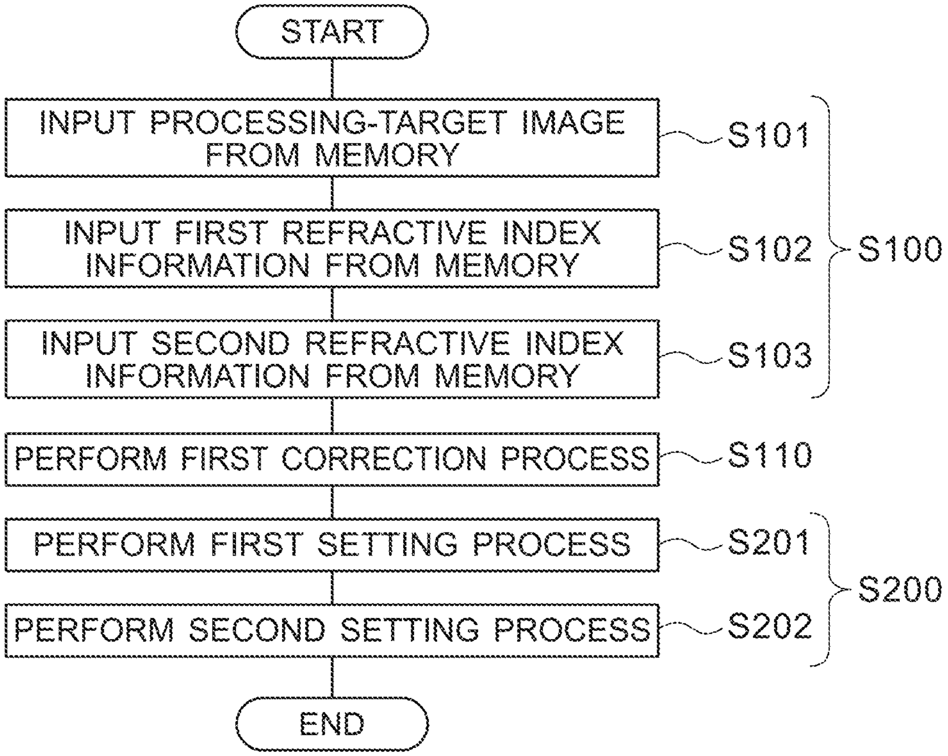
FIG. 6 is a flowchart of processing performed by the processor.

FIG. 6 is a flowchart of the processing performed by the processor. A description of the same processing as the processing illustrated in FIG. 4 is omitted.

The refractive index distribution generation process includes the input process, the first setting process, the second setting process, and the first correction process. The first correction process is performed before the first setting process is performed.

At step S110, the first correction process is performed. The processing-target image in the first correction process is an image in which the sample has a depth increasing along a direction from one end toward the other end. The one end is opposite the other end across the center of the processing-target image. In the first correction process, the brightness of a deep position in the sample is enhanced relative to the brightness of a shallow position in the sample.

Figure 7A:
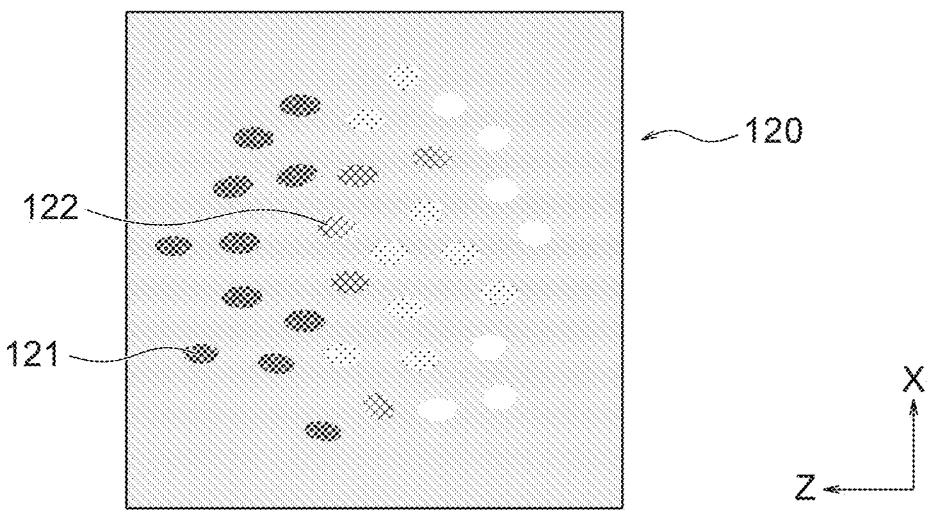
FIGS. 7A, 7B, 7C, and 7D are diagrams illustrating a processing-target image.
Figure 7B:
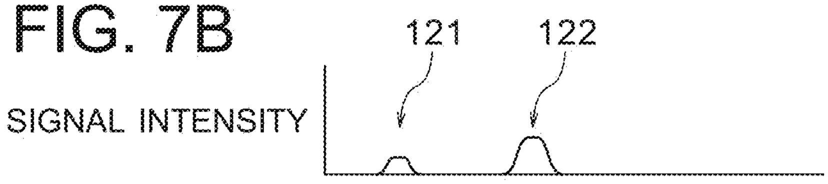
Figure 7C:
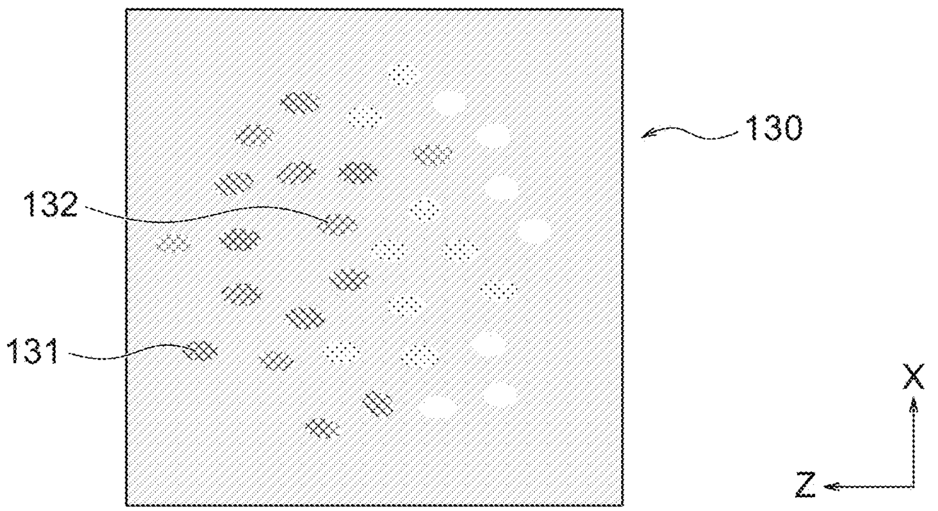
Figure 7D:
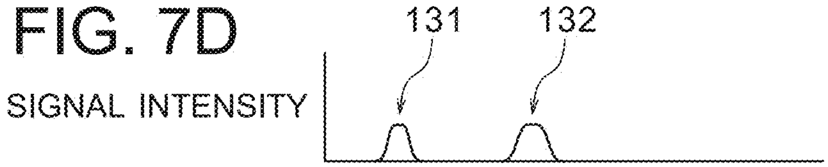

FIGS. 7A, 7B, 7C, and 7D are diagrams illustrating a processing-target image. FIG. 7A is a diagram illustrating a processing-target image in a state before the first correction. FIG. 7B is a diagram illustrating a signal intensity in the state before the first correction. FIG. 7C is a diagram illustrating the processing-target image in a state after the first correction. FIG. 7D is a diagram illustrating a signal intensity in the state after the first correction. The state before the first correction is a state before the first correction process is performed. The state after the first correction is a state after the first correction process is performed.

It is assumed that the side closer to an observation optical system is the top surface side of the sample and the side farther from the observation optical system is the bottom surface side of the sample. Since an image 120 to be processed is an XZ image, in the image 120 to be processed, the right end of the image represents the image of the top surface of the sample, and the left end of the image represents the image of the bottom surface of the sample. The depth of the sample increases from the right end of the image toward the left end of the image. The image 120 to be processed includes a first image region 121 and a second image region 122.

The depth from the top surface of the sample increases toward the left end of the image. As illustrated in FIG. 7A, the first image region 121 is positioned on the left side of the second image region 122. Thus, the first image region 121 is positioned deeper than the second image region 122 is.

The image 120 to be processed as illustrated in FIG. 7A is an image in a state before the first correction. In the image 120 to be processed, which is in the state before the first correction process is performed, the brightness of the first image region 121 is darker than the brightness of the second image region 122. Since the brightness is represented by a signal intensity, as illustrated in FIG. 7B, the signal intensity of the first image region 121 is smaller than the signal intensity of the second image region 122.

In FIG. 7A, the brightness of the first image region 121 and the brightness of the second image region 122 are each depicted with uniform brightness, for the sake of visibility. However, as illustrated in FIG. 7B, the brightness of the first image region 121 and the brightness the second image region 122 are each not uniform.

An image 130 to be processed as illustrated in FIG. 7C is an image in a state after the first correction. The image 130 to be processed includes a first image region 131 and a second image region 132. The first image region 131 corresponds to the first image region 121, and the second ima122.

In the image 130 to be processed, which is in the state after the first correction process is performed, the brightness of the first image region 131 is the same as the brightness of the second image region 132. Since the brightness is represented by a signal intensity, as illustrated in FIG. 7D, the signal intensity of the first image region 131 is the same as the signal intensity of the second image region 132. The brightness of the first image region 131 and the brightness the second image region 132 are each not uniform.

The depth of the first image region 131 is deeper than the depth of the second image region 132. In the image 130 to be processed, the brightness of a deep position in the sample is enhanced relative to the brightness of a shallow position in the sample. Upon completion of step S110, step S201 is performed.

Step S201 is the first setting process. Since the first correction process has been performed, the first setting process is performed on the image 130 to be processed. In the first setting process, a refractive index is set on the basis of the signal intensity of at least one unit pixel of the image 130 to be processed.

The image 130 to be processed is a processing-target image in which the brightness of a deep position is enhanced. Thus, at step S201, a refractive index is set on the basis of the signal intensity of at least one unit pixel of the processing-target image in which the brightness of a deep position is enhanced.

In the image 120 to be processed and the image 130 to be processed, the first image region is drawn as an oval, for the sake of convenience. However, in actuality, the shape of the first image region is a complex shape as is clear from the shape of the first image region of the image 50 to be processed.

In the refractive index distribution generation device of the present embodiment, it is preferable that the refractive index distribution generation process includes a second correction process of correcting the first refractive index information on the basis of a signal intensity of the first unit pixel and generating corrected refractive index information, the second correction process generates the corrected refractive index information in which a refractive index corresponding to the first unit pixel having the signal intensity smaller than a maximum signal intensity is smaller than a refractive index corresponding to the at least one unit pixel having the maximum signal intensity in the first unit pixel, and the first setting process sets a refractive index indicated by the corrected refractive index information at a position corresponding to the first image region.

Figure 8:
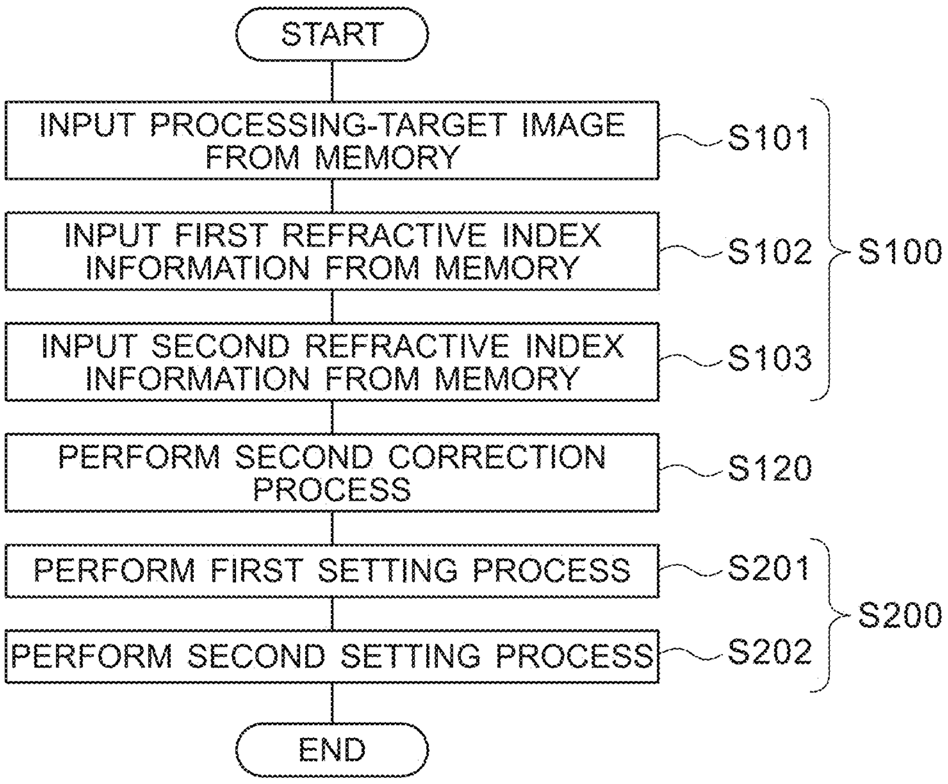
FIG. 8 is a flowchart of processing performed by the processor.

FIG. 8 is a flowchart of the processing performed by the processor. A description of the same processing as the processing illustrated in FIG. 4 is omitted.

The refractive index distribution generation process includes the input process, the first setting process, the second setting process, and a second correction process. The second correction process is performed before the first setting process is performed.

At step S120, the second correction process is performed. In the second correction process, the first refractive index information is corrected on the basis of the signal intensity of the first unit pixel, and corrected refractive index information is generated.

Figure 9A:
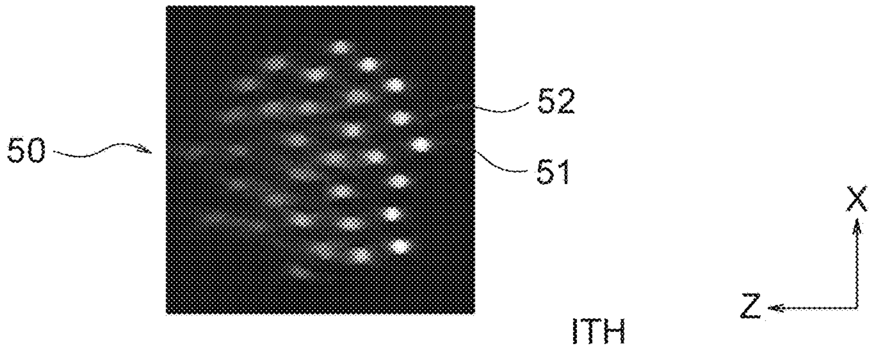
FIGS. 9A, 9B, 9C, and 9D are diagrams illustrating a processing-target image and a refractive index distribution image.
Figure 9B:
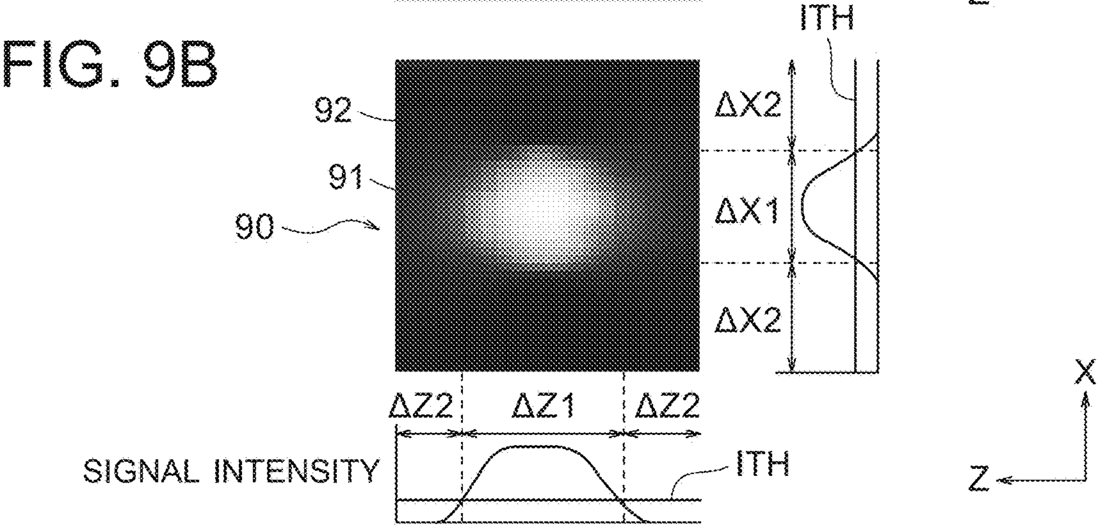
Figure 9C:
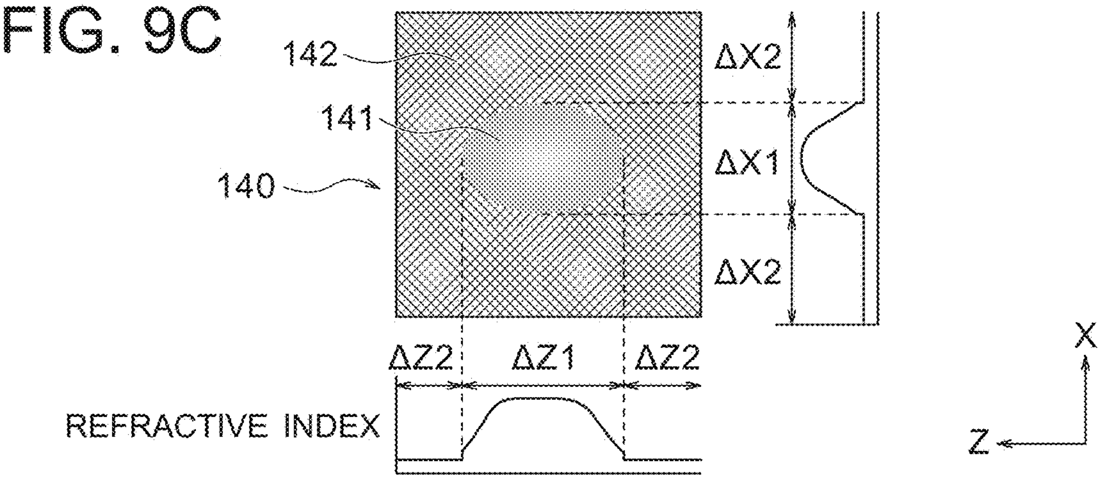
Figure 9D:
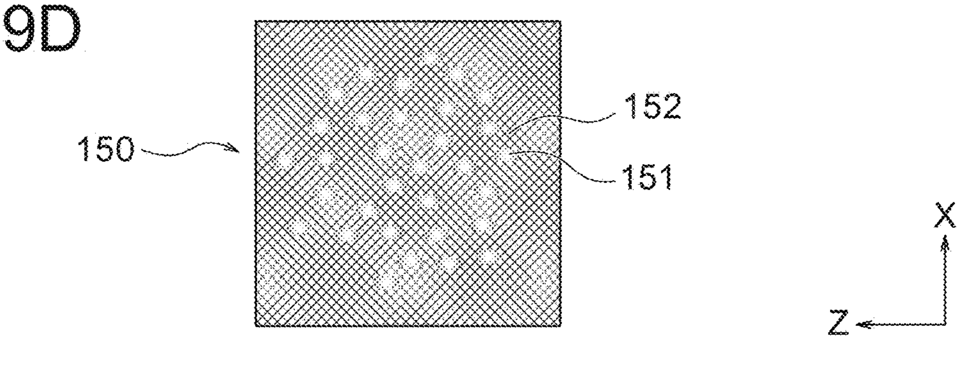

FIGS. 9A, 9B, 9C, and 9D are diagrams illustrating a processing-target image and a refractive index distribution image. FIG. 9A is a diagram illustrating a processing-target image. FIG. 9B is a diagram illustrating a part of the processing-target image. FIG. 9C is a diagram illustrating a part of a refractive index distribution image. FIG. 9D is a diagram illustrating the refractive index distribution image. FIG. 9A is the same as FIG. 5A and FIG. 9B is the same as FIG. 5B, so a description of FIG. 9A and FIG. 9B is omitted.

The first unit pixel is a pixel having a signal intensity greater than the threshold ITH among the signal intensities of at least one unit pixel. As illustrated in FIG. 9B, it is possible to obtain the first image region 91 on the basis of the signal intensity of the first unit pixel.

In FIG. 9B, ΔZ1 and ΔX1 indicate the region of the first unit pixel. The region of the first unit pixel includes a unit pixel having a maximum signal intensity and a unit pixel having a signal intensity smaller than the maximum signal intensity.

In the second correction process, the corrected refractive index information is generated. In generation of the corrected refractive index information, a signal intensity Imax, a signal intensity ITH, a refractive index n1, and a refractive index n2 are used. The signal intensity Imax is the maximum signal intensity in the region of the first unit pixel. The signal intensity ITH is the signal intensity at the threshold. Furthermore, the refractive index n1 is smaller than the refractive index n2.

In generation of the corrected refractive index information, the refractive index n1 is associated with the signal intensity ITH, and the refractive index n2 is associated with the signal intensity Imax. By performing such association, it is possible to associate the refractive index from the refractive index n1 to the refractive index n2 with the signal intensity from the signal intensity ITH to the signal intensity Imax in a one-to-one relationship. As a result, it is possible to represent the corrected refractive index information by refractive indexes from the refractive index n1 to the refractive index n2.

For example, it is assumed that in the first refractive index information, refractive index information is formed of the refractive index n2 alone. In this case, the number of refractive indexes in the first refractive index information is one. In contrast, there are a plurality of refractive indexes in the corrected refractive index information. Thus, the corrected refractive index information can be considered as information in which the first refractive index information is corrected with finer refractive indexes. Upon completion of step S120, step S201 is performed.

At step S201, the first setting process is performed. In the first setting process, a refractive index is set. As described above, the refractive index can be set in an image different from the processing-target image, for example, a refractive index distribution image.

FIG. 9C illustrates an enlarged image of a part of the refractive index distribution image, the refractive index distribution in the Z-axis direction, and the refractive index distribution in the X-axis direction. A refractive index distribution image 140 includes a first refractive index region 141 and a second refractive index region 142.

Since the refractive index distribution image 140 is an image represented by refractive indexes, it is possible to set a refractive index based on the corrected refractive index information. A region in which a refractive index based on the corrected refractive index information is to be set is necessary to set refractive indexes.

The corrected refractive index information is information obtained by correcting the first refractive index information. The first refractive index information is information indicating a refractive index of the first structure. The image region corresponding to the first structure is the first image region 91. To set the refractive index based on the corrected refractive index information, a region corresponding to the first image region 91 can be obtained in the refractive index distribution image 140.

In FIG. 9C, the first refractive index region 141 is a region corresponding to the first image region 91. Furthermore, the second refractive index region 142 is a region corresponding to the second image region 92. Thus, the refractive index based on the corrected refractive index information can be set in the first refractive index region 141.

To set the refractive index based on the corrected refractive index information in the first refractive index region 141, it is necessary to obtain the position of the first refractive index region 141. The first refractive index region 141 corresponds to the first image region 91. The position of the first image region 91 is obtained on the basis of the signal intensity of at least one unit pixel of the image 90 to be processed, that is, the signal intensity greater than the threshold ITH. Thus, the position of the first refractive index region 141 can be obtained on the basis of the signal intensity greater than the threshold ITH. The refractive index based on the corrected refractive index information can be set at the thus obtained position.

FIG. 9D illustrates a refractive index distribution image 150. The refractive index distribution image 150 includes a first refractive index region 151 and a second refractive index region 152. The refractive index distribution image 150 is an image corresponding to the image 50 to be processed. The image 50 to be processed includes a plurality of first image regions 51. Thus, the refractive index distribution image 150 also includes a plurality of first refractive index regions 151.

When the signal intensity ITH is zero, a refractive index based on the corrected refractive index information is set in the first refractive index region 71 illustrated in FIG. 3C. In this case, it is possible to represent the first refractive index region 71 by refractive indexes from the refractive index n1 to the refractive index n2.

In the refractive index distribution generation device of the present embodiment, it is preferable that the refractive index distribution generation process includes a first correction process of enhancing brightness of a deep position in the sample relative to brightness of a shallow position in the sample, and the first setting process corrects the first refractive index information corresponding to the first image region of the processing-target image in which the brightness of the deep position is enhanced, and generates the corrected refractive index information. The processing-target image is an image in which the sample has a depth increasing along a direction from one end toward the other end, and the one end is opposite the other end across a center of the processing-target image.

Figure 10:
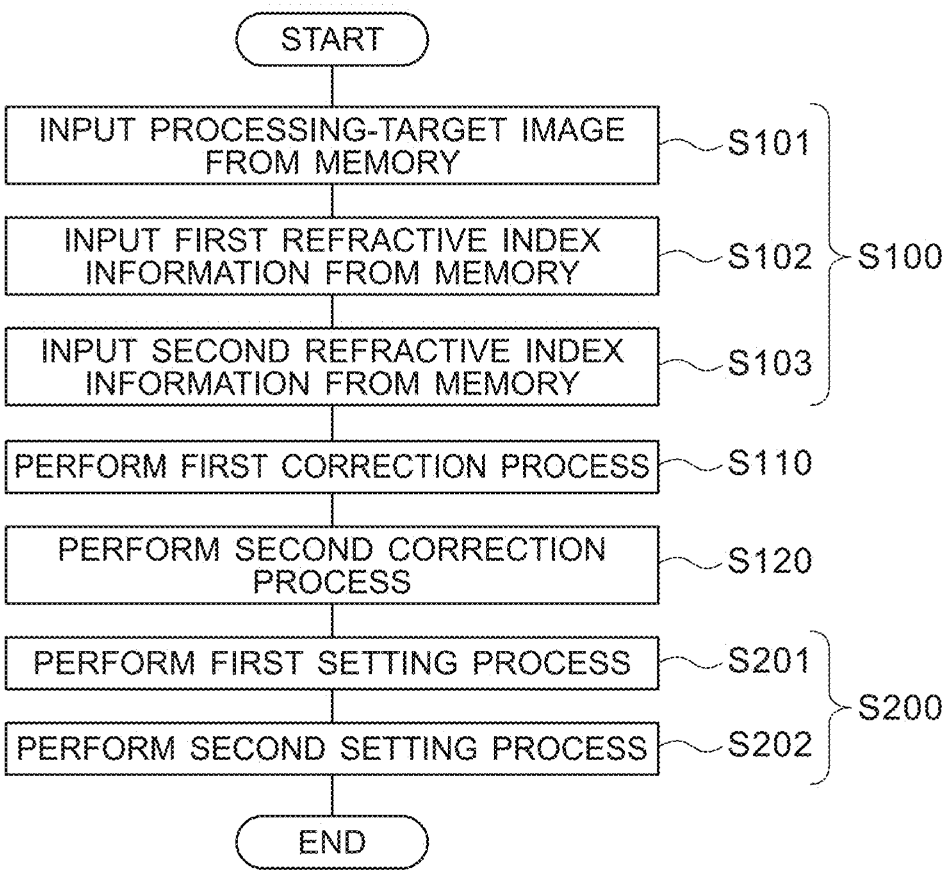
FIG. 10 is a flowchart of processing performed by the processor.

FIG. 10 is a flowchart of the processing performed by the processor. A description of the same processing as the processing illustrated in FIG. 6 and FIG. 8 is omitted.

At step S110, the first correction process is performed. In the first correction process, the brightness of the first image region at a deep depth from the top surface is enhanced relative to the brightness of the first image region at a shallow depth from the top surface. As a result, the first image region having brightness improved is obtained. Upon completion of step S110, step S120 is performed.

At step S120, the second correction process is performed. In the first correction process, the first image region having brightness improved is obtained. Thus, in the second correction process, the first refractive index information corresponding to the first image region having brightness improved is corrected, and corrected refractive index information is generated. Upon completion of step S120, step S201 is performed.

At step S201, the first setting process is performed. The corrected refractive index information has been generated in the second correction process. Thus, in the first setting process, a refractive index indicated by the corrected refractive index information is set at a position corresponding to the first image region having brightness improved.

In the refractive index distribution generation device of the present embodiment, it is preferable that the first setting process sets a refractive index indicated by the first refractive index information at a position corresponding to the first image region constituted of the first unit pixel.

Figure 11A:
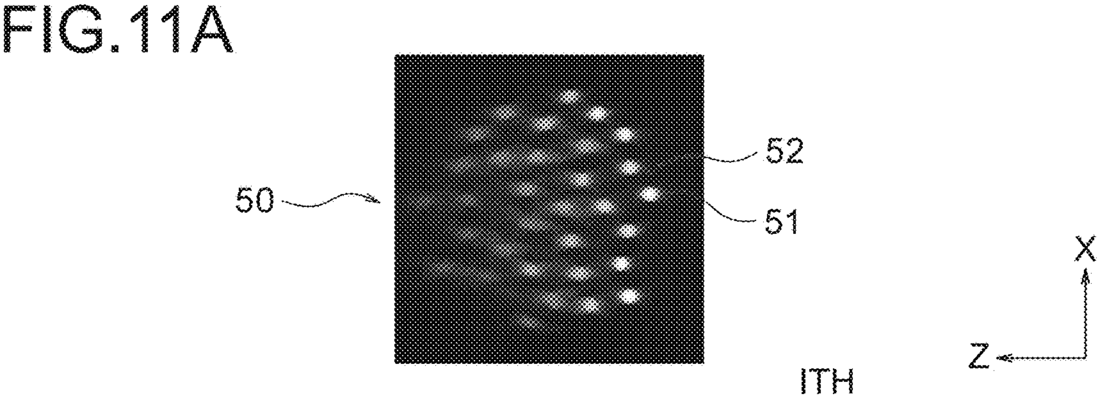
FIGS. 11A, 11B, 11C, and 11D are diagrams illustrating a processing-target image.
Figure 11B:
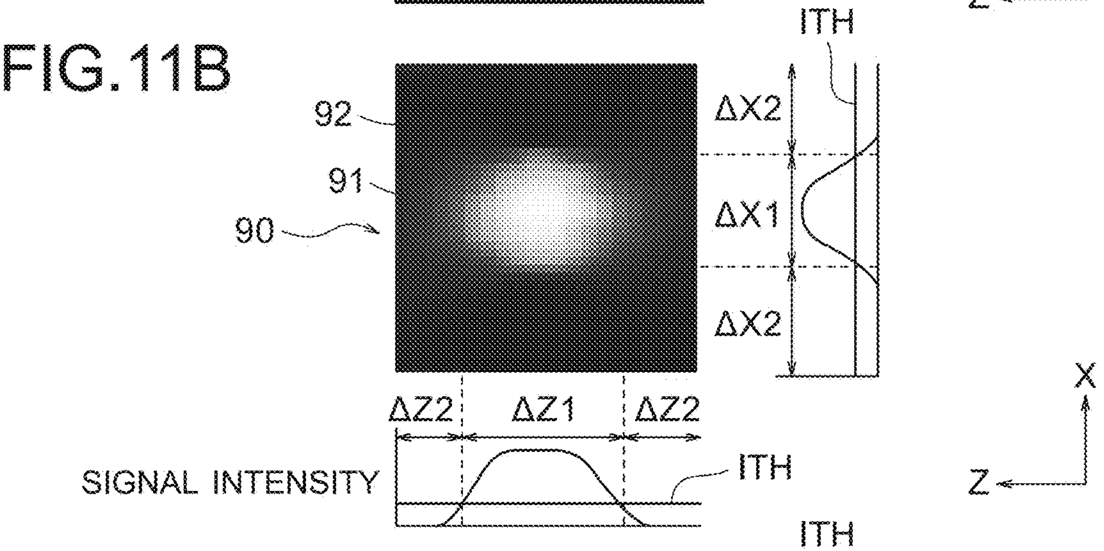
Figure 11C:
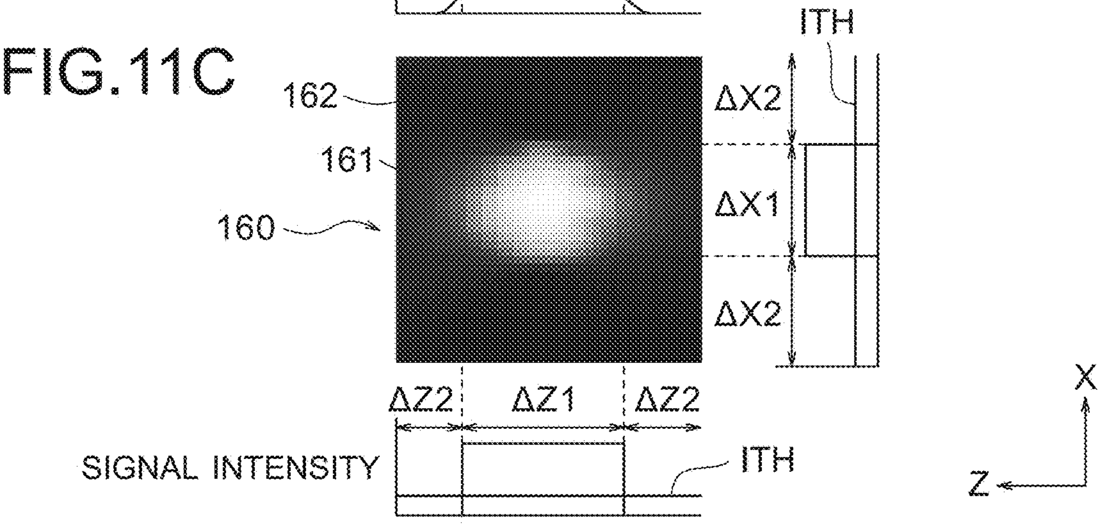
Figure 11D:
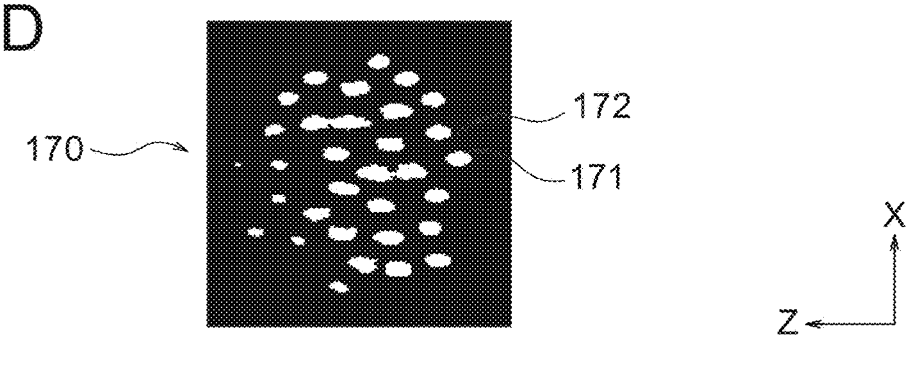

FIGS. 11A, 11B, 11C, and 11D are diagrams illustrating a processing-target image. FIG. 11A is a diagram illustrating a processing-target image before processing. FIG. 11B is a diagram illustrating a part of the processing-target image before processing. FIG. 11C is a diagram illustrating a part of the processing-target image after processing. FIG. 11D is a diagram illustrating the processing-target image after processing. FIG. 11A is the same as FIG. 3A and FIG. 11B is the same as FIG. 3B, so a description of FIG. 11A and FIG. 11B is omitted.

As illustrated in FIG. 11B, in the image 90 to be processed, the first image region 91 and the second image region 92 are each represented by signal intensities of various magnitudes. A binarization process is then performed on the image 90 to be processed.

As a result, as illustrated in FIG. 11C, in an image 160 to be processed, a first image region 161 and a second image region 162 are each represented by a signal intensity of a single magnitude. The signal intensity in the first image region 161 is greater than the signal intensity in the second image region 162.

By performing the binarization process on the entire processing-target image, it is possible to obtain an image 170 to be processed, as illustrated in FIG. 11D. In the image 170 to be processed, the whole of a first image region 171 and a second image region 172 are binarized.

In the first setting process, a refractive index indicated by the first refractive index information is set at a position corresponding to the binarized first image region 171.

In the refractive index distribution generation device of the present embodiment, it is preferable that the refractive index distribution generation process includes a first correction process of enhancing brightness of a deep position in the sample relative to brightness of a shallow position in the sample, and the first setting process sets a refractive index indicated by the first refractive index information at a position corresponding to the first image region of the processing-target image in which the brightness of the deep position is enhanced. The processing-target image is an image in which the sample has a depth increasing along a direction from one end toward the other end, and the one end is opposite the other end across a center of the processing-target image.

Step S110 may be performed before the binarization process is performed. At step S110, the first correction process is performed. Upon completion of the binarization process, step S201 is performed.

At step S201, the first setting process is performed. In the first setting process, a refractive index indicated by the first refractive index information is set at a position corresponding to the binarized first image region.

In the refractive index distribution generation device of the present embodiment, it is preferable that the first correction process enhances brightness more for an image region closer to the other end.

It is possible to improve the accuracy of a refractive index distribution of the sample.

In the refractive index distribution generation device of the present embodiment, it is preferable that the input process inputs, from the memory, third refractive index information indicating a refractive index of a third structure, the setting process includes a third setting process of setting a refractive index based on the third refractive index information at a position corresponding to a third image region of the processing-target image on the basis of the signal intensity and color information of the at least one unit pixel of the processing-target image, and the second setting process sets a refractive index based on the second refractive index information at a position corresponding to an image region different from the first image region of the processing-target image and corresponding to an image region different from the third image region of the processing-target image. The third image region is an image region corresponding to the third structure.

Figure 12A:
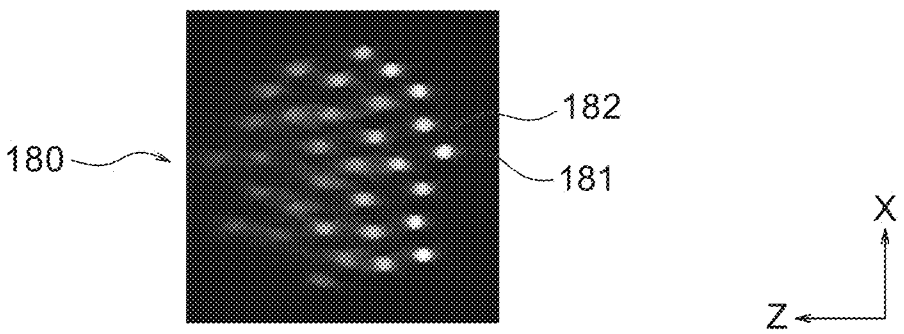
FIGS. 12A and 12B are diagrams illustrating a processing-target image.
Figure 12B:
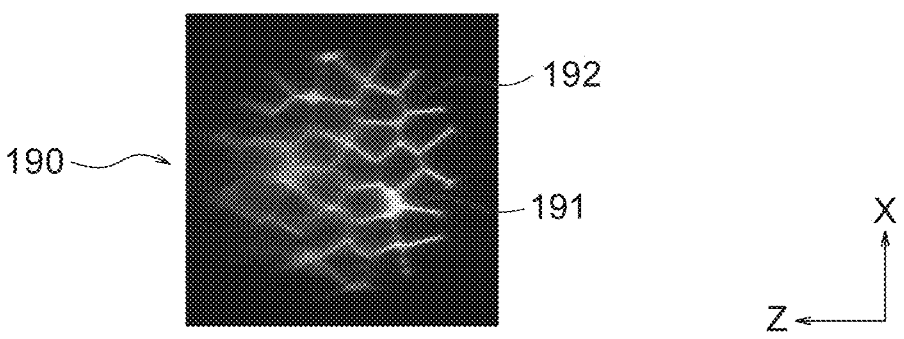

FIGS. 12A and 12B are diagrams illustrating a processing-target image. FIG. 12A is a diagram illustrating a first image region. FIG. 12B is a diagram illustrating a third image region.

The sample includes a first structure, a second structure, and a third structure. The first structure and the third structure are stained with fluorescent dyes. The second structure is not stained with a fluorescent dye.

Since the first structure is stained with a fluorescent dye, a fluorescent image of the first structure is formed. The fluorescent image of the first structure is formed by fluorescence at a wavelength λ1. Since the second structure is not stained with a fluorescent dye, no fluorescent image of the second structure is formed. Since the third structure is stained with a fluorescent dye, a fluorescent image of the third structure is formed. The fluorescent dye that stains the third structure is different from the fluorescent dye that stains the first structure. The fluorescent image of the third structure is formed by fluorescence at a wavelength λ3.

An image 180 to be processed illustrated in FIG. 12A is an image of an optical image of the sample. The image 180 to be processed is an image acquired through the optical filter Fλ1. The image 180 to be processed includes a first image region 181 and an image region 182.

The first image region 181 is an image region corresponding to light transmitted through the optical filter Fλ1. Light that forms the fluorescent image of the first structure is fluorescence at the wavelength λ1 and therefore passes through the optical filter Fλ1. Thus, the first image region 181 is an image region corresponding to the first structure. Since the image 180 to be processed includes a plurality of images of the first structure, the image 180 to be processed includes a plurality of the first image regions 181.

The image region 182 is an image region corresponding to light that does not pass through the optical filter Fλ1. Structures other than the first structure are denoted as a structure group B. The structure group B includes the second structure and the third structure. Since a fluorescent image of the second structure is not formed, there is no light transmitted through the optical filter Fλ1. Light that forms the fluorescent image of the third structure is fluorescence at the wavelength λ3 and therefore does not pass through the optical filter Fλ1. Thus, the image region 182 is an image region corresponding to the structure group B. Since the structure group B is different from the first structure, the image region 182 is different from the first image region 181.

An image 190 to be processed illustrated in FIG. 12B is an image of an optical image of the sample. The image 190 to be processed is an image acquired through an optical filter (hereinafter referred to as "optical filter Fλ3") that transmits only fluorescence at the wavelength λ3. The image 190 to be processed includes a third image region 191 and an image region 192.

The third image region 191 is an image region corresponding to light transmitted through the optical filter Fλ3. Light that forms the fluorescent image of the third structure is fluorescence at the wavelength λ3 and therefore passes through the optical filter Fλ3. Thus, the third image region 191 is an image region corresponding to the third structure.

The image region 192 is an image region corresponding to light that does not pass through the optical filter Fλ3. Structures other than the third structure are denoted as a structure group C. The structure group C includes the first structure and the second structure. Light that forms the fluorescent image of the first structure is fluorescence at the wavelength λ1 and therefore does not pass through the optical filter Fλ3. Since a fluorescent image of the second structure is not formed, there is no light transmitted through the optical filter Fλ3. Thus, the image region 192 is an image region corresponding to the structure group C. Since the structure group C is different from the third structure, the image region 192 is different from the third image region 191.

Figure 13:
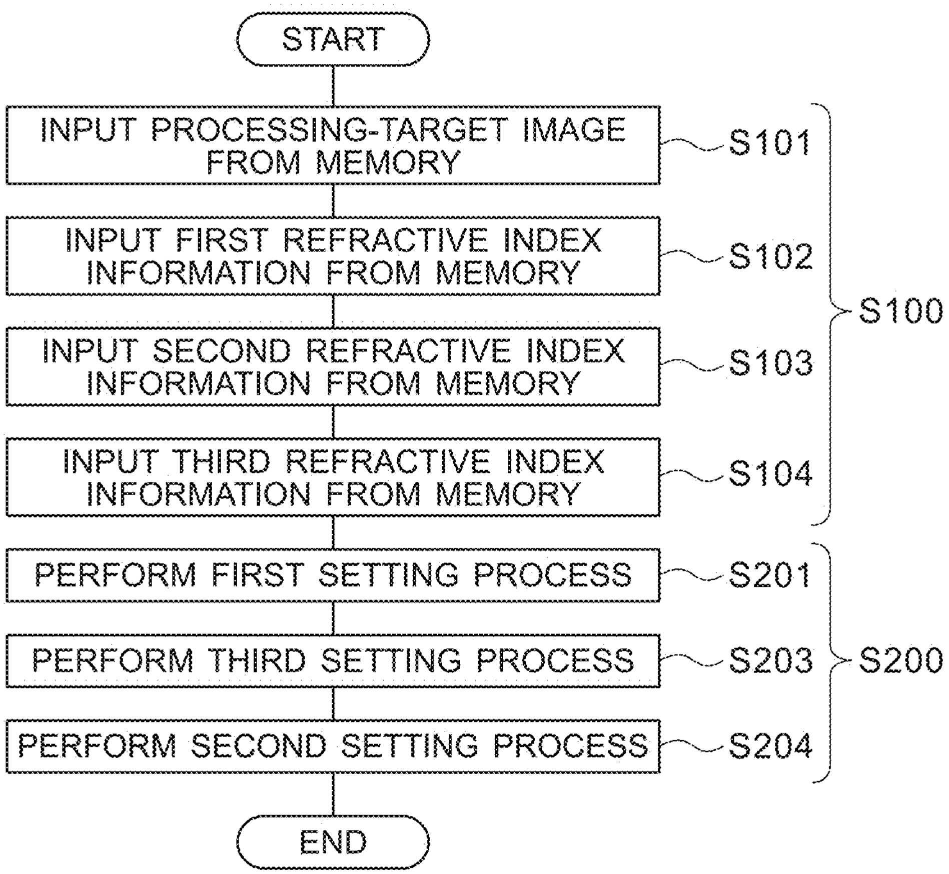
FIG. 13 is a flowchart of processing performed by the processor.

FIG. 13 is a flowchart of the processing performed by the processor. A description of the same processing as the processing illustrated in FIG. 3 is omitted.

At step S100, the input process is performed. Step S100 includes step S101, step S102, step S103, and step S104. At step S104, the third refractive index information is input from the memory. The third refractive index information is information indicating a refractive index of the third structure. Upon completion of step S100, step S200 is performed.

At step S200, the setting process is performed. In the setting process, respective refractive indexes that constitute a refractive index distribution is set. Step S200 includes step S201, step S203, and step S204.

At step S203, a third setting process is performed. In the third setting process, a refractive index based on the third refractive index information is set at a position corresponding to the third image region of the processing-target image on the basis of the signal intensity and color information of at least one unit pixel of the processing-target image.

At step S204, the second setting process is performed. In the second setting process, a refractive index based on the second refractive index information is set at a position corresponding to an image region different from the first image region of the processing-target image and corresponding to an image region different from the third image region of the processing-target image.

In the image 180 to be processed, a signal intensity greater than zero is used as the signal intensity of at least one unit pixel. In the unit pixel that forms the first image region 181, the signal intensity is greater than zero. The image region 182 is a region excluding the first image region 181. Thus, in the unit pixel that forms the image region 182, the signal intensity is zero.

In the image 190 to be processed, a signal intensity greater than zero is used as the signal intensity of at least one unit pixel. In the unit pixel that forms the third image region 191, the signal intensity is greater than zero. The image region 192 is a region excluding the third image region 191. Thus, in the unit pixel that forms the image region 192, the signal intensity is zero.

It is assumed that a predetermined set is a set of shapes similar to a circle and shapes similar to an oval. Since the first image region 181 is a region depicted by the predetermined set, the position of the first image region 181 is obtained from the position of the predetermined set. Since the image region 182 is a region excluding the first image region 181, the position of the image region 182 is obtained if the position of the first image region 181 is obtained.

Since the third image region 191 is a region depicted by a mesh pattern, the position of the third image region 191 is obtained from the position of the mesh pattern. Since the image region 192 is a region excluding the third image region 191, the position of the image region 192 is obtained if the position of the third image region 191 is obtained.

In the first, second, and third setting processes, a refractive index is set. The processing-target image is an image of an optical image of the sample. Since the image of the optical image of the sample is an image formed by brightness information, the refractive index can be set, for example, in the refractive index distribution image.

Since the refractive index distribution image is an image represented by refractive indexes, it is possible to set a refractive index based on the first refractive index information, a refractive index based on the second refractive index information, and a refractive index based on the third refractive index information. A region in which a refractive index based on the first refractive index information is to be set, a region in which a refractive index based on the second refractive index information is to be set, and a region in which a refractive index based on the third refractive index information is to be set are necessary to set refractive indexes.

The first refractive index information is information indicating a refractive index of the first structure. The image region corresponding to the first structure is the first image region 181. To set the refractive index based on the first refractive index information, a region corresponding to the first image region 181 can be obtained in the refractive index distribution image.

The third refractive index information is information indicating a refractive index of the third structure. The image region corresponding to the third structure is the third image region 191. To set the refractive index based on the third refractive index information, a region corresponding to the third image region 191 can be obtained in the refractive index distribution image.

The second refractive index information is information indicating a refractive index of the second structure. The second structure is included in the structure group B and the structure group C. The image region corresponding to the structure group B is the image region 182, and the image region corresponding to the structure group C is the image region 192.

However, the structure group B includes the third structure, and the structure group C includes the first structure. Thus, to obtain an image region including the second structure, the third image region 191 can be removed from the image region 182, or the first image region 181 can be removed from the image region 192. The region left by the removal (hereafter referred to as "remaining region A") includes the image region corresponding to the second structure. To set the refractive index based on the second refractive index information, a region corresponding to the remaining region A can be obtained in the refractive index distribution image.

To set a refractive index based on the refractive index information in the refractive index distribution image, it is necessary to obtain the position of the region corresponding to the first image region 181, the position of the region corresponding to the remaining region A, and the position of the region corresponding to the third image region 191.

The position of the first image region 181 is obtained on the basis of the signal intensity of at least one unit pixel of the image 180 to be processed. Thus, the position of the region corresponding to the first image region 181 can be obtained on the basis of the signal intensity of at least one unit pixel of the image 180 to be processed. The refractive index based on the first refractive index information can be set at the thus obtained position.

The position of the third image region 191 is obtained on the basis of the signal intensity of at least one unit pixel of the image 190 to be processed. Thus, the position of the region corresponding to the third image region 191 can be obtained on the basis of the signal intensity of at least one unit pixel of the image 190 to be processed. The refractive index based on the third refractive index information can be set at the thus obtained position.

The region corresponding to the remaining region A is obtained by excluding the region corresponding to the first image region 181 and the region corresponding to the third image region 191 in the refractive index distribution image. Thus, the position corresponding to the remaining region A can be obtained on the basis of the position of the region corresponding to the first image region 181 and the position of the region corresponding to the third image region 191. The refractive index based on the second refractive index information can be set at the thus obtained position.

It is possible to use a color image sensor or a monochrome image sensor as the imager. As described above, the light that forms the fluorescent image of the third structure is fluorescence at the wavelength λ3, and the light that forms the fluorescent image of the first structure is fluorescence at the wavelength λ1. Since the wavelength λ3 is different from the wavelength λ1, the color of the fluorescent image of the third structure is different from the color of the fluorescent image of the first structure.

When a color image sensor is used as the imager, it is possible to distinguish the fluorescent image of the third structure from the fluorescent image of the first structure by color. Thus, it is possible to obtain the position corresponding to the third image region of the processing-target image on the basis of color information.

When a monochrome image sensor is used as the imager, it is impossible to distinguish the fluorescent image of the third structure from the fluorescent image of the first structure by color. As described above, the third image region is an image region corresponding to light transmitted through the optical filter Fλ3, and the first image region is an image region corresponding to light transmitted through the optical filter Fλ1. The color of the optical filter Fλ3 is different from the color of the optical filter Fλ1. In this case, it is possible to distinguish the fluorescent image of the third structure from the fluorescent image of the first structure by the colors of the optical filters. Thus, it is possible to obtain the position corresponding to the third image region of the processing-target image on the basis of color information.

In the refractive index distribution generation device of the present embodiment, it is preferable that the input process inputs, from the memory, fourth refractive index information indicating a refractive index of a medium surrounding the sample, the refractive index distribution generation process includes an identification process of identifying a boundary between the sample and the medium, and the setting process includes the fourth setting process of setting a refractive index based on the fourth refractive index information at a position corresponding to a fourth image region of the processing-target image. The fourth image region is an image region corresponding to the medium.

Figure 14A:
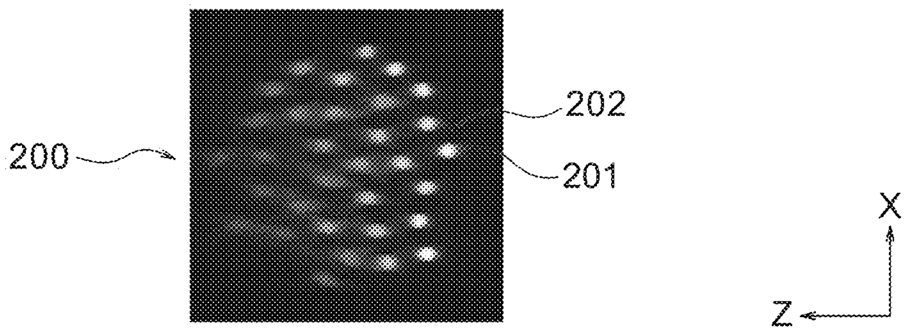
FIGS. 14A and 14B are diagrams illustrating a processing-target image.
Figure 14B:
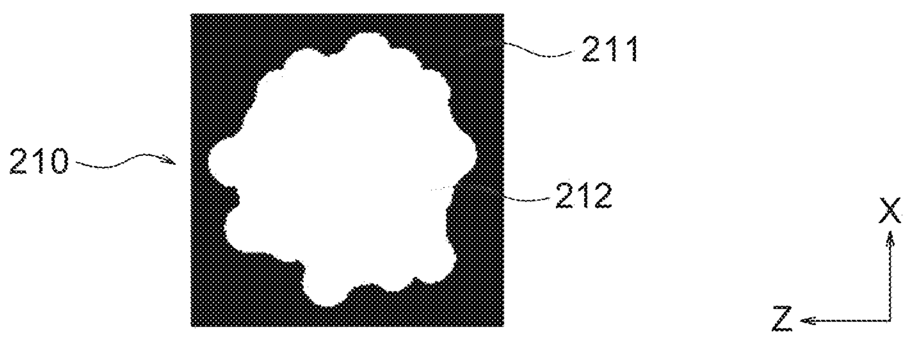

FIGS. 14A and 14B are diagrams illustrating a processing-target image. FIG. 14A is a diagram illustrating a first image region. FIG. 14B is a diagram illustrating a fourth image region.

The sample includes a first structure and a second structure. The sample is surrounded by a medium, for example, a culture medium. The first structure is stained with a fluorescent dye. The second structure and the medium are not stained with a fluorescent dye.

Since the first structure is stained with a fluorescent dye, a fluorescent image of the first structure is formed. The fluorescent image of the first structure is formed by fluorescence at a wavelength λ1. Since the second structure and the medium are not stained with a fluorescent dye, a fluorescent image of the second structure and a fluorescent image of the medium are not formed.

An image 200 to be processed as illustrated in FIG. 14A is an image of an optical image of the sample. The image 200 to be processed is an image acquired through the optical filter Fλ1. The image 200 to be processed includes a first image region 201 and an image region 202.

The first image region 201 is an image region corresponding to light transmitted through the optical filter Fλ1. Light that forms the fluorescent image of the first structure is fluorescence at the wavelength λ1 and therefore passes through the optical filter Fλ1. Thus, the first image region 201 is an image region corresponding to the first structure. Since the image 200 to be processed includes a plurality of images of the first structure, the image 200 to be processed includes a plurality of the first image regions 201.

The image region 202 is an image region corresponding to light that does not pass through the optical filter Fλ1. Since a fluorescent image of the structure group A and a fluorescent image of the medium are not formed, there is no light transmitted through the optical filter Fλ1. Thus, the image region 202 is an image region corresponding to the structure group A and the medium. Since the structure group A and the medium are different from the first structure, the image region 202 is different from the first image region 201.

An image 210 to be processed as illustrated in FIG. 14B is an image of an optical image of the medium. In FIG. 14B, two regions are binarized for the sake of visibility. It is possible to estimate the optical image of the medium, for example, from a bright field image.

The image 210 to be processed includes a fourth image region 211 and an image region 212. The fourth image region 211 is an image region corresponding to the medium. The image region 212 is an image region corresponding to the sample. It is possible to consider the outer edge of the image region 212 as representing the approximate shape of the entire sample.

Figure 15:
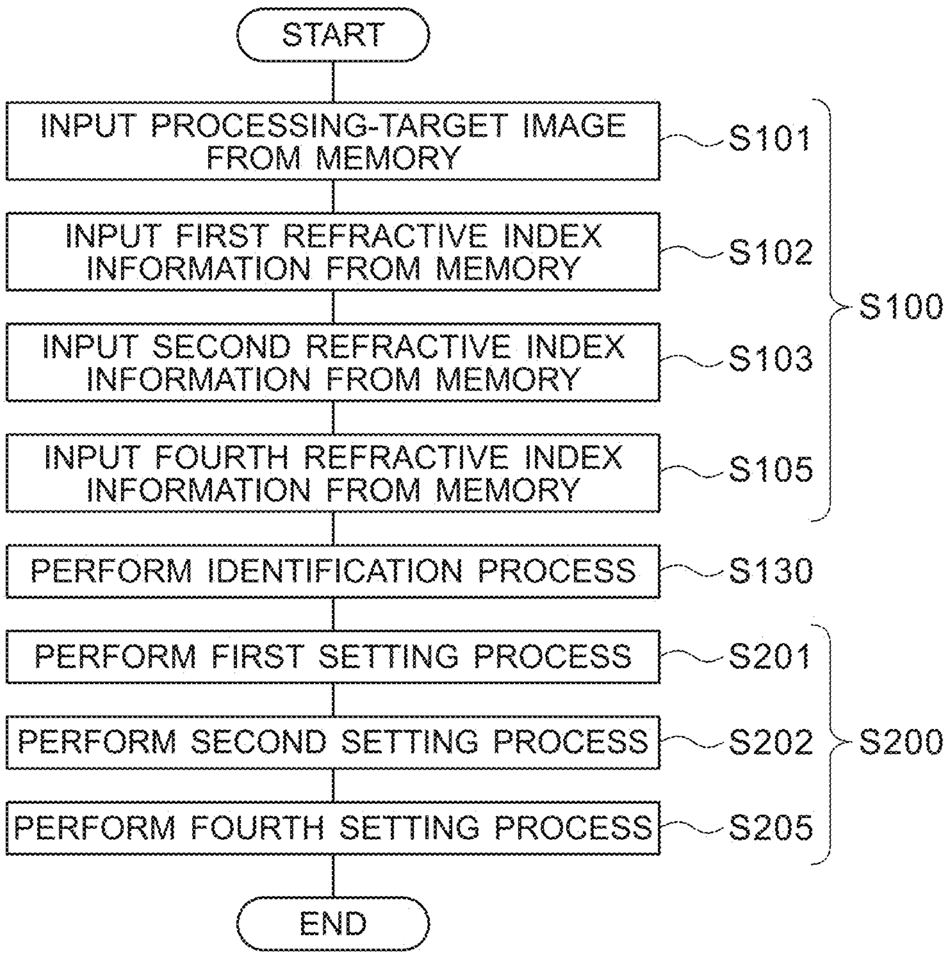
FIG. 15 is a flowchart of processing performed by the processor.

FIG. 15 is a flowchart of the processing performed by the processor. A description of the same processing as the processing illustrated in FIG. 3 is omitted.

At step S100, the input process is performed. Step S100 includes step S101, step S102, step S103, and step S105. At step S105, fourth refractive index information is input from the memory. The fourth refractive index information is information indicating the refractive index of the medium surrounding the sample. Upon completion of step S100, step S130 is performed.

At step S130, an identification process is performed. In the identification process, the boundary between the sample and the medium is identified. Upon completion of step S130, step S200 is performed.

At step S200, the setting process is performed. In the setting process, respective refractive indexes that constitute a refractive index distribution is set. Step S200 includes step S201, step S202, and step S205.

At step S205, a fourth setting process is performed. In the fourth setting process, a refractive index based on the fourth refractive index information is set at a position corresponding to the fourth image region of the processing-target image.

In the image 200 to be processed, a signal intensity greater than zero is used as the signal intensity of at least one unit pixel. In the unit pixel that forms the first image region 201, the signal intensity is greater than zero. The image region 202 is a region excluding the first image region 201. Thus, in the unit pixel that forms the image region 202, the signal intensity is zero.

Since the first image region 201 is a region depicted by the predetermined set, the position of the first image region 201 is obtained from the position of the predetermined set. Since the image region 202 is a region excluding the first image region 201, the position of the image region 202 is obtained if the position of the first image region 201 is obtained.

Since the fourth image region 211 is a region outside the boundary between the sample and the medium, the position of the fourth image region 211 is obtained from the position of the boundary. Since the image region 212 is a region excluding the fourth image region 211, the position of the image region 212 is obtained if the position of the fourth image region 211 is obtained.

In the first, second, and fourth setting processes, a refractive index is set. The processing-target image is an image of an optical image of the sample. Since the image of the optical image of the sample is an image formed by brightness information, the refractive index can be set, for example, in the refractive index distribution image.

Since the refractive index distribution image is an image represented by refractive indexes, it is possible to set a refractive index based on the first refractive index information, a refractive index based on the second refractive index information, and a refractive index based on the fourth refractive index information. A region in which a refractive index based on the first refractive index information is to be set, a region in which a refractive index based on the second refractive index information is to be set, and a region in which a refractive index based on the fourth refractive index information is to be set are necessary to set refractive indexes.

The first refractive index information is information indicating a refractive index of the first structure. The image region corresponding to the first structure is the first image region 201. To set the refractive index based on the first refractive index information, a region corresponding to the first image region 201 can be obtained in the refractive index distribution image.

The fourth refractive index information is information indicating the refractive index of the medium. The image region corresponding to the medium is the fourth image region 211. To set the refractive index based on the fourth refractive index information, a region corresponding to the fourth image region 211 can be obtained in the refractive index distribution image.

The second refractive index information is information indicating a refractive index of the second structure. The second structure is included in the structure group A. The image region including the structure group A is the image region 202. However, in the image region 202, it is impossible to distinguish the image region corresponding to the structure group A from the image region corresponding to the medium.

The image region corresponding to the medium is the fourth image region 211. The image region corresponding to the first structure is the first image region 201. Thus, to obtain the image region including the second structure, the first image region 201 and the fourth image region 211 can be removed from the image region 202. The region left by the removal (hereafter referred to as "remaining region B") includes the image region corresponding to the second structure. To set the refractive index based on the second refractive index information, a region corresponding to the remaining region B can be obtained in the refractive index distribution image.

To set a refractive index based on the refractive index information in the refractive index distribution image, it is necessary to obtain the position of the region corresponding to the first image region 201, the position of the region corresponding to the remaining region B, and the position of the region corresponding to the fourth image region 211.

The position of the first image region 201 is obtained on the basis of the signal intensity of at least one unit pixel of the image 200 to be processed. Thus, the position of the region corresponding to the first image region 201 can be obtained on the basis of the signal intensity of at least one unit pixel of the image 200 to be processed. The refractive index based on the first refractive index information can be set at the thus obtained position.

The position of the fourth image region 211 is obtained on the basis of the boundary between the sample and the medium in the image 210 to be processed. Thus, the position of the region corresponding to the fourth image region 211 can be obtained on the basis of the boundary between the sample and the medium in the image 210 to be processed. The refractive index based on the fourth refractive index information can be set at the thus obtained position.

The region corresponding to the remaining region B is obtained by excluding the region corresponding to the first image region 201 and the region corresponding to the fourth image region 211 in the refractive index distribution image. Thus, the position corresponding to the remaining region B is obtained from the position of the region corresponding to the first image region 201 and the position of the region corresponding to the fourth image region 211. The refractive index based on the second refractive index information can be set at the thus obtained position.

In the refractive index distribution generation device of the present embodiment, it is preferable that the first refractive index information and the second refractive index information are refractive index information about a cell composition structure.

It is possible to improve the accuracy of a refractive index distribution of the sample.

In the refractive index distribution generation device of the present embodiment, the first refractive index information is refractive index information of a cell nucleus and the second refractive index information is refractive index information of cell membrane.

It is possible to improve the accuracy of a refractive index distribution of the sample.

In the refractive index distribution generation device of the present embodiment, it is preferable that the third refractive index information is refractive index information of cell adhesion molecules.

It is possible to improve the accuracy of a refractive index distribution of the sample.

In the refractive index distribution generation device of the present embodiment, it is preferable that the fourth refractive index information is refractive index information of a cell culture medium.

It is possible to improve the accuracy of a refractive index distribution of the sample.

In the refractive index distribution generation device of the present embodiment, it is preferable that the processor performs an image generation process of generating an image after processing, the image corresponding to the processing-target image. It is preferable that the image generation process includes a division process of dividing the processing-target image into a plurality of small image regions, a point spread function calculation process of calculating a point spread function for each of the small image regions, using a refractive index distribution of the processing-target image, a small image generation process of generating a small image for each of the small image regions, using a point spread function for each of the small image regions, and a combination process of combining the small image for each of the small image regions and generating the image after processing.

Furthermore, in the refractive index distribution generation device of the present embodiment, it is preferable that the point spread function calculation process calculates a point spread function for each of the small image regions, using a refractive index distribution that is set at a position corresponding to a fifth image region positioned within a range in which a wavefront originating from the small image region propagates on the processing-target image, and the fifth image region includes, for each of the small image regions, an image region outside a range of a sixth image region defined by extending the small image region in a predetermined direction. The predetermined direction is a direction from the sample toward an observation optical system to be modeled in the calculation process, among optical axis directions of the observation optical system.

The image 50 to be processed in FIG. 3A is an image of the XZ cross-section. In the image 50 to be processed, the right end of the image represents the image of the top surface of the sample, and the left end of the image represents the image of the bottom surface of the sample. The depth of the sample increases from the right end of the image toward the left end of the image.

The first image regions 51 represent image regions corresponding to a plurality of cell nuclei. When the shape of the cell nucleus is a spherical shape, the shape in the XZ cross-section is a circle. Thus, the shape of the XZ cross-section of the cell nucleus is essentially a circle, regardless of the depth from the top surface. In actuality, however, the shape of the first image region 51 is more deformed from a circle as the depth from the top surface increases.

Thus, in the image 50 to be processed, deformation, reduction in sharpness, and reduction in brightness occur in all of the first image regions 51. If deformation, reduction in sharpness, and reduction in brightness are considered as degradation of image quality, degradation of image quality occurs in the image 50 to be processed.

An image of an optical image is obtained by capturing an optical image. That degradation of image quality occurs in an image of an optical image means that degradation occurs in the optical image.

When the sample is a point light source, it is preferable that an optical image is a point image. In order to form a point image, it is necessary that the optical system is an optical system free from aberration (hereinafter referred to as "ideal optical system") and that all of the light emitted from the point light source is incident on the optical system.

However, since the size of the optical system is finite, it is impossible to allow all of the light emitted from the point light source to be incident on the optical system. In this case, the optical image is affected by diffraction. As a result, even when the optical system is an ideal optical system, the point image is not formed, but an image having a spread is formed. The image having a spread is called a point spread function.

The optical image is represented by the following Expression (1) using the point spread function.

$$I = O * PSF \tag{1}$$

where

I is an optical image,

O is a sample,

PSF is a point spread function, and

* is convolution.

When the point spread function is considered as an optical filter, Expression (1) represents that the optical image is obtained through a filter that is the point spread function. That degradation occurs in the optical image means that the filter, that is, the point spread function, has characteristics that cause deformation, reduction in sharpness, and reduction in brightness (hereinafter referred to as "degradation characteristics").

In a frequency space, Expression (1) is represented by the following Expression (2).

$$FI = FO \times OTF \tag{2}$$

where

FI is the Fourier transform of an optical image,

FO is the Fourier transform of a sample, and

OTF is the optical transfer function.

OTF is the Fourier transform of the point spread function. When the point spread function has degradation characteristics, OTF also has degradation characteristics.

Expression (2) is rewritten and then Expression (2) is represented by the following Expression (3).

$$FO = FI/OTF \tag{3}$$

If it is possible to obtain FI and OTF, it is possible to obtain FO. Then, it is possible to obtain O by the inverse Fourier transform of FO. O is the sample. This computation is called deconvolution.

The image 50 to be processed is an image of an optical image of a cell nucleus. In the image 50 to be processed, only the cell nucleus is imaged. Only the image of the cell nucleus is therefore obtained by performing deconvolution using the image 50 to be processed and the OTF image.

The sample is a mass of cells and thus includes a plurality of cytoplasm and a plurality of cell nuclei. However, in the image 50 to be processed, only the images of the cell nuclei are obtained even by performing deconvolution. Since an image of the cytoplasm is not obtained, it is difficult to say that the sample has been obtained. Although the sample can be obtained by performing deconvolution, whether the sample is obtained depends on the image of the optical image.

In terms of an image, Expression (1) represents that the image of the optical image is an image obtained through the filter that is the point spread function. If the point spread function has degradation characteristics, I can be considered as an image of an optical image with degraded image quality, and O can be considered as an image of an optical image before image quality is degraded.

In this case, Expression (3) represents that an image of an optical image before image quality is degraded is generated from an image of an optical image with degraded image quality. Hereinafter, an image of an optical image with degraded image quality is referred to as a "degraded image". Furthermore, it is possible to say that an image of an optical image before image quality is degraded means that an image has been restored in the image with degraded image quality. Thus, an image of an optical image before image quality is degraded is referred to as a "restored image".

In order to generate a restored image, it is necessary to obtain a point spread function. The refractive index outside the sample is denoted as n1 and the refractive index inside the sample is denoted as n2.

It is assumed that an ideal shape is the shape of the point spread function of the ideal optical system. In the ideal shape, the refractive index between the focal plane and the ideal optical system agrees with a predetermined refractive index.

The sample is moved toward the optical system from a state in which the sample is at a distance from a focal plane. Since the optical system does not move, the top surface of the sample reaches the focal plane. In this state (hereinafter referred to as "first state"), only a space with a refractive index of n1 exists between the focal plane and the optical system. When a point light source is disposed on the focal plane, the point spread function in the first state is obtained.

In the first state, the refractive index between the focal plane and the optical system is n1. If the predetermined refractive index is n1, the point spread function in the first state is obtained only on the basis of the predetermined refractive index. Thus, the shape of the point spread function in the first state is the same as the ideal shape.

When the sample is moved further, the focal plane reaches the interior of the sample. In this state (hereinafter referred to as "second state"), a space with a refractive index of n1 and a space with a refractive index of n2 are positioned between the focal plane and the optical system. When a point light source is disposed on the focal plane, the point spread function in the second state is obtained.

In the second state, the refractive index between the focal plane and the optical system is determined by n1 and n2. Since the predetermined refractive index is n1, n2 is not a predetermined refractive index. In this case, the point spread function in the second state is obtained on the basis of the predetermined refractive index and the refractive index that is not predetermined. Thus, the shape of the point spread function in the second state is different from the ideal shape.

In this way, the shape of the point spread function varies with the size of the space with a refractive index of n2. Thus, in calculation of the point spread function, the refractive index distribution in the sample has to be considered appropriately.

In the refractive index distribution generation device of the present embodiment, since the processing-target image is a degraded image, a restored image can be generated from the processing-target image. In the restored image, the shape of the first image region is the same regardless of the depth from the top surface. Thus, it is possible to generate a refractive index distribution more accurately.

In order to generate a restored image, it is necessary to obtain a point spread function. In calculation of the point spread function, the refractive index distribution in the sample has to be considered appropriately. The process of generating a restored image will now be described. In the description of the process of generating a restored image, the restored image is referred to as a sample image. Furthermore, the restored image is an image after image restoration is performed (image after processing).

The process of generating a restored image is performed by the processor 3. The processing performed by the processor 3 will now be described. In the processing performed by the processor 3, a first image is used. The first image is a processing-target image.

Figure 16:
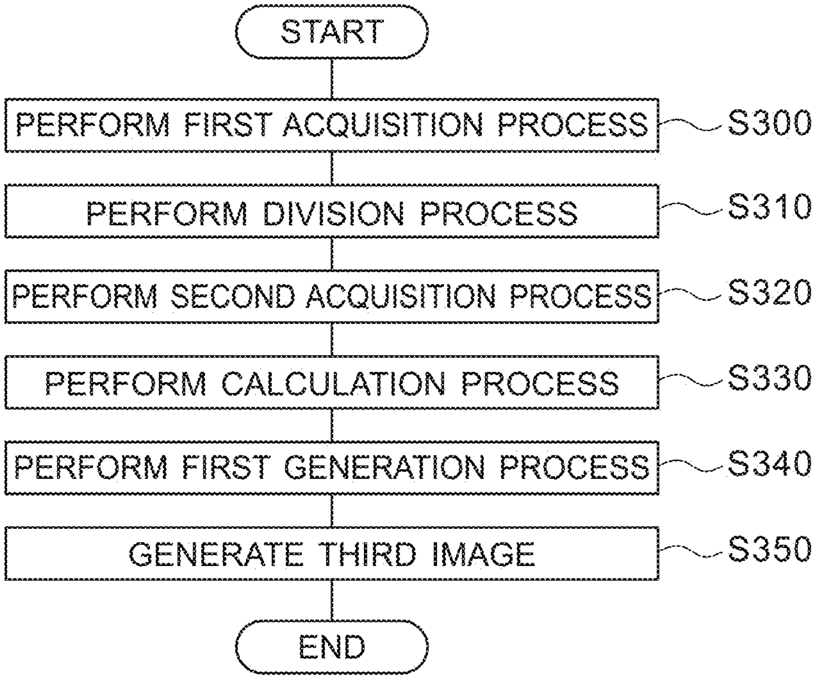
FIG. 16 is a flowchart of processing performed by the processor.
Figure 17A:
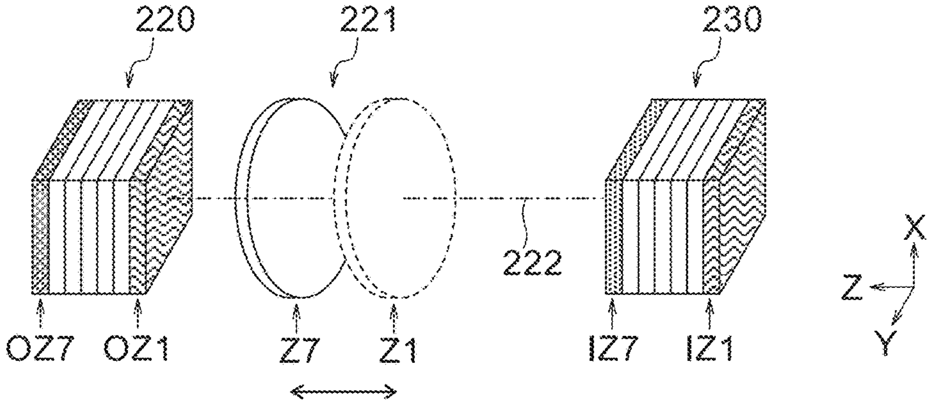
FIGS. 17A, 17B, 17C, and 17D are diagrams illustrating samples, optical images, and a first image.
Figure 17B:
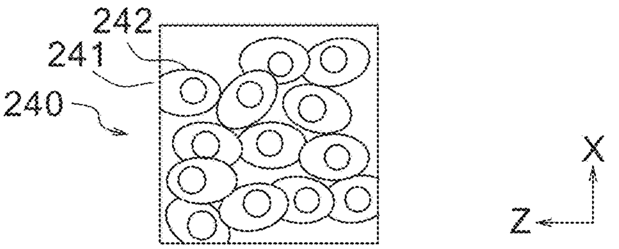
Figure 17C:
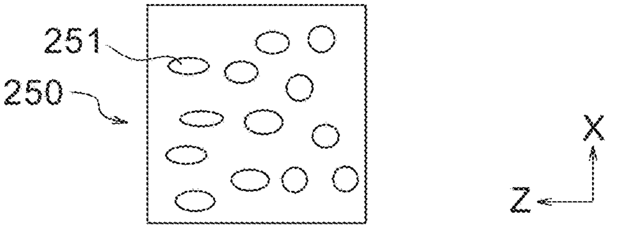
Figure 17D:
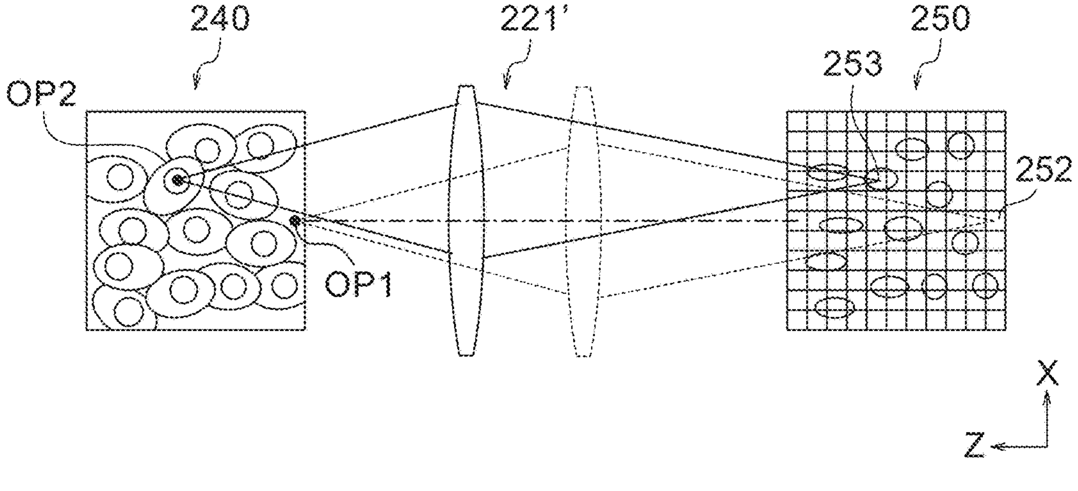

FIG. 16 is a flowchart of the processing performed by the processor. FIGS. 17A, 17B, 17C, and 17D are diagrams illustrating samples, optical images, and a first image. FIG. 17A is a diagram illustrating the sample and the optical images in three dimensions. FIG. 17B is a diagram illustrating an XZ cross-section of a sample. FIG. 17C is a diagram illustrating a first image. FIG. 17D is a diagram illustrating an XZ cross-section of a sample and a first image. The same component as that in FIG. 2A is denoted by the same numeral and a description thereof is omitted.

As described above, the first image is generated from the XY image group. The XY image group is obtained from a plurality of optical images. As illustrated in FIG. 17A, when the observation optical system 221 is moved along the optical axis 222 without moving the sample 220, a plurality of optical images are formed.

At a position Z1, the optical image IZ1 of the sample OZ1 is formed. At a position Z7, the optical image IZ7 of the sample OZ7 is formed. The optical images from the optical image IZ1 to the optical image IZ7 form an optical image 230. By capturing the optical image 120, it is possible to acquire the XY image group.

It is possible to generate an XY image, an XZ image, and a YZ image from the XY image group. It is possible to use any of the XY image, the XZ image, and the YZ image as the first image. It is assumed that the XZ image is stored as the first image in the memory.

At step S300, a first acquisition process is performed. In the first acquisition process, the first image is acquired from the memory.

The first image is an image of an optical image in an XZ cross-section of a sample. FIG. 4B illustrates an XZ cross-section of a sample 240. The sample 240 is a mass of cells. The mass of cells is formed of a plurality of cells. Each cell of the sample 240 includes cytoplasm 241 and a cell nucleus 242.

FIG. 17C illustrates a first image acquired from the memory. A first image 250 is an image of a fluorescent image. In the sample 240, only the cell nuclei 242 are stained with fluorescence. In this case, only the optical images of the cell nuclei 242 are formed. Thus, the first image 250 includes only images 251 of the cell nuclei.

Since the first image 250 is an image of an optical image, the first image 250 is a degraded image. If the shape of the cell nucleus is a circle, the image 251 of the cell nucleus has an oval shape. Upon completion of step S300, step S310 is performed.

At step S310, a division process is performed. In the division process, the acquired first image is divided into a plurality of areas. As illustrated in FIG. 17D, the first image 250 is divided into 11 areas in both of the X-axis direction and the Z-axis direction. Each area is a small image region.

In FIG. 17D, an observation optical system and light rays are illustrated for convenience in order to illustrate the correspondence between the sample 240 and the first image 250. An observation optical system 221' is a virtual optical system and has the same optical specifications as those of the observation optical system 221.

In optical imaging, the top and bottom of the optical image of the sample is the inverse of the top and bottom of the sample. Since the first image 250 is an image, the top and bottom can be reversed when the first image 250 is generated. Thus, in FIG. 17D, the top and bottom of the sample 240 agrees with the top and bottom of the first image 250.

The position of an area 252 corresponds to a position OP1. The position of an area 253 corresponds to a position OP2. Upon completion of step S310, step S320 is performed.

At step S320, a second acquisition process is performed. In the second acquisition process, the refractive index distribution of the sample is acquired from the memory. The acquisition of the refractive index distribution will be described later. Upon completion of step S320, step S330 is performed.

At step S330, a calculation process is performed. In the calculation process, respective point spread functions are calculated for the divided areas, using the acquired refractive index distribution. Specifically, the point spread function of a first area is calculated using the refractive index distribution of each area included in an area group. Thus, it is necessary to determine the first area and the area group.

Figure 18A:
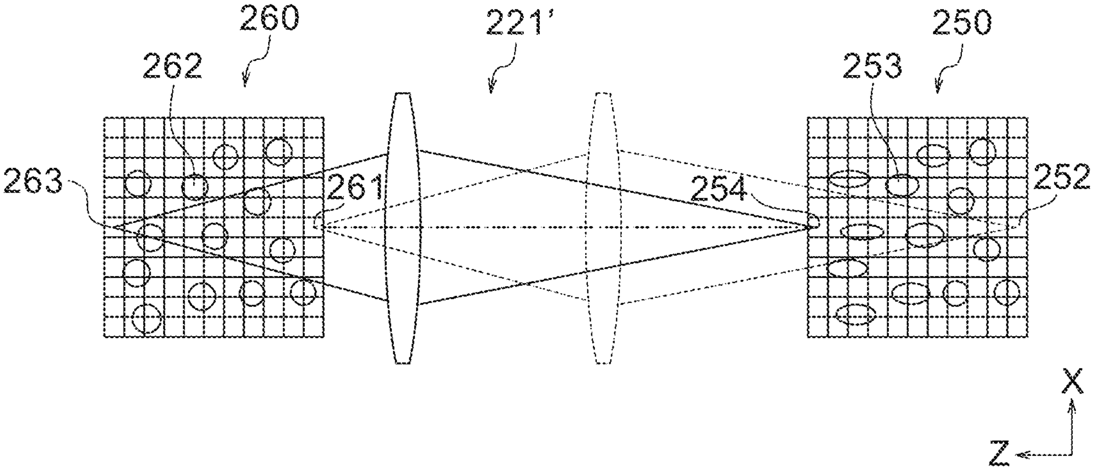
FIGS. 18A, 18B, and 18C are diagrams illustrating the first image, a refractive index image, a first area, and an area group.
Figure 18B:
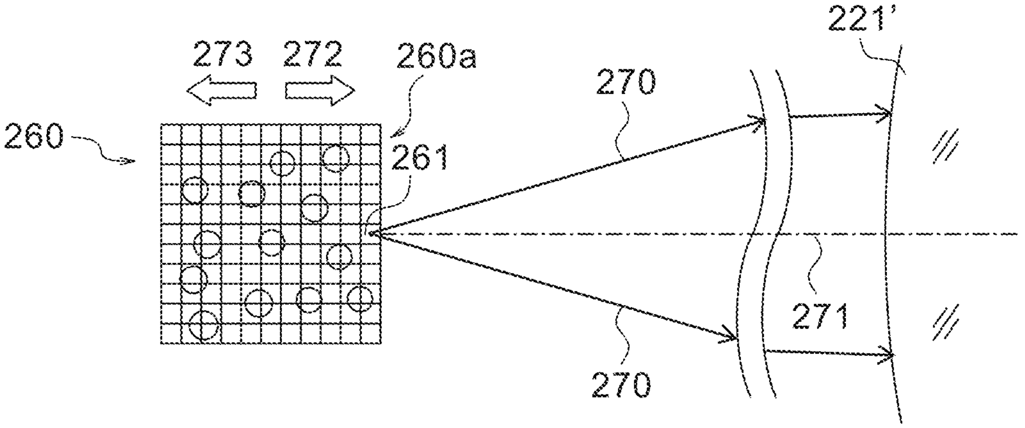
Figure 18C:
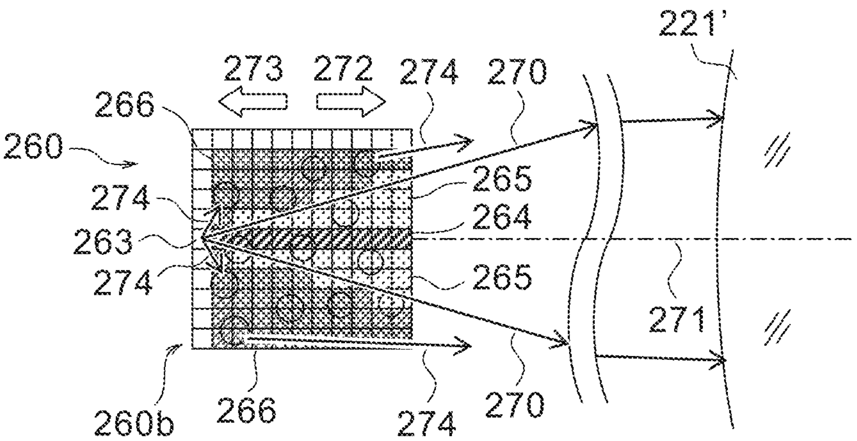

FIGS. 18A, 18B, and 18C are diagrams illustrating the first image, a refractive index image, a first area, and an area group. FIG. 18A is a diagram illustrating the first image, a refractive index image, and a first area. FIG. 18B is a diagram illustrating a first example of an area group. FIG. 18C is a diagram illustrating a second example of the area group.

The first area is the area for which the point spread function is to be calculated. At step S310, the first image 250 is divided into a plurality of areas. Thus, the first area and the area group are determined by the areas in the first image 250.

Note that the first image 250 is the image of the optical image of the sample. The image of the optical image of the sample has information on brightness but does not have information on the refractive index distribution. Since the point spread function is calculated using the refractive index distribution of the area group, the first image 250 is not suitable for calculating the point spread function. In the first image 250, it is possible to determine the first area but it is impossible to determine the area group.

It is possible to represent the refractive index distribution by an image. In this case, it is possible to represent the refractive index distribution of the sample by a plurality of distribution images (hereinafter referred to as "distribution image group"). The distribution image group represents the refractive index distribution of the sample. Thus, an image corresponding to the first image (hereinafter referred to as "refractive index image") is acquired from the distribution image group. The point spread function is calculated using the refractive index distribution. Since the refractive index image is the image of the refractive index distribution, the refractive index image is suitable for calculating the point spread function.

The refractive index image is stored in the memory 2 so that the refractive index image can be read from the memory 2 when the calculation process is performed. Since the first image is an XZ image, the refractive index image is an image of the XZ cross-section.

The first image 250 is divided into a plurality of areas. Thus, as illustrated in FIG. 18A, a refractive index image 260 is also divided into a plurality of areas. The refractive index image 260 is divided into 11 areas in both of the X-axis direction and the Z-axis direction. In the refractive index image 260, only the cell nuclei are illustrated for the sake of visibility.

The top and bottom of the refractive index image 260 agrees with the top and bottom of the first image 250 in the same manner as in FIG. 17D. Furthermore, the observation optical system 221' and light rays are illustrated for convenience in order to illustrate the correspondence between the refractive index image 260 and the first image 250.

In the refractive index image 260, the area corresponding to the area 252 is an area 261. The area corresponding to the area 253 is an area 262. The area corresponding to an area 254 is an area 263.

As described above, the refractive index image 260 is suitable for calculating the point spread function. Thus, the first area and the area group are determined in the refractive index image 260.

A first example of the area group will now be described. FIG. 18B illustrates the area 261, the observation optical system 221', light rays 270, and an optical axis 271 of the observation optical system. Since no light rays radiate from the image, the light rays 270 are virtual light rays.

In the first example, the first area in the first image 250 is the area 252. The area corresponding to the area 252 is the area 261 in the refractive index image 260. Thus, in the refractive index image 260, the area 261 is the first area.

The area group and a predetermined direction are defined as follows. The area group is constituted of a plurality of areas inside the range in which light rays originating from the first area radiate in the predetermined direction, and includes an area outside the range defined by extending the first area in the predetermined direction. The predetermined direction in the first image is a direction in which the observation optical system is present among the optical axis directions of the virtual observation optical system.

As described above, the first area and the area group are determined in the refractive index image 260. Then, in the above definition, the first image is replaced by the refractive index image. In this case, the area group and the predetermined direction are defined as follows.

In the refractive index image, the area group is constituted of a plurality of areas inside the range in which light rays originating from the first area radiate in the predetermined direction, and includes an area outside the range defined by extending the first area in the predetermined direction. The predetermined direction in the refractive index image is a direction in which the virtual observation optical system is present among the optical axis directions of the observation optical system.

In the refractive index image 260, it is assumed that the side closer to the observation optical system 221' is the top surface side of the sample and the side farther from the observation optical system 221' is the bottom surface side of the sample. The area 261 is positioned at the intersection with the optical axis 271 on a top surface 260*a*. The light rays 270 radiate from the area 261. The light rays 270 radiating from the area 261 are incident on the observation optical system 221'.

The light rays 270 are light incident on the observation optical system 221'. The light incident on the observation optical system 221' is determined by the object-side numerical aperture of the observation optical system 221'. As described above, in the refractive index distribution generation device 1, optical information is stored in the memory 2.

The optical information has information on the numerical aperture of the objective lens. The numerical aperture of the objective lens can be considered as the object-side numerical aperture of the observation optical system 221'. Thus, it is possible to identify the light rays 270 from the numerical aperture of the objective lens.

FIG. 18B illustrates a predetermined direction 272 and a non-predetermined direction 273. The predetermined direction 272 and the non-predetermined direction 273 are the optical axis directions of the observation optical system 221'. Among the optical axis directions of the observation optical system 221', the observation optical system 221' is positioned in the predetermined direction 272, but the observation optical system 221' is not positioned in the non-predetermined direction 273.

Two light rays 270 are light rays of radiation light radiating from the area 261. No area of the refractive index image 260 is positioned inside the range sandwiched between the two light rays 270. Thus, at the position of the area 261, the number of areas in the area group is zero.

A second example of the area group will now be described. FIG. 18C illustrates the area 263, a central area 264, a peripheral area 265, and a peripheral area 266. The same component as that in FIG. 18B is denoted by the same numeral and a description thereof is omitted. The area group is the fifth image region. The central area is the sixth image region. The peripheral area is the image region outside a range of the sixth image region.

In the second example, the first area in the first image 250 is the area 254. The area corresponding to the area 254 is the area 263 in the refractive index image 260. Thus, in the refractive index image 260, the area 263 is the first area.

The area 263 is positioned at the intersection with the optical axis 271 on a bottom surface 260*b*. Light rays 270 and light rays 274 radiate from the area 263. The light rays 270 and the light rays 274 radiating from the area 263 are incident on the observation optical system 221'. The light rays 274 are virtual light rays.

The two light rays 270 and the two light rays 274 are light rays radiating from the area 263. When the scattering of light in the sample is very small, light rays radiating from the area 263 are represented by the two light rays 270. The central area 264 and the peripheral area 265 are positioned inside the range sandwiched between the two light rays 270. The central area 264 and the peripheral area 265 form an area group. Areas that intersect with the light rays 270 are considered as being included in the area group.

The central area 264 and the peripheral area 265 are each constituted of a plurality of areas. Thus, the area group is constituted of a plurality of areas.

In the area group, the central area 264 is positioned in a range defined by extending the area 263 in the predetermined direction 272. The peripheral area 265 is positioned outside the central area 264.

When the scattering of light in the sample is very large, light rays radiating from the area 263 are represented by the two light rays 274. The central area 264, the peripheral area 265, and the peripheral area 266 are positioned inside the range sandwiched between the two light rays 274. Thus, the central area 264, the peripheral area 265, and the peripheral area 266 form an area group. Areas that intersect with the light rays 274 are considered as being included in the area group.

The central area 264, the peripheral area 265, and the peripheral area 266 are each constituted of a plurality of areas. Thus, the area group is constituted of a plurality of areas.

Figure 19A:
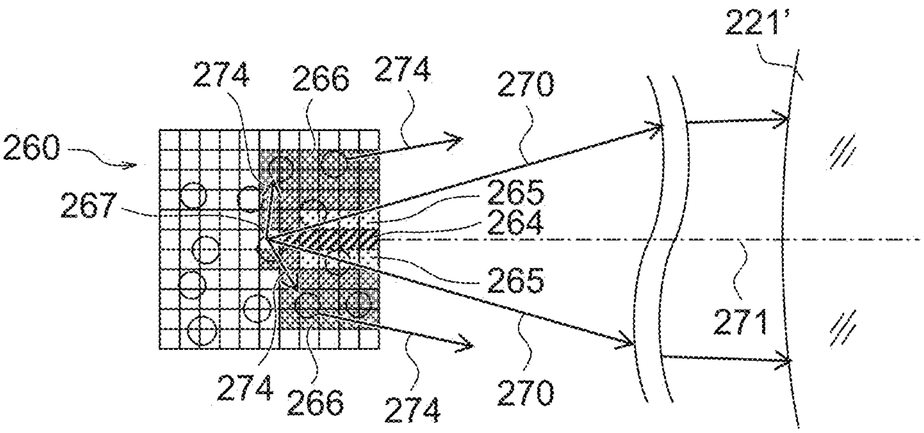
FIGS. 19A and 19B are diagrams illustrating area groups.
Figure 19B:
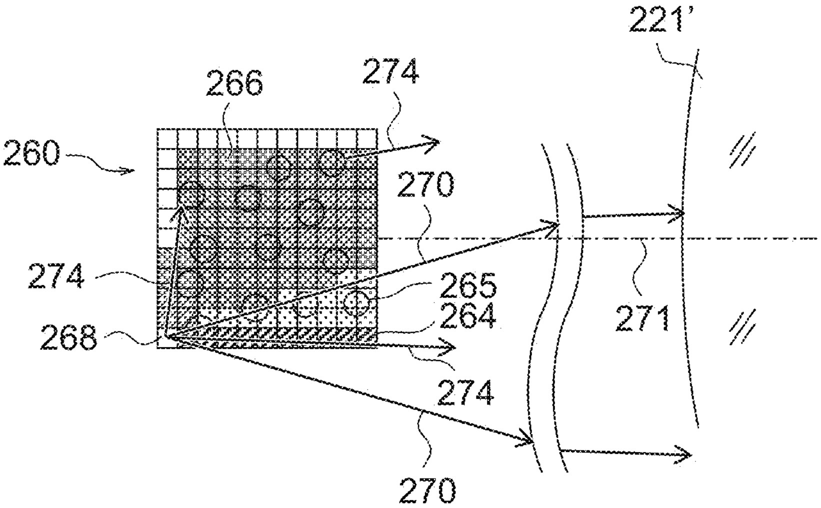

FIGS. 19A and 19B are diagrams illustrating area groups. FIG. 19A is a diagram illustrating a third example of the area group. FIG. 19B is a diagram illustrating a fourth example of the area group.

In the third example, an area 267 is the first area, as illustrated in FIG. 19A. The area 267 is positioned at the intersection with the optical axis 271 between the top surface and the bottom surface.

When the scattering of light in the sample is very small, light rays radiating from the area 267 are represented by two light rays 270. The central area 264 and the peripheral area 265 are positioned inside the range sandwiched between the two light rays 270. The central area 264 and the peripheral area 265 form an area group. When the third example is compared with the second example, the third example has a fewer number of areas in the area group.

When the scattering of light in the sample is very large, light rays radiating from the area 267 are represented by two light rays 274. The central area 264, the peripheral area 265, and the peripheral area 266 are positioned inside the range sandwiched between the two light rays 274. The central area 264, the peripheral area 265, and the peripheral area 266 form an area group.

In the fourth example, an area 268 is the first area, as illustrated in FIG. 19B. The area 268 is positioned at a distance from the optical axis 271 on the bottom surface.

When the scattering of light in the sample is very small, light rays radiating from the area 268 are represented by two light rays 270. The central area 264 and the peripheral area 265 are positioned inside the range sandwiched between the two light rays 270. The central area 264 and the peripheral area 265 form an area group. When the fourth example is compared with the second example, the fourth example has a fewer number of areas in the area group.

When the scattering of light in the sample is very large, light rays radiating from the area 268 are represented by two light rays 274. The central area 264, the peripheral area 265, and the peripheral area 266 are positioned inside the range sandwiched between the two light rays 274. The central area 264, the peripheral area 265, and the peripheral area 266 form an area group.

In the first example, the number of areas in the area group is zero. Thus, the refractive index distribution of each area included in the area group is not used in the computation process. The point spread function is calculated using the refractive index of the space between the refractive index image 260 and the observation optical system 221'. It is assumed that the calculation in the case where the number of areas in the area group is zero is also included in the calculation in the calculation process.

In the second, third, and fourth examples, areas positioned outside the peripheral area 266 are not included in the area group. Thus, these areas are not used in the calculation of the point spread function. However, these areas may be used in the calculation of the point spread function. In other words, all areas positioned on the predetermined direction 272 side from the first area may be considered as an area group to calculate the point spread function.

The first area is the area for which the point spread function is to be calculated. Thus, it is possible to calculate the respective point spread functions for the divided areas by changing the area targeted as the first area.

In the calculation process, the point spread function of the first area is calculated using the refractive index distribution of each area included in the area group. The first area in the first image 250 is the area 254 in the second example. In the refractive index image 260, the area 263 corresponds to the area 254. Further, in the refractive index image 260, the area group is constituted of the central area 264 and the peripheral areas 265, or constituted of the central area 264, the peripheral area 265, and the peripheral area 266.

Thus, the point spread function of the area 263 is calculated using the refractive index distribution of each area that constitutes the central area 264 and the refractive index distribution of each area that constitutes the peripheral area 265, or the point spread function of the area 263 is calculated using the refractive index distribution of each area that constitutes the central area 264, the refractive index distribution of each area that constitutes the peripheral area 265, and the refractive index distribution of each area that constitutes the peripheral area 266. The point spread function of the area 263 can be treated as the point spread function of the area 254 in the first image 250.

The area 254 is the first area in the first image 250. Each area of the first image 250 already has information on brightness of the optical image of the sample. Thus, an image having a point spread function (hereinafter referred to as "PSF image") is generated separately from the first image 250.

Figure 20A:
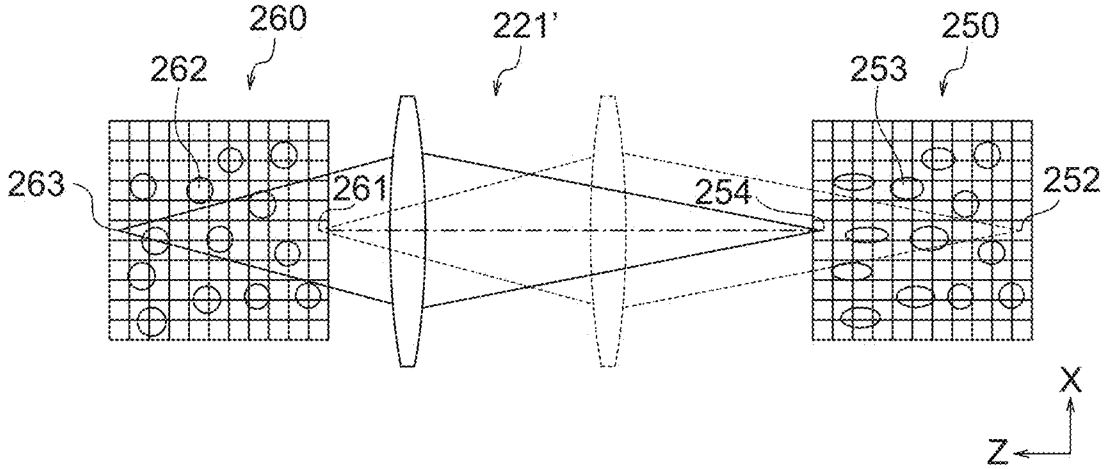
FIGS. 20A and 20B are diagrams illustrating the first image, the refractive index image, and a PSF image.
Figure 20B:
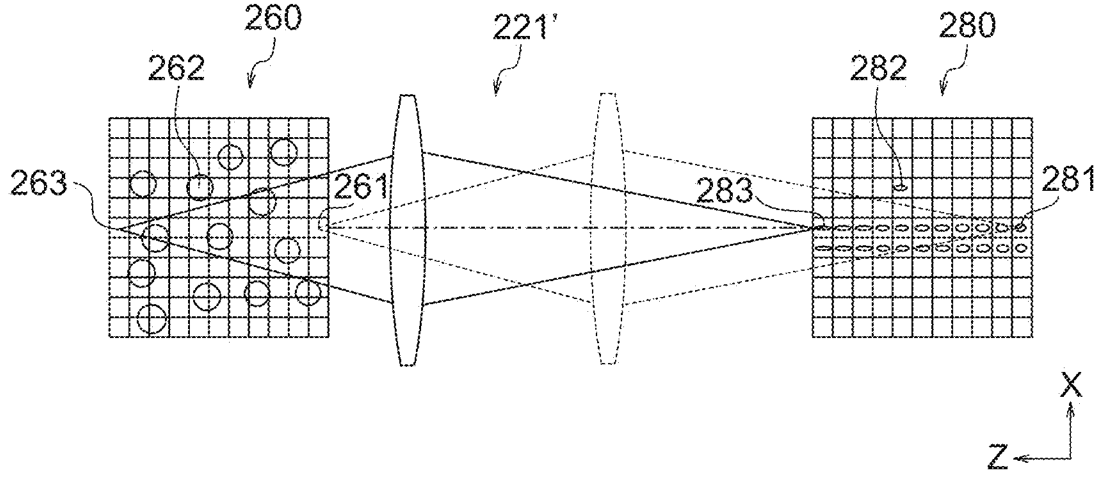

FIGS. 20A and 20B are diagrams illustrating the first image, the refractive index image, and a PSF image. FIG. 20A is a diagram illustrating the first image and the refractive index image. FIG. 20B is a diagram illustrating the refractive index image and a PSF image. FIG. 20A is the same diagram as FIG. 18A, and a description thereof is omitted.

The first image 250 is divided into a plurality of areas. Thus, as illustrated in FIG. 20B, a PSF image 280 is also divided into a plurality of areas. The PSF image 280 is divided into 11 areas in both of the X-axis direction and the Z-axis direction.

As can be understood from the comparison between FIG. 20A and FIG. 20B, the area corresponding to an area 281 in the PSF image 280 is the area 252. The area corresponding to an area 282 is the area 253. The area corresponding to an area 283 is the area 254. Thus, each area of the PSF image 280 has the point spread function of the area corresponding to the first area of the first image 250. In FIG. 20B, the point spread function is illustrated only for a partial area.

Returning to FIG. 16, the description continues. Upon completion of step S330, step S340 is performed.

At step S340, a first generation process is performed. In the first generation process, respective second images corresponding to the areas are generated using the respective point spread functions calculated for the areas. The second image is the small image.

Figure 21A:
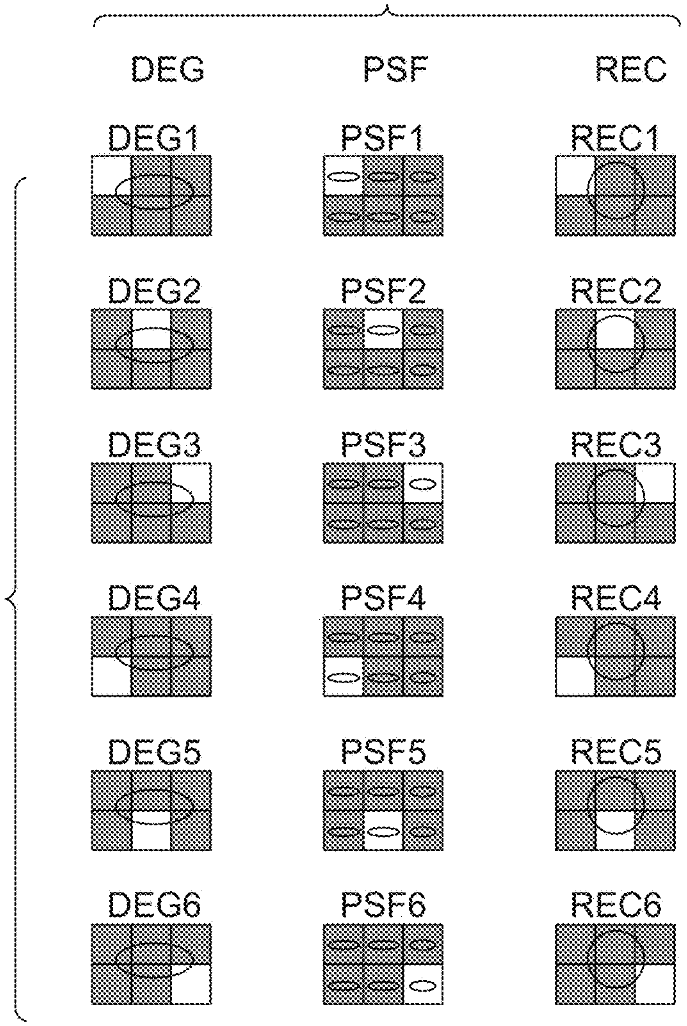
FIGS. 21A and 21B are diagrams illustrating the first image, a second image, and a third image.
Figure 21B:
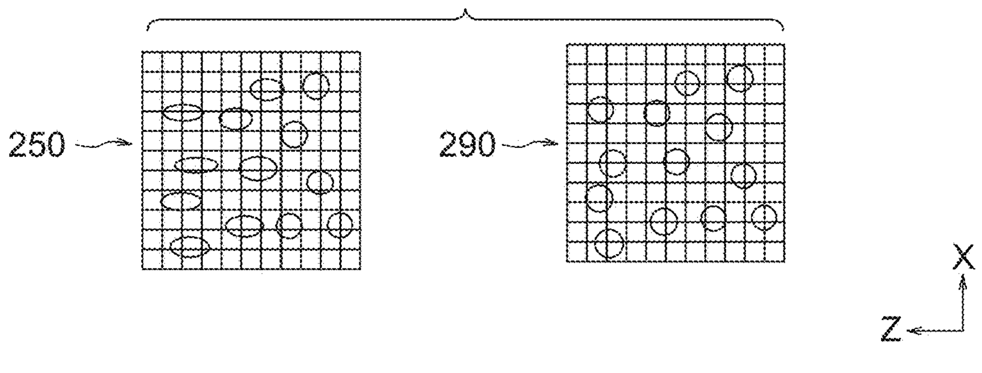

FIGS. 21A and 21B are diagrams illustrating the first image, a second image, and a third image. FIG. 21A is a diagram illustrating the first image and a second image. FIG. 21B is a diagram illustrating the first image and a third image.

FIG. 21A illustrates a partial area of the first image, a partial area of the PSF image, and a second image group.

An area DEG is a partial area of the first image 250. The area DEG is formed of an area DEG1, an area DEG2, an area DEG3, an area DEG4, an area DEG5, and an area DEG6.

An area PSF is a partial area of the PSF image 280 and corresponds to the area DEG. The area PSF is formed of an area PSF1, an area PSF2, an area PSF3, an area PSF4, an area PSF5, and an area PSF6.

A second image group REC is an image of an area corresponding to the area DEG and the area PSF. The second image group REC is formed of a second image REC1, a second image REC2, a second image REC3, a second image REC4, a second image REC5, and a second image REC6.

The image of the area DEG1 is the first image. The image of the area PSF1 is a point spread function. The second image REC1 is generated from the image of the area DEG1 and the image of the area PSF1.

In the area DEG, the shape of the cell nucleus is an oval. In the second image, the shape of the cell nucleus is a circle. Thus, in the first generation process, a restored image is generated from a degraded image. Upon completion of step S340, step S350 is performed.

In generation of the second image, it is preferable to perform mask processing on the image of each area in area DEG. The mask processing includes, for example, blurring the periphery of the image.

At step S350, a third image is generated. The process of generating the third image is the combination process. The third image is an image corresponding to the first image. In generation of the third image, the respective second images corresponding the areas are combined. The third image is the image after processing.

FIG. 21B illustrates the first image 250 and a third image 290. The third image 290 is generated by combining the second images. The second images are generated based on the first image 250, and the third image is generated based on the second images. Thus, the third image 290 is the image corresponding to the first image 250.

In the first image 250, the shape of the cell nucleus is an oval. In the third image 290, the shape of the cell nucleus is a circle. Thus, in the refractive index distribution generation device 1, it is possible to generate a high-quality restored image from a degraded image.

In combining the second images, weighting can be performed. In two adjacent second images, the influence from one of the second images may be halved at the boundary between the two images.

Figure 22A:
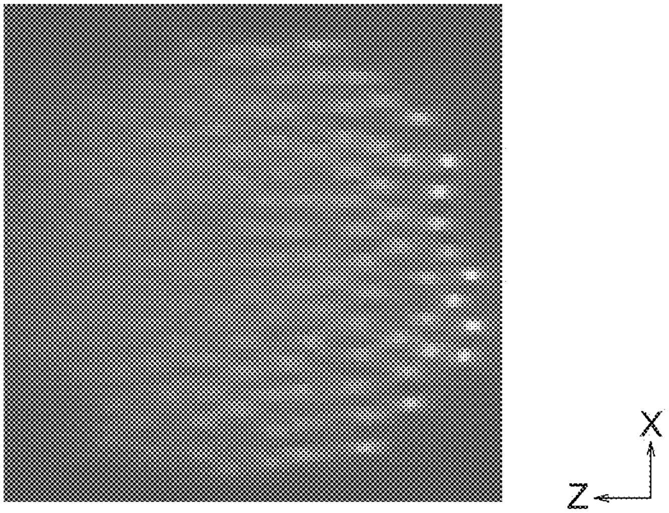
FIGS. 22A and 22B are diagrams illustrating the first image and the third image.
Figure 22B:
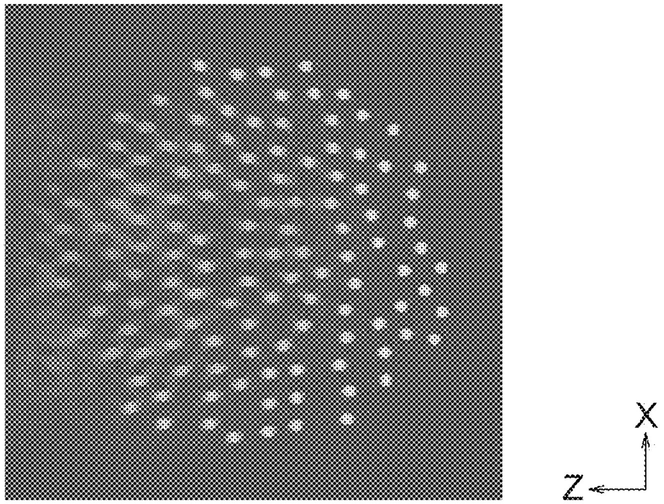

FIGS. 22A and 22B are diagrams illustrating a first image and a third image. FIG. 22A is a diagram illustrating a first image. FIG. 22B is a diagram illustrating a third image.

The right end of the image represents the image of the top surface of the sample, and the left end of the image represents the image of the bottom surface of the sample. The image quality is higher in the third image than in the first image over the entire range from the top surface to the bottom surface of the sample.

As described above, not only the refractive index distribution of the central area but also the refractive index distribution of the peripheral area is used in the calculation of the point spread function. Thus, it is possible to calculate the point spread function with higher accuracy compared to restoration techniques that use only the refractive index distribution of the central area. As a result, it is possible to restore an image with high accuracy in the refractive index distribution generation device of the present embodiment.

As explained in FIG. 18C, the area group is determined by the range of light originating from the first area and radiating in the predetermined direction. The light emitted from the first area passes through the area group and is incident on the observation optical system. The point spread function is then obtained from the light emitted from the observation optical system.

The light radiating from the first area is obtained by setting a point light source in the first area. A wavefront is emitted from the point light source, that is, the wave source of the wavefront is the point light source. Assuming that this wavefront is a first wavefront, it is possible to calculate the point spread function of the first area using the first wavefront.

Specifically, a second wavefront is calculated using a first wavefront and a refractive index distribution corresponding to each of areas included in the area group. An intensity distribution corresponding to a third wavefront is calculated using the calculated second wavefront. A point spread function of the first area is calculated using the calculated intensity distribution. The second wavefront is a wavefront propagating through the sample in the predetermined direction, and the third wavefront is a wavefront at a position of a focal plane of the virtual observation optical system.

Figure 23:
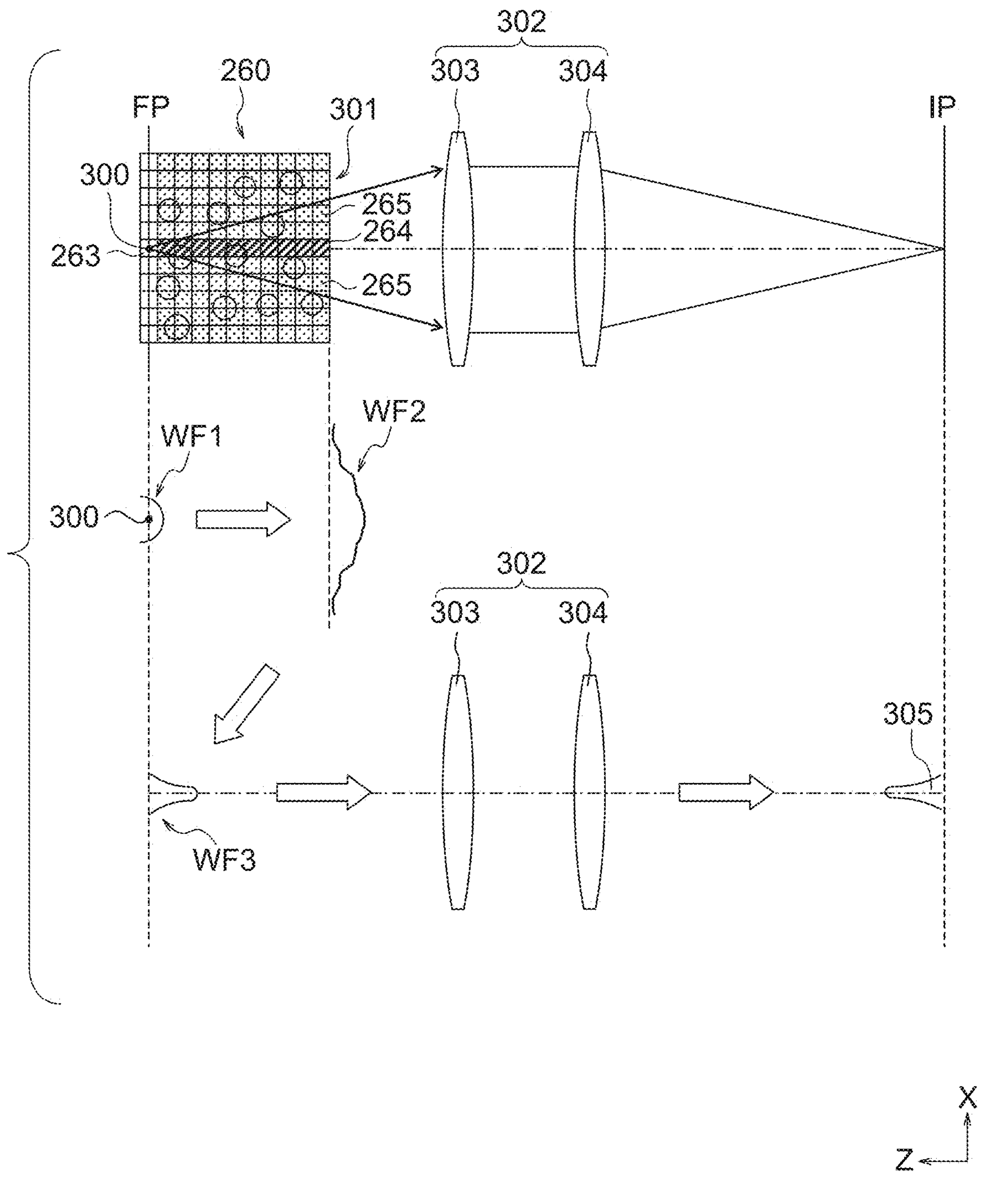
FIG. 23 is a diagram illustrating propagation of a wavefront.

FIG. 23 is a diagram illustrating propagation of a wavefront. The same component as that in FIG. 18C is denoted by the same numeral and a description thereof is omitted.

A refractive index distribution is used in calculation of a point spread function. Thus, a description will be given using the refractive index image 260. In the refractive index image 260, the area 263 corresponds to the first area. Thus, the area 263 is positioned at a focal plane FP. Furthermore, a point light source 300 is set in the area 263.

A first wavefront WF1 is emitted from the point light source 300. The first wavefront WF1 propagates from the area 263 to a top surface 301 of the refractive index image 260. The top surface 301 is the outer edge of the sample. An observation optical system 302 is positioned on the top surface 301 side. Thus, the first wavefront WF1 propagates in the predetermined direction.

It is possible to calculate propagation of a wavefront by simulation. The observation optical system 302 is a virtual optical system and formed of, for example, an objective lens 303 and an imaging lens 304. The optical specifications of the observation optical system 302 are the same as those of the observation optical system 221. It is possible to acquire the optical specifications, for example, magnification and numerical aperture, based on the various information.

The first wavefront WF1 propagates through the area group and reaches the top surface 301. A second wavefront WF2 is emitted from the top surface 301. The second wavefront WF2 is a wavefront after propagating through the area group. The area group is formed of the central area 264 and the peripheral area 265. Thus, it is possible to calculate the second wavefront WF2 using the refractive index distribution of each area included in the area group.

In the observation optical system 302, the focal plane FP and an image plane IP are conjugate. In order to obtain a point spread function 305 in the image plane IP, the wavefront in the focal plane FP is necessary. The second wavefront WF2 is positioned at the top surface 301. By propagating the second wavefront WF2 to the focal plane FP, it is possible to obtain a third wavefront WF3 as a wavefront in the focal plane FP.

The observation optical system 302 forms a Fourier optical system. It is possible to calculate the point spread function 305 corresponding to the imaging plane of the third wavefront WF3, using a pupil function of the observation optical system 302. The calculation formula is presented below. In the calculation formula, WF3 is the third wavefront, P is the pupil function of the observation optical system 302, $U_{135}$ is a wavefront in the image plane, and $I_{135}$ is the intensity distribution in the image plane.

$$U_{135} = F^{-1}[F\{WF_3\} * P],$$

$$I_{135} = |U_{135}|^2$$

In the beam propagation method, an object model is replaced by a plurality of thin layers. Then, an image of the object model is calculated by successively calculating wavefront change when light passes through the layers. The beam propagation method is disclosed, for example, in "High-resolution 3D refractive index microscopy of multiple-scattering samples from intensity images", Optica, Vol. 6, No. 9, pp. 1211-1219 (2019).

In the refractive index distribution generation device of the present embodiment, it is possible to restore an image with high accuracy even when the processing-target image is a degraded image, because the image generation process is performed. As a result, it is possible to improve the accuracy of the refractive index distribution of the sample.

The size of the area group differs between FIG. 23 and FIG. 18C. The range of the peripheral area 265 in FIG. 23 is larger than the range of the peripheral area 265 and the peripheral area 266 added together in FIG. 18C. In FIG. 23, the point spread function is calculated by considering all areas positioned on the predetermined direction side from the first area as an area group.

In order to accurately calculate the point spread function 305, it is preferable to use all refractive index distributions of all areas that constitute the area group. In FIG. 23, since the area 263 is the first area, the refractive index distributions of all areas positioned from the area 263 to the top surface 301 are used. When the refractive index distributions of all areas positioned from the first area to the top surface of the sample are used, it is possible to calculate the point spread function more accurately.

In the refractive index distribution generation device of the present embodiment, it is preferable that the processor performs the refractive index distribution generation process and the image generation process, using the image after processing as the processing-target image.

Figure 24:
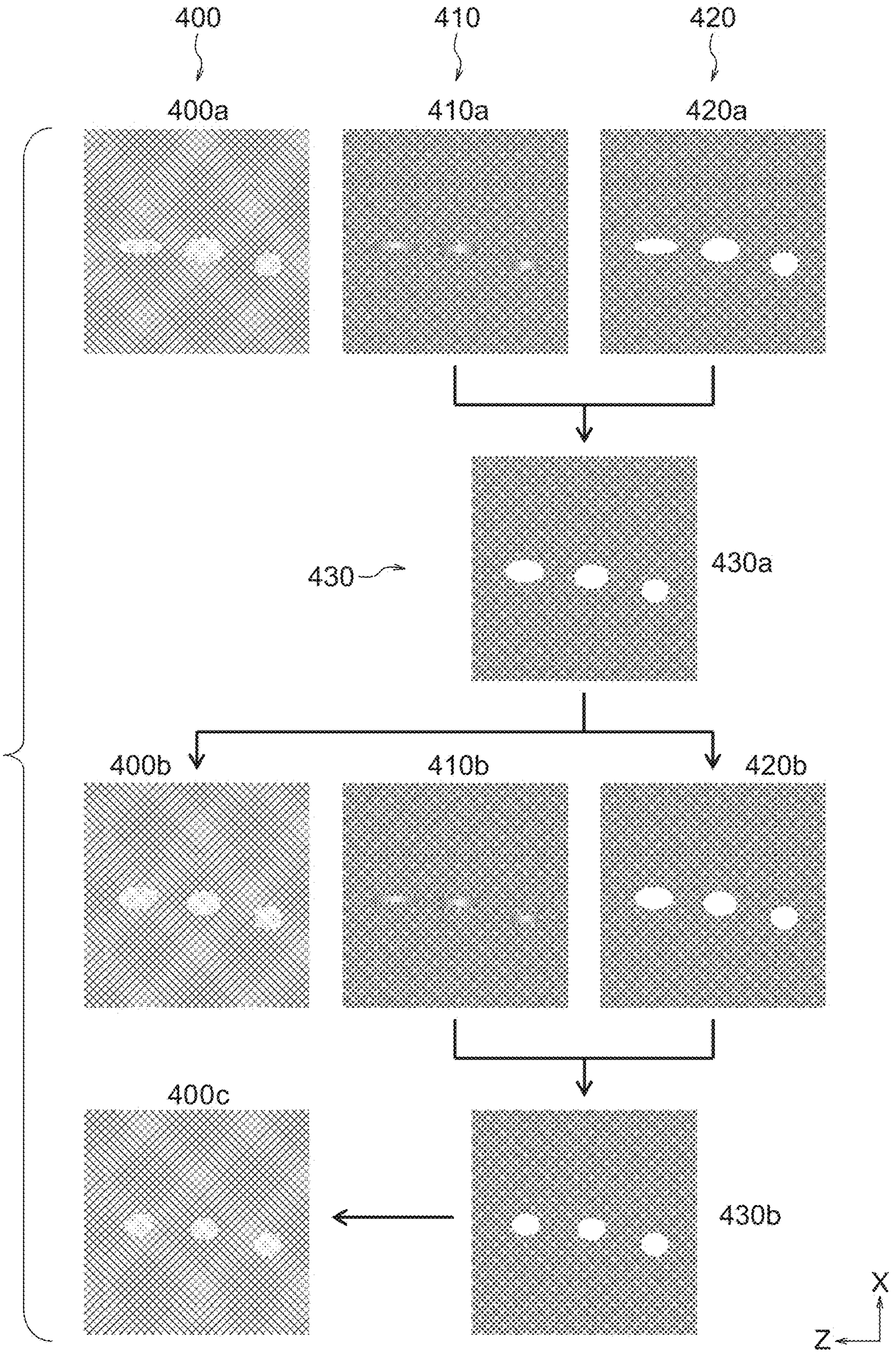
FIG. 24 is a diagram illustrating the refractive index image, the PSF image, the first image, and a restored image.

FIG. 24 is a diagram illustrating a refractive index image, a PSF image, a first image (degraded image), and a restored image. These images are images in the process of generating a restored image (hereinafter referred to as "restoration process").

Each of images in an image group 400 is a refractive index image. The image group 400 includes a refractive index image 400*a*, a refractive index image 400*b*, and a refractive index image 400*c*. Each of images in an image group 410 is a PSF image. The image group 410 includes a PSF image 410*a* and a PSF image 410*b*.

Each of images in an image group 420 is the first image. The image group 420 includes a first image 420*a* and a first image 420*b*. Each of images in an image group 430 is a restored image. The image group 430 includes a restored image 430*a* and a restored image 430*b*.

In the image group 400, the image group 410, the image group 420, and the image group 430, images of cell nuclei are depicted. For the sake of visibility, the number of cell nuclei is reduced and the shape of cell nuclei is drawn larger. An image in each image group is an image of the XZ cross-section. Furthermore, the right end of the image is the top surface of the sample, and the left end of the image is the bottom surface of the sample.

The PSF image 410*a* is obtained from the refractive index image 400*a*. The restored image 430*a* is obtained from the first image 420*a* and the PSF image 410*a*. Since the first image 420*a* is a degraded image, it is possible to obtain the restored image 430*a* from the degraded image by performing the restoration process.

When the first image 420*a* and the restored image 430*a* are compared, in the restored image 430*a*, the outline of the cell nucleus positioned deeper from the top surface is more similar to a circle, compared with the first image 420*a*.

It is possible to extract the outline of the cell nucleus from the restored image 430*a*. It is possible to generate the first image 420*b* and the refractive index image 400*b* on the basis of the extracted outline.

The PSF image 410*b* is obtained from the refractive index image 400*b*. The restored image 430*b* is obtained from the first image 420*b* and the PSF image 410*b*. Since the first image 420*b* is a degraded image, it is possible to obtain the restored image 430*b* from the degraded image by performing the restoration process.

When the first image 420*b* and the restored image 430*b* are compared, in the restored image 430*b*, the outline of the cell nucleus positioned deeper from the top surface is more similar to a circle, compared with the first image 420*b*.

It is possible to extract the outline of the cell nucleus from the restored image 430*a*. It is possible to generate the refractive index image 400*c* on the basis of the extracted outline.

When the refractive index image 400*a*, the refractive index image 400*b*, and the refractive index image 400*c* are compared, the outline of the cell nucleus positioned deeper from the top surface approaches a circle each time the restoration process is performed.

Each of images in an image group 400 is a refractive index image. The refractive index image is generated from a distribution image group. In the distribution image group, the refractive index distribution of the sample is represented by a plurality of images.

In the refractive index distribution generation device of the present embodiment, the refractive index distribution generation process is performed. In the refractive index distribution generation process, a refractive index distribution image is used. The refractive index distribution image is an image represented by refractive indexes. In the refractive index distribution image, a refractive index based on the sample is set.

In this way, the refractive index image in the restoration process and the refractive index distribution image in the refractive index distribution generation process both represent the refractive indexes of the sample. Thus, if each image in the image group 400 is considered as a refractive index distribution image, in the refractive index distribution generation device of the present embodiment, it is possible to further improve the accuracy of a refractive index distribution even for a thick sample, because the refractive index distribution generation device of the present embodiment includes the restoration process.

In the refractive index distribution generation device of the present embodiment, it is preferable that the input process inputs, from the memory, a second processing-target image obtained by capturing an image of a second sample, and the processor performs a refractive index determination process of determining a refractive index of the first structure. Then, it is preferable that the refractive index determination process includes a refractive index distribution calculation process of calculating a refractive index distribution of the second sample from a plurality of the second images to be processed, a second identification process of identifying a seventh image region corresponding to the first structure in the second processing-target image, and a third identification process of identifying a refractive index corresponding to the seventh image region among refractive indexes that constitute a refractive index distribution of the second sample. It is preferable that the input process inputs, from the memory, a refractive index of the first structure determined in the refractive index determination process.

As described above, in the refractive index distribution generation device 1, a processing-target image is stored in the memory 2. It is possible to acquire the processing-target image by a microscope system 20. In the microscope system 20, it is possible to acquire the second processing-target image.

Figure 25:
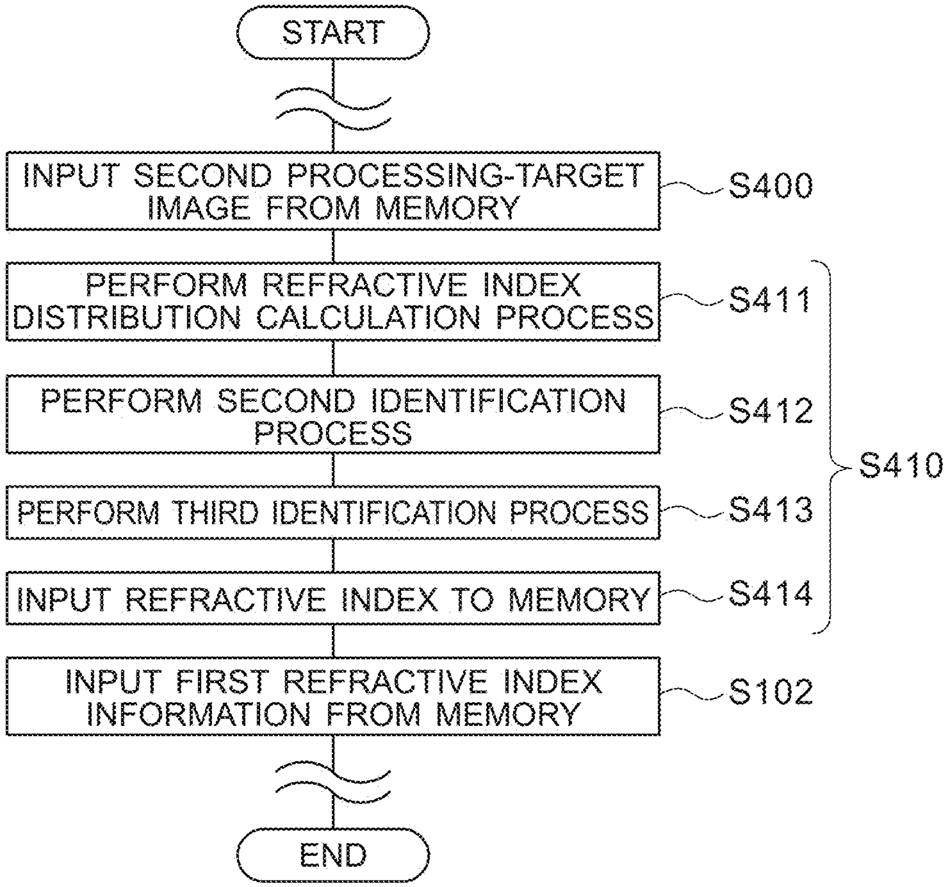
FIG. 25 is a flowchart of processing performed by the processor.

FIG. 25 is a flowchart of the processing performed by the processor. In the processor 3, a refractive index determination process is performed. The refractive index determination process is performed before the first refractive index information is input from the memory.

At step S400, a second processing-target image is input from the memory. The second processing-target image is an image acquired by capturing an image of a second sample. The second sample is the same as the sample from which the processing-target image is acquired.

The second processing-target image may be acquired by the same observation method as that of the processing-target image or may be acquired by an observation method different from that of the processing-target image. It is possible to use a fluorescent image, a stained image, and a phase difference image as the second processing-target image.

At step S410, the refractive index determination process is performed. In the refractive index determination process, the refractive index of the first structure is determined. Step S410 includes step S411, step S412, step S413, and step S414.

At step S411, a refractive index distribution calculation process is performed. In the refractive index distribution calculation process, the refractive index distribution of the second sample is calculated from a plurality of second images to be processed. It is possible to perform the refractive index distribution calculation process by computational imaging.

The estimation of the refractive index distribution by computational imaging will now be described. In the estimation, an optical image of a sample and an optical image of an estimation sample are used. It is possible to acquire the optical image of the estimation sample by simulation using a virtual optical system. Since the sample is a three-dimensional object, the estimation sample is also a three-dimensional object. In this case, the optical image of the estimation sample is represented by a plurality of estimation XY images (hereinafter referred to as "estimation XY image group").

It is possible to represent the refractive index distribution of the sample by the aforementioned distribution image group. It is possible to represent the refractive index distribution of the estimation sample by a plurality of estimation distribution images (hereinafter referred to as "estimation distribution image group").

In the processor 3, the estimation of the estimation distribution image group is performed by computational imaging. In the estimation, the XY image group is compared with the estimation XY image group. Specifically, the value of the refractive index in the estimation distribution image group is changed so that the difference between the XY image group and the estimation XY image group is reduced.

It is possible to represent the difference between two images by a numerical value. Thus, the comparison between two images and the changing of the value of the refractive index are repeated until this numerical value becomes smaller than a threshold. Then, the estimation distribution image group when this numerical value becomes smaller than the threshold is set as a distribution image group. The distribution image group represents the refractive index distribution of the sample. Thus, the refractive index distribution of the sample is obtained. Upon completion of step S411, step S412 is performed.

At step S412, a second identification process is performed. In the second identification process, the seventh image region corresponding to the first structure is identified in the second processing-target image. Upon completion of step S412, step S413 is performed.

At step S413, a third identification process is performed. In the third identification process, a refractive index corresponding to the seventh image region is identified among the refractive indexes that constitute the refractive index distribution of the second sample. Upon completion of step S413, step S414 is performed.

At step S414, the refractive index is input into the memory. This refractive index is a refractive index corresponding to the seventh image region. Upon completion of step S414, step S102 is performed.

As described above, at step S102, the first refractive index information is input from the memory. The refractive index corresponding to the seventh image region is stored in the memory. The refractive index corresponding to the seventh image region is the refractive index of the first structure determined in the refractive index determination process. Thus, the refractive index of the first structure determined in the refractive index determination process is input from the memory.

The processing-target image for use in identifying the seventh image region is different from the processing-target image for use in identifying the first image region. The refractive index corresponding to the seventh image region is a refractive index estimated by computational imaging. Since both the seventh image region and the first image region are image regions corresponding to the first structure, it is possible to use the refractive index corresponding to the seventh image region as the refractive index corresponding to the first image region.

In the refractive index distribution generation device of the present embodiment, it is preferable that the second sample has a maximum depth of less than 50 μm and the sample has a minimum depth of equal to or greater than 50 μm.

A refractive index distribution generation system of the present embodiment includes: an observation optical system configured to form an optical image of a sample; an imager configured to capture the optical image; and the above-mentioned refractive index distribution generation device.

With the refractive index distribution generation system, it is possible to improve the accuracy of a refractive index distribution even for a thick sample.

A refractive index distribution generation system of the present embodiment includes a processor with hardware implementation and a memory with hardware implementation. The processor performs a refractive index distribution generation process of generating a refractive index distribution corresponding to a processing-target image. The refractive index distribution generation process includes an input process of inputting, from the memory, the processing-target image, first refractive index information indicating a refractive index of a first structure, and second refractive index information indicating a refractive index of a second structure different from the first structure, and a setting process of setting respective refractive indexes that constitute a refractive index distribution. The setting process includes a first setting process of setting a refractive index based on the first refractive index information at a position corresponding to a first image region of the processing-target image on the basis of a signal intensity of at least one unit pixel of the processing-target image, and a second setting process of setting a refractive index based on the second refractive index information at a position corresponding to an image region different from the first image region of the processing-target image. The first image region is an image region corresponding to the first structure. The at least one unit pixel is constituted of one or more pixels. The processor performs the refractive index distribution generation process, using an image obtained by capturing an image of a sample, as the processing-target image. The processor performs a machine learning process to train an AI model. In the machine learning process, the AI model is trained with a plurality of data sets. The data sets include the processing-target image and training data corresponding to the processing-target image. The training data is the refractive index distribution generated by the refractive index distribution generation process.

In the refractive index distribution generation system of the present embodiment, the refractive index distribution image is generated from the processing-target image. The processing-target image is a degraded image, and the refractive index distribution image is a restored image. If the refractive index distribution image is considered as training data, it is possible to use the processing-target image and the refractive index distribution image as data for machine learning. Hereinafter, the processing-target image is referred to as the image before enhancement, and the refractive index distribution image is referred to as the enhanced image.

The enhanced image is able to be generated using an AI model trained by supervised machine learning (hereinafter referred to as "supervised ML").

The AI model performs an inference process on the basis of patterns found in data analysis in a training process and thereby provides a function to allow a computer system to execute tasks without explicitly executing a program.

It is possible to subject the AI model to a training process continuously or periodically before executing the inference process.

The AI model by the supervised ML includes an algorithm that trains on existing sample data and training data and makes predictions about new data. The training data is also referred to as teacher data.

Such an algorithm works by constructing an AI model from sample data and training data to make data-driven predictions or decisions represented as outcomes.

In the supervised ML, when a training process is performed, upon input of sample data and training data, the function that best approximates the relationship between input and output is learned. When the trained AI model performs an inference process, the same function is implemented to produce the corresponding output upon new data input.

Examples of commonly used supervised ML algorithms include logistic regression (LR), naive Bayes, random forests (RFs), neural networks (NNs), deep neural networks (DNNs), matrix factorization, and support vector machines (SVMs).

It is possible to perform supervised ML process in the training process of this example. In the training process, the AI model is trained or learned.

When the training process is performed, a sufficient number of data sets are input to an input layer of the AI model and propagated through the AI model to an output layer.

Figure 26:
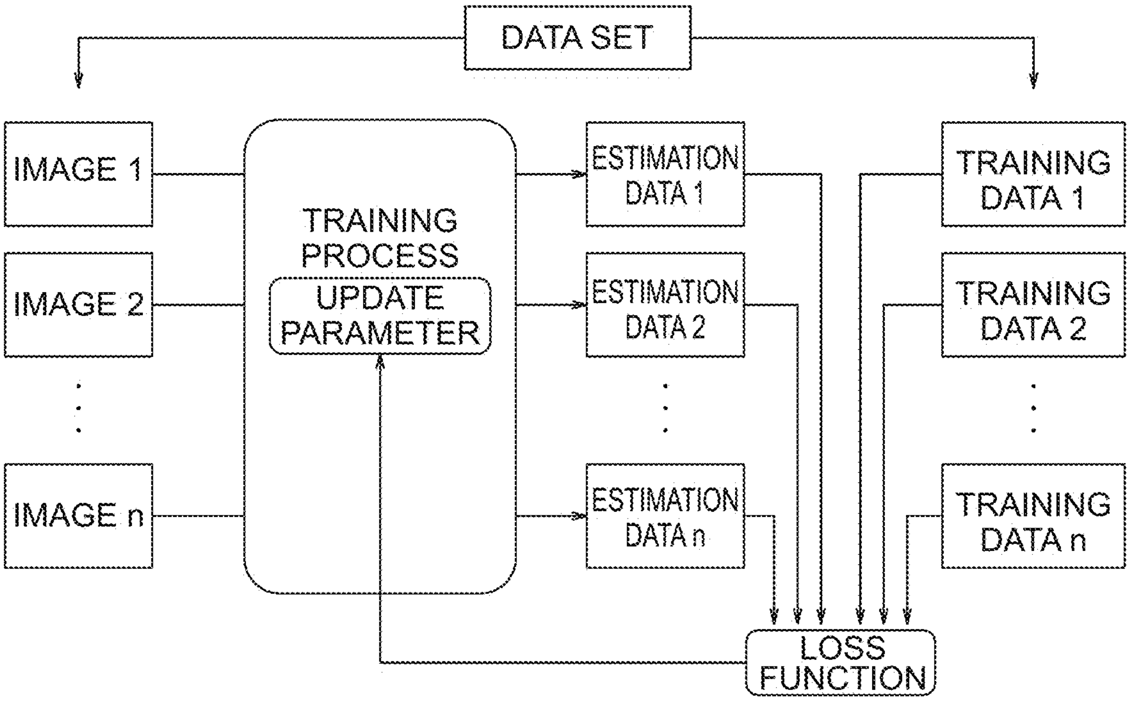
FIG. 26 is a diagram illustrating a training process.

FIG. 26 is a diagram illustrating a training process. The data sets include the image before enhancement and the enhanced image. The image before enhancement is sample data. The enhanced image is training data or teacher data corresponding to the sample data. In FIG. 26, the sample data is represented by an image 1, an image 2, and the like. The enhanced image is training data 1, training data 2, and the like.

In the training process, optimal parameters that generate estimation data from sample data are searched for and updated using, for example, a loss function. Estimation data is generated for the input sample data, the difference between the generated estimation data and the training data is evaluated with a loss function, and the parameters that minimize the value of the loss function are searched for.

In the inference process in this example, it is possible to perform an inference process that outputs inference data when new data to be inferred is input to the trained AI model.

When the inference process is performed, the image before enhancement is input to the input layer of the AI model and propagated through the AI model to the output layer.

By performing the inference process, it is possible to generate the enhanced image from the image before enhancement.

Figure 27A:
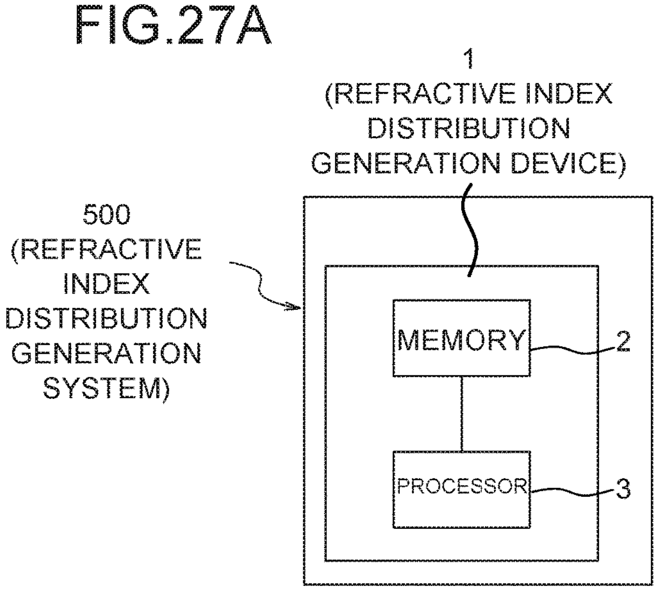
FIGS. 27A, 27B, and 27C are diagrams illustrating refractive index distribution generation systems of the present embodiment.
Figure 27B:
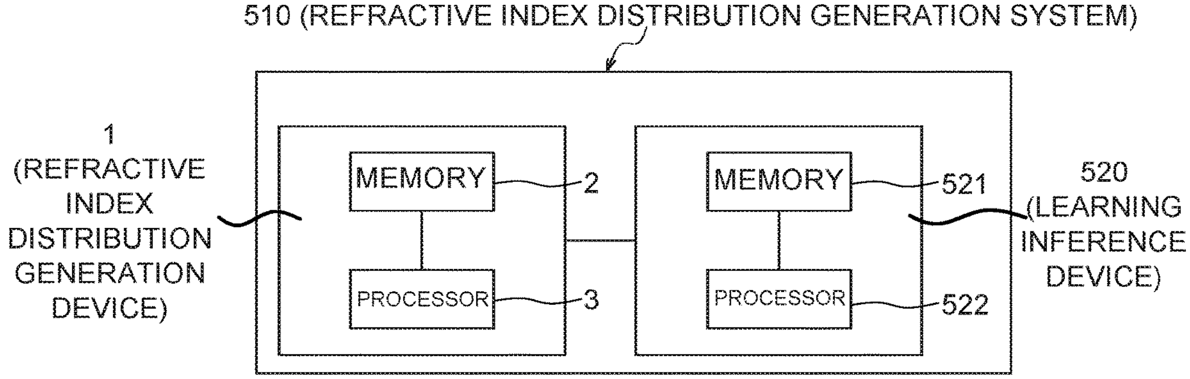
Figure 27C:
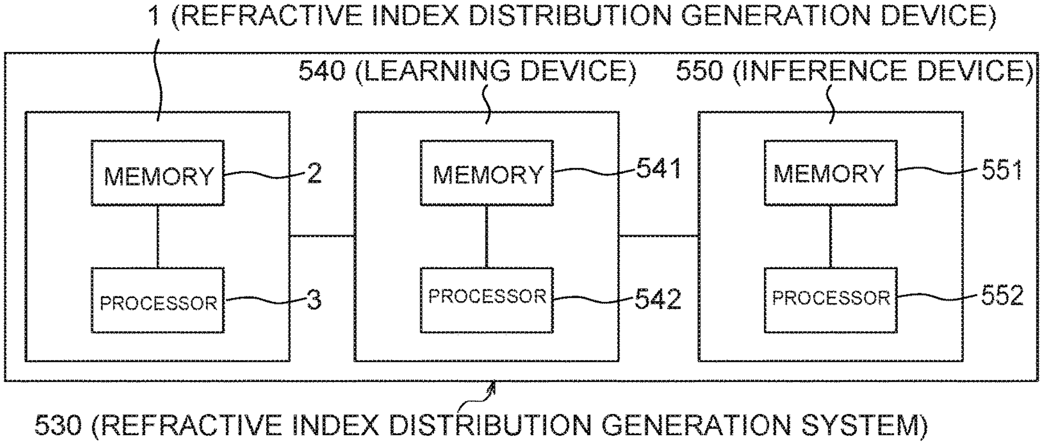

FIGS. 27A, 27B, and 27C are diagrams illustrating refractive index distribution generation systems of the present embodiment. FIG. 27A is a diagram illustrating a first example of the refractive index distribution generation system. FIG. 27B is a diagram illustrating a second example of the refractive index distribution generation system. FIG. 27C is a diagram illustrating a third example of the refractive index distribution generation system.

As illustrated in FIG. 27A, in the first example of the refractive index distribution generation system, a refractive index distribution generation system 500 is configured only with the refractive index distribution generation device of the present embodiment. In this case, it is possible to perform a training process and an inference process in the processor 3 of the refractive index distribution generation device (hereinafter referred to as "first processor").

The refractive index distribution generation device 1 can include a first processor and a second processor. The second processor is a processor different from the first processor. It is possible to perform a training process and an inference process in the second processor.

The refractive index distribution generation device 1 can include the first processor, the second processor, and a third processor. The third processor is a processor different from the first processor and the second processor. It is possible to perform a training process in the second processor and to perform an inference process in the third processor.

The memory 2 of the refractive index distribution generation device 1 stores therein the image before enhancement to be used in the training process, the enhanced image, and the image before enhancement to be used in the inference process.

As illustrated in FIG. 27B, in the second example of the refractive index distribution generation system, a refractive index distribution generation system 510 is configured with the refractive index distribution generation device 1 of the present embodiment and a learning inference device 520. The learning inference device 190 includes a memory 521 and a processor 522.

It is possible to perform a training process and an inference process in the learning inference device 520. In this case, the learning inference device 520 includes a memory and one or more processors. It is possible to perform the inference process in the same processor as that of the training process. The inference process may be performed in a processor different from that of the training process.

The memory 521 of the learning inference device stores the image before enhancement to be used in the training process, the enhanced image, and the image before enhancement to be used in the inference process.

As illustrated in FIG. 27C, in the third example of the refractive index distribution generation system, a refractive index distribution generation system 530 is configured with the refractive index distribution generation device 1 of the present embodiment, a learning device 540, and an inference device 550. The learning device 540 performs a training process, and the inference device 550 performs an inference process.

The learning device 540 includes a memory 541 and a processor 542. The inference device 550 includes a memory 551 and a processor 552. It is possible to perform a training process in the processor 542 of the learning device 540 and to perform an inference process in the processor 552 of the inference device 550.

The memory 541 of the learning device 540 stores therein the image before enhancement to be used in the training process and the enhanced image. The memory 221 of the inference device 220 stores therein the image before enhancement to be used in the inference process.

The learning inference device 190 and the learning device 210 described above receive data to be used in the training process from the refractive index distribution generation device 1 via communication or via a recording medium such as a USB memory, and store the received data in the respective memories of the devices.

In the refractive index distribution generation system of the present embodiment, it is possible to restore an image with high accuracy.

A refractive index distribution generation method of the present embodiment is a method for generating a refractive index distribution corresponding to a processing-target image, the method including: inputting the processing-target image, first refractive index information indicating a refractive index of a first structure, and second refractive index information indicating a refractive index of a second structure different from the first structure; setting a refractive index based on the first refractive index information at a position corresponding to a first image region of the processing-target image on the basis of a signal intensity of at least one unit pixel of the processing-target image; and setting a refractive index based on the second refractive index information at a position corresponding to an image region different from the first image region of the processing-target image. The first image region is an image region corresponding to the first structure. The at least one unit pixel includes one or more pixels. The processing-target image is an image obtained by capturing an image of a sample.

With the refractive index distribution generation method of the present embodiment, it is possible to improve the accuracy of a refractive index distribution even for a thick sample.

A recording medium of the present embodiment is a computer-readable recording medium encoded with a program for generating a sample image, the program causing a computer to perform processing including: an input process of inputting, from a memory, a processing-target image, first refractive index information indicating a refractive index of a first structure, and second refractive index information indicating a refractive index of a second structure different from the first structure; and a setting process of setting respective refractive indexes that constitute a refractive index distribution, the setting process including a first setting process of setting a refractive index based on the first refractive index information at a position corresponding to a first image region of the processing-target image on the basis of a signal intensity of at least one unit pixel of the processing-target image, and a second setting process of setting a refractive index based on the second refractive index information at a position corresponding to an image region different from the first image region of the processing-target image, in which the processing further includes a refractive index distribution generation process using an image obtained by capturing an image of a sample, as the processing-target image. The first image region is an image region corresponding to the first structure. The at least one unit pixel is constituted of one or more pixels.

The present disclosure is suitable for a refractive index distribution generation device, a refractive index distribution generation method, a refractive index distribution generation system, and a recording medium that can improve the accuracy of a refractive index distribution even for a thick sample.

With the recording medium of the present embodiment, it is possible to improve the accuracy of a refractive index distribution even for a thick sample.

The present disclosure provides a refractive index distribution generation device, a refractive index distribution generation method, a refractive index distribution generation system, and a recording medium that can improve the accuracy of a refractive index distribution even for a thick sample.

The invention claimed is:

1. A refractive index distribution generation device comprising: a processor with hardware implementation; and a memory with hardware implementation, wherein the processor performs a refractive index distribution generation process of generating a refractive index distribution corresponding to a processing-target image, the refractive index distribution generation process includes an input process of inputting, from the memory, the processing-target image, first refractive index information indicating a refractive index of a first structure, and second refractive index information indicating a refractive index of a second structure different from the first structure, and a setting process of setting respective refractive indexes that constitute a refractive index distribution, the setting process includes a first setting process of setting a refractive index based on the first refractive index information at a position corresponding to a first image region of the processing-target image on a basis of a signal intensity of at least one unit pixel of the processing-target image, and a second setting process of setting a refractive index based on the second refractive index information at a position corresponding to an image region different from the first image region of the processing-target image, the first image region is an image region corresponding to the first structure, the at least one unit pixel comprises one or more pixels, and the processor performs the refractive index distribution generation process, using an image obtained by capturing an image of a sample, as the processing-target image.

2. The refractive index distribution generation device according to claim 1, wherein the first setting process sets a refractive index based on the first refractive index information at a position corresponding to the first image region constituted of a first unit pixel having a signal intensity value greater than a threshold, of the at least one unit pixel, and the second setting process sets a refractive index based on the second refractive index information at a position corresponding to an image region constituted of a second unit pixel having a signal intensity value equal to or smaller than the threshold, of the at least one unit pixel.

3. The refractive index distribution generation device according to claim 2, wherein the refractive index distribution generation process includes a second correction process of correcting the first refractive index information on a basis of a signal intensity of the first unit pixel and generating corrected refractive index information, the second correction process generates the corrected refractive index information in which a refractive index corresponding to the first unit pixel having the signal intensity smaller than a maximum signal intensity is smaller than a refractive index corresponding to the at least one unit pixel having the maximum signal intensity in the first unit pixel, and the first setting process sets a refractive index indicated by the corrected refractive index information at a position corresponding to the first image region.

4. The refractive index distribution generation device according to claim 3, wherein the processing-target image is an image in which the sample has a depth increasing along a direction from one end toward the other end, the one end is opposite the other end across a center of the processing-target image, the refractive index distribution generation process includes a first correction process of enhancing brightness of a deep position in the sample relative to brightness of a shallow position in the sample, and the first setting process corrects the first refractive index information corresponding to the first image region of the processing-target image in which the brightness of the deep position is enhanced, and generates the corrected refractive index information.

5. The refractive index distribution generation device according to claim 4, wherein the first correction process enhances brightness more for an image region closer to the other end.

6. The refractive index distribution generation device according to claim 2, wherein the first setting process sets a refractive index indicated by the first refractive index information at a position corresponding to the first image region constituted of the first unit pixel.

7. The refractive index distribution generation device according to claim 6, wherein the processing-target image is an image in which the sample has a depth increasing along a direction from one end toward the other end, the one end is opposite the other end across a center of the processing-target image, the refractive index distribution generation process includes a first correction process of enhancing brightness of a deep position in the sample relative to brightness of a shallow position in the sample, and the first setting process sets a refractive index indicated by the first refractive index information at a position corresponding to the first image region of the processing-target image in which the brightness of the deep position is enhanced.

8. The refractive index distribution generation device according to claim 7, wherein the first correction process enhances brightness more for an image region closer to the other end.

9. The refractive index distribution generation device according to claim 1, wherein the processing-target image is an image in which the sample has a depth increasing along a direction from one end toward the other end, the one end is opposite the other end across a center of the processing-target image, the refractive index distribution generation process includes a first correction process of enhancing brightness of a deep position in the sample relative to brightness of a shallow position in the sample, and the first setting process sets a refractive index based on the first refractive index information on a basis of a signal intensity of the at least one unit pixel of the processing-target image in which the brightness of the deep position is enhanced.

10. The refractive index distribution generation device according to claim 9, wherein the first correction process enhances brightness more for an image region closer to the other end.

11. The refractive index distribution generation device according to claim 1, wherein the input process inputs, from the memory, third refractive index information indicating a refractive index of a third structure, the setting process includes a third setting process of setting a refractive index based on the third refractive index information at a position corresponding to a third image region of the processing-target image on a basis of the signal intensity and color information of the at least one unit pixel of the processing-target image, the third image region is an image region corresponding to the third structure, and the second setting process sets a refractive index based on the second refractive index information at a position corresponding to an image region different from the first image region of the processing-target image and corresponding to an image region different from the third image region of the processing-target image.

12. The refractive index distribution generation device according to claim 11, wherein the third refractive index information is refractive index information of cell adhesion molecules.

13. The refractive index distribution generation device according to claim 1, wherein the input process inputs, from the memory, fourth refractive index information indicating a refractive index of a medium surrounding the sample, the refractive index distribution generation process includes an identification process of identifying a boundary between the sample and the medium, the setting process includes the fourth setting process of setting a refractive index based on the fourth refractive index information at a position corresponding to a fourth image region of the processing-target image, and the fourth image region is an image region corresponding to the medium.

14. The refractive index distribution generation device according to claim 13, wherein the fourth refractive index information is refractive index information of a cell culture medium.

15. The refractive index distribution generation device according to claim 1, wherein the first refractive index information and the second refractive index information are refractive index information about a cell composition structure.

16. The refractive index distribution generation device according to claim 15, wherein the first refractive index information is refractive index information of a cell nucleus, and the second refractive index information is refractive index information of cell membrane.

17. The refractive index distribution generation device according to claim 1, wherein the processor performs an image generation process of generating an image after processing, the image corresponding to the processing-target image, and the image generation process includes a division process of dividing the processing-target image into a plurality of small image regions, a point spread function calculation process of calculating a point spread function for each of the small image regions, using a refractive index distribution of the processing-target image, a small image generation process of generating a small image for each of the small image regions, using a point spread function for each of the small image regions, and a combination process of combining the small image for each of the small image regions and generating the image after processing.

18. The refractive index distribution generation device according to claim 17, wherein the point spread function calculation process calculates a point spread function for each of the small image regions, using a refractive index distribution that is set at a position corresponding to a fifth image region positioned within a range in which a wavefront originating from the small image region propagates on the processing-target image, the fifth image region includes, for each of the small image regions, an image region outside a range of a sixth image region defined by extending the small image region in a predetermined direction, and the predetermined direction is a direction from the sample toward an observation optical system to be modeled in the calculation process, among optical axis directions of the observation optical system.

19. The refractive index distribution generation device according to claim 17, wherein the processor performs the refractive index distribution generation process and the image generation process, using the image after processing as the processing-target image.

20. The refractive index distribution generation device according to claim 1, wherein the input process inputs, from the memory, a second processing-target image obtained by capturing an image of a second sample, the processor performs a refractive index determination process of determining a refractive index of the first structure, the refractive index determination process includes a refractive index distribution calculation process of calculating a refractive index distribution of the second sample from a plurality of the second images to be processed, a second identification process of identifying a seventh image region corresponding to the first structure in the second processing-target image, and a third identification process of identifying a refractive index corresponding to the seventh image region, among refractive indexes that constitute a refractive index distribution of the second sample, and the input process inputs, from the memory, a refractive index of the first structure determined in the refractive index determination process.

21. The refractive index distribution generation device according to claim 20, wherein the second sample has a maximum depth of less than 50 μm, and the sample has a minimum depth of equal to or greater than 50 μm.

22. A refractive index distribution generation system comprising:

an observation optical system configured to form an optical image of a sample;

an imager configured to capture the optical image; and the refractive index distribution generation device according to claim 1.

23. The refractive index distribution generation device according to claim 1, wherein the first refractive index information and the second refractive index information are refractive index information corresponding to a composition structure of a cell, the processor obtains a position of the first image region and a position of a second image region on a basis of a signal intensity of the processing-target image, the first setting process sets the first refractive index information corresponding to a composition structure of the cell at a position corresponding to the first image region, and the second setting process sets the second refractive index information corresponding to a composition structure of the cell at a position corresponding to the second image region.

24. A refractive index distribution generation system comprising: a processor with hardware implementation; and a memory with hardware implementation, wherein the processor performs a refractive index distribution generation process of generating a refractive index distribution corresponding to a processing-target image, the refractive index distribution generation process includes an input process of inputting, from the memory, the processing-target image, first refractive index information indicating a refractive index of a first structure, and second refractive index information indicating a refractive index of a second structure different from the first structure, and a setting process of setting respective refractive indexes that constitute a refractive index distribution, the setting process includes a first setting process of setting a refractive index based on the first refractive index information at a position corresponding to a first image region of the processing-target image on a basis of a signal intensity of at least one unit pixel of the processing-target image, and a second setting process of setting a refractive index based on the second refractive index information at a position corresponding to an image region different from the first image region of the processing-target image, the first image region is an image region corresponding to the first structure, the at least one unit pixel comprises one or more pixels, the processor performs the refractive index distribution generation process, using an image obtained by capturing an image of a sample, as the processing-target image, the processor performs a machine learning process to train an AI model, in the machine learning process, the AI model is trained with a plurality of data sets, the data sets include the processing-target image and training data corresponding to the processing-target image, and the training data is the refractive index distribution generated by the refractive index distribution generation process.

25. A method for generating a refractive index distribution corresponding to a processing-target image, the method comprising:

inputting the processing-target image, first refractive index information indicating a refractive index of a first structure, and second refractive index information indicating a refractive index of a second structure different from the first structure;

setting a refractive index based on the first refractive index information at a position corresponding to a first image region of the processing-target image on a basis of a signal intensity of at least one unit pixel of the processing-target image; and setting a refractive index based on the second refractive index information at a position corresponding to an image region different from the first image region of the processing-target image, wherein the first image region is an image region corresponding to the first structure, the at least one unit pixel includes one or more pixels, and the processing-target image is an image obtained by capturing an image of a sample.

26. A computer-readable recording medium encoded with a program for generating a sample image, the program causing a computer to perform processing comprising:

an input process of inputting, from a memory, the processing-target image, first refractive index information indicating a refractive index of a first structure, and second refractive index information indicating a refractive index of a second structure different from the first structure; and a setting process of setting respective refractive indexes that constitute a refractive index distribution, the setting process including a first setting process of setting a refractive index based on the first refractive index information at a position corresponding to a first image region of the processing-target image on a basis of a signal intensity of at least one unit pixel of the processing-target image, and a second setting process of setting a refractive index based on the second refractive index information at a position corresponding to an image region different from the first image region of the processing-target image, wherein the first image region is an image region corresponding to the first structure, the at least one unit pixel comprises one or more pixels, and the processing further includes the refractive index distribution generation process using an image obtained by capturing an image of a sample, as the processing-target image.

* * * * *